Aug. 26, 1930. C. D. KNOWLTON 1,773,907
MACHINE FOR FORMING MATERIAL
Filed Sept. 6, 1921 16 Sheets-Sheet 8
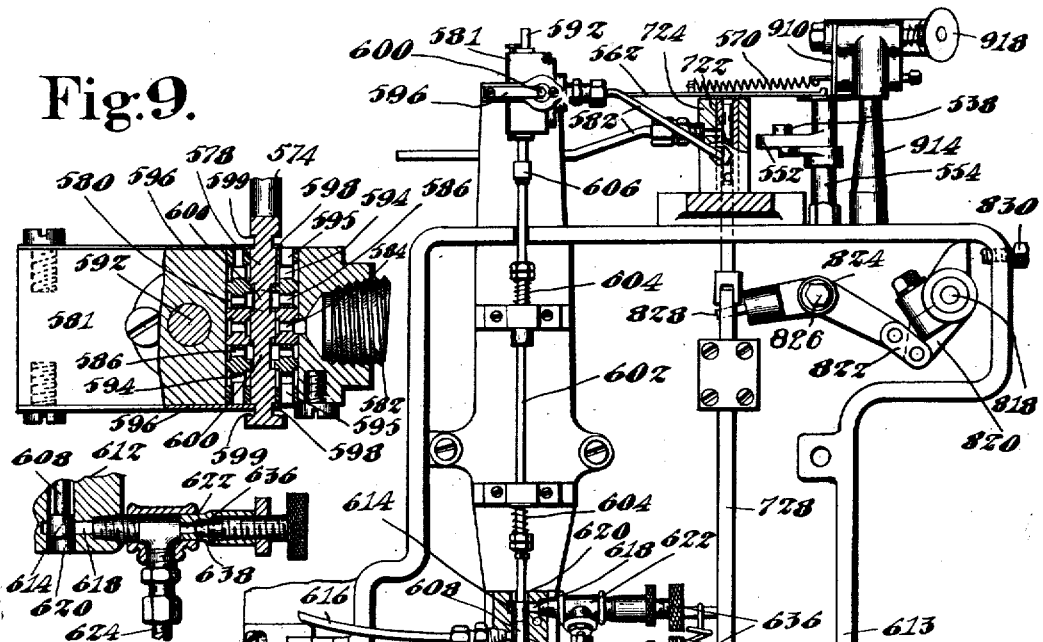
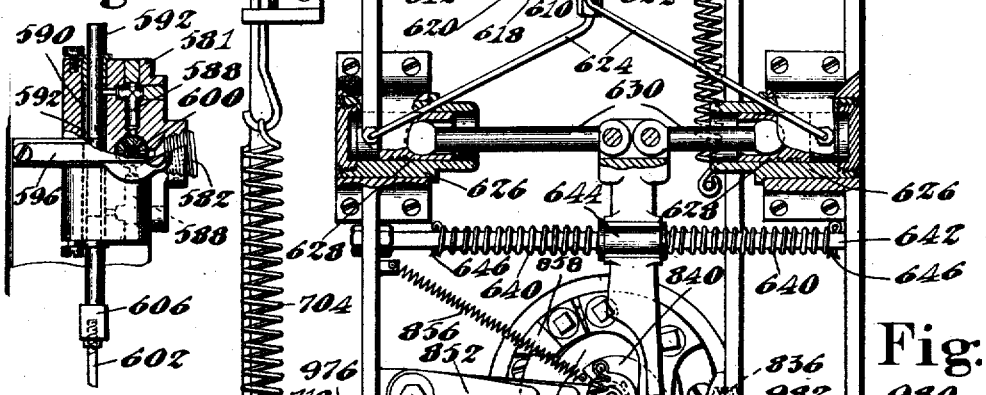
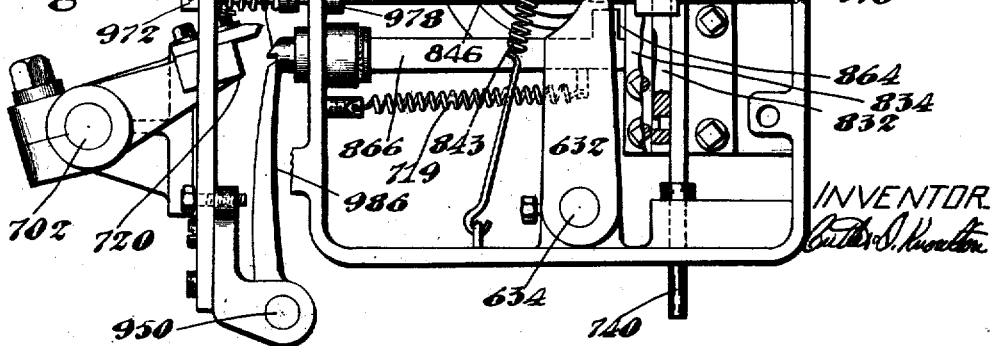

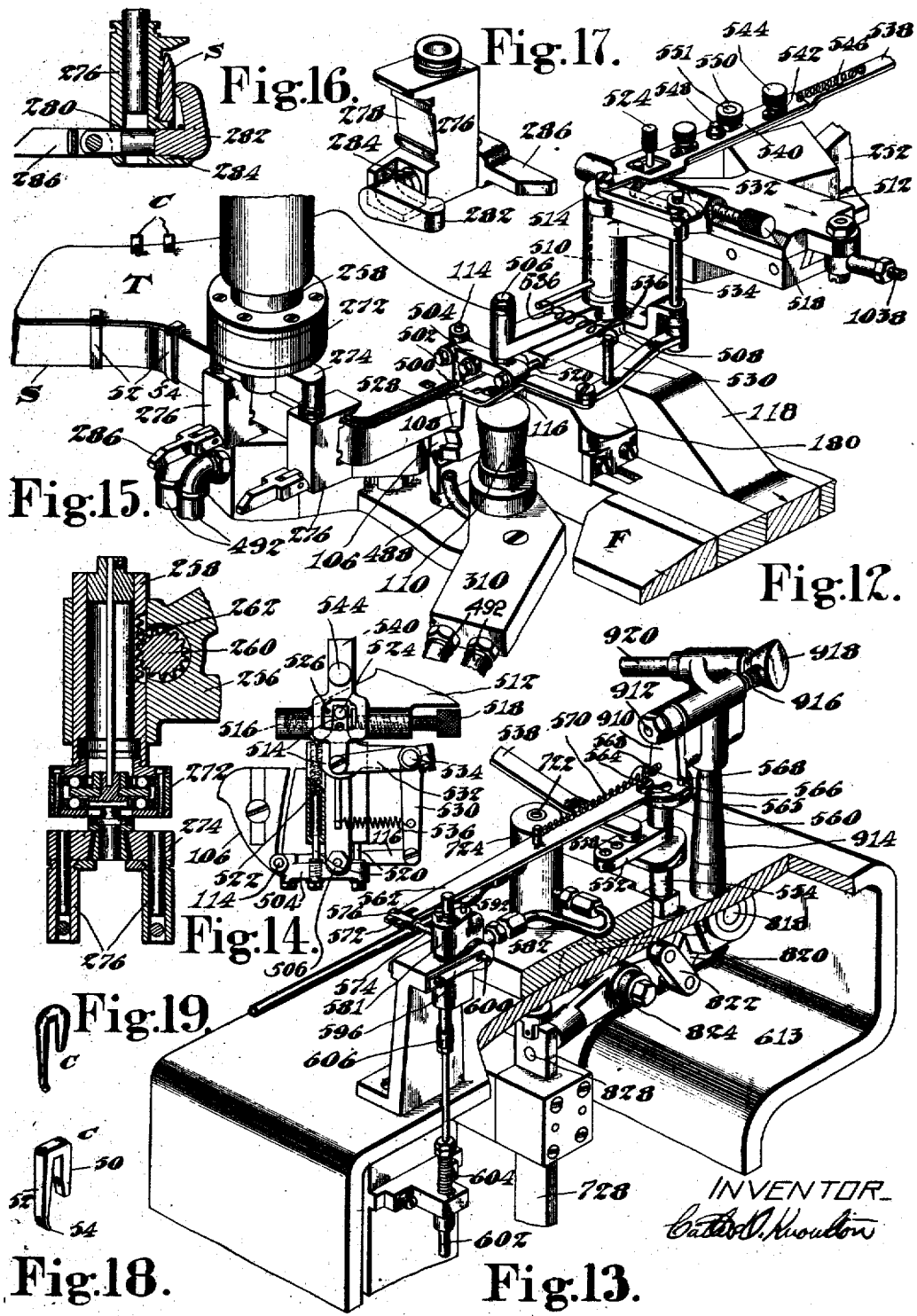

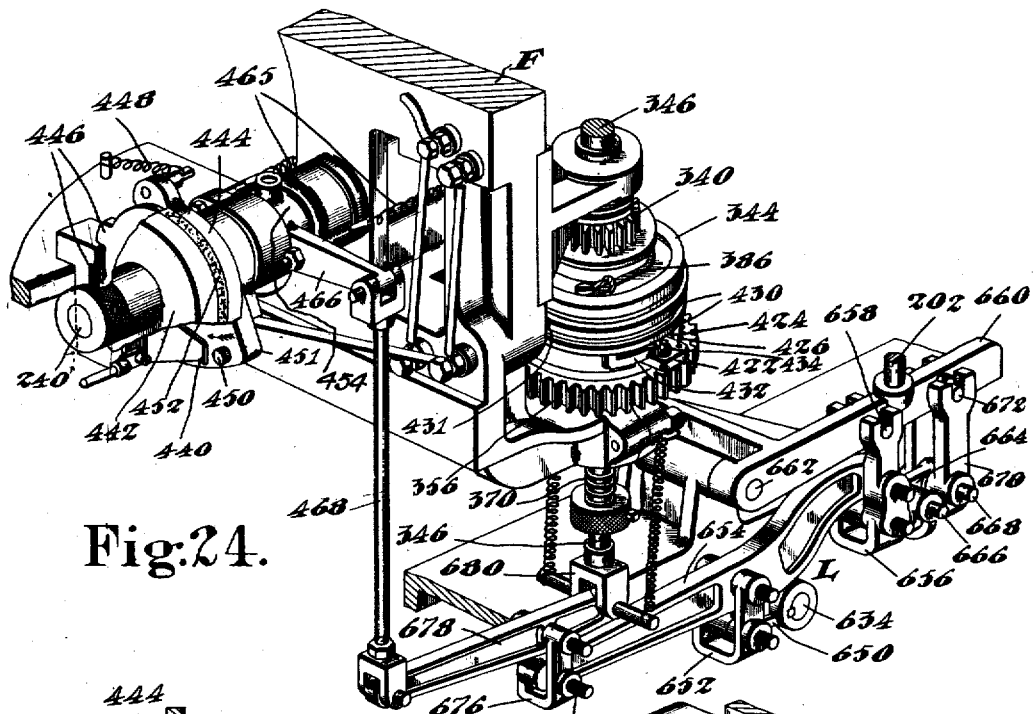

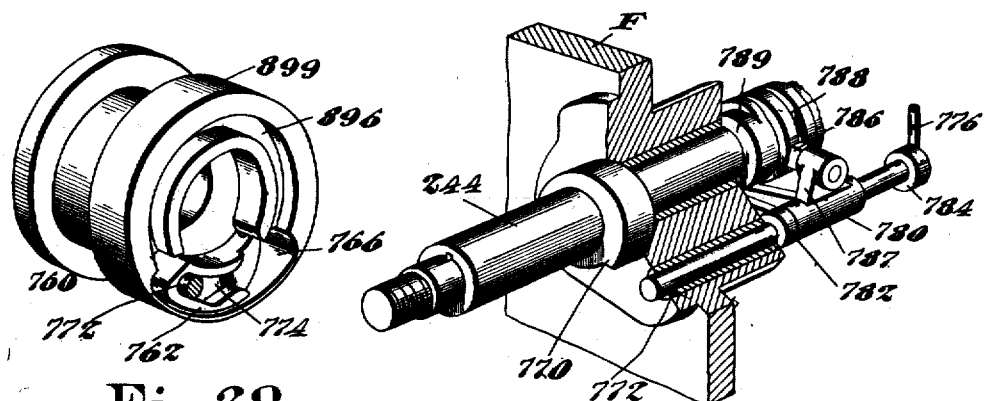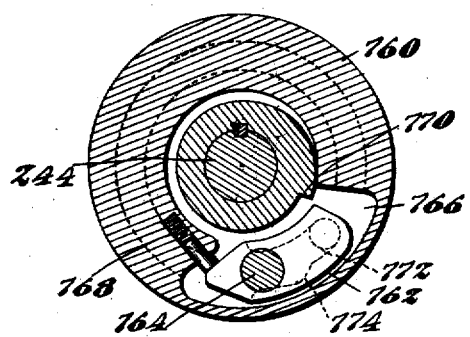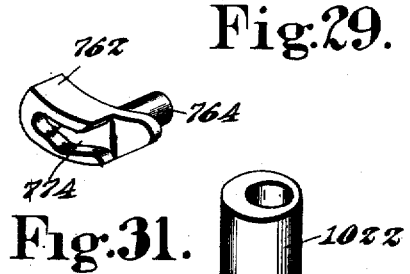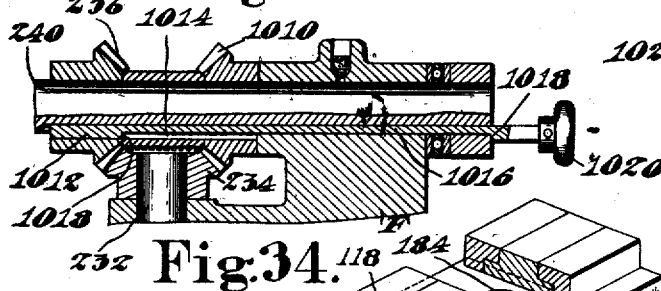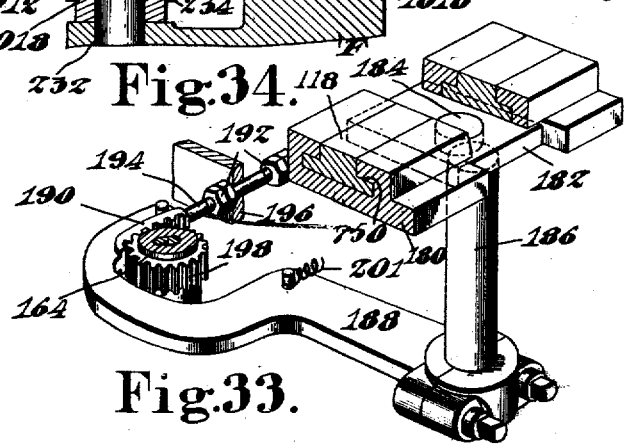

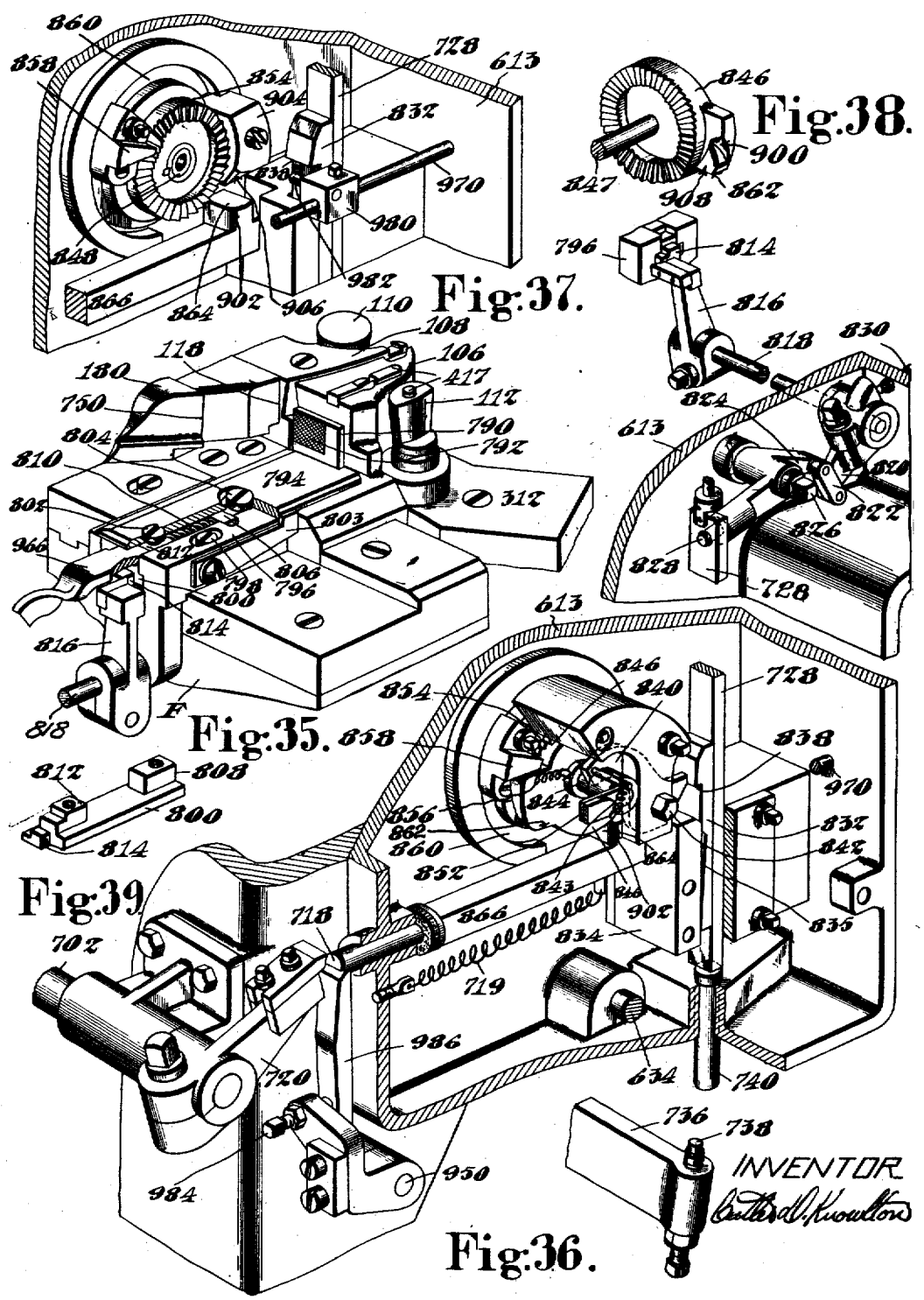

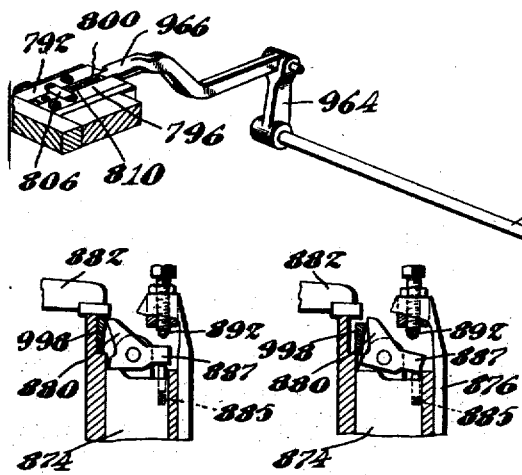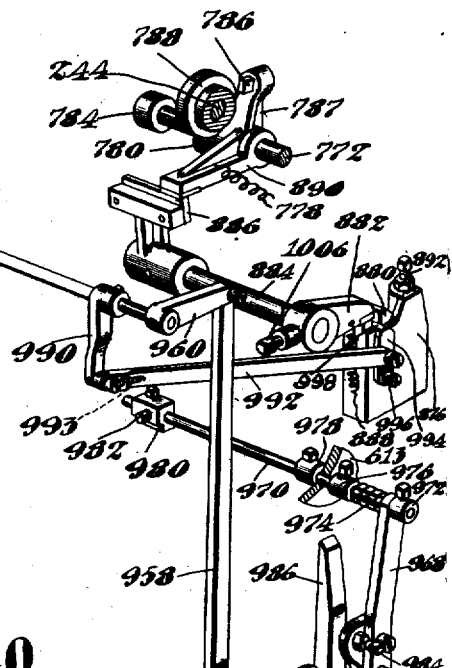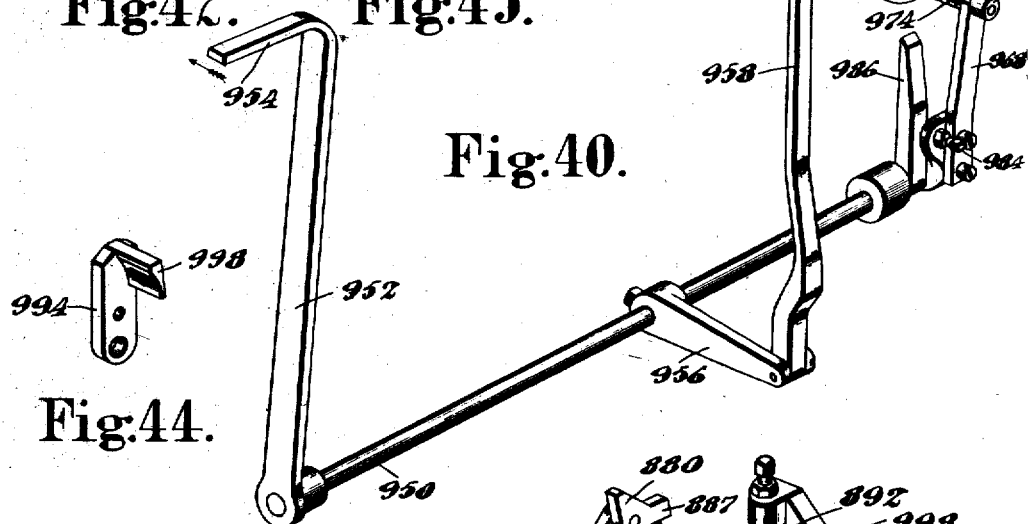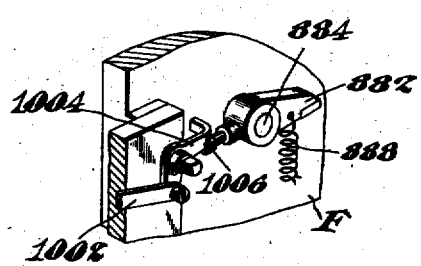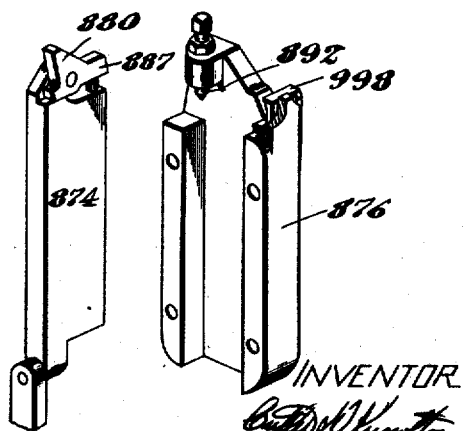

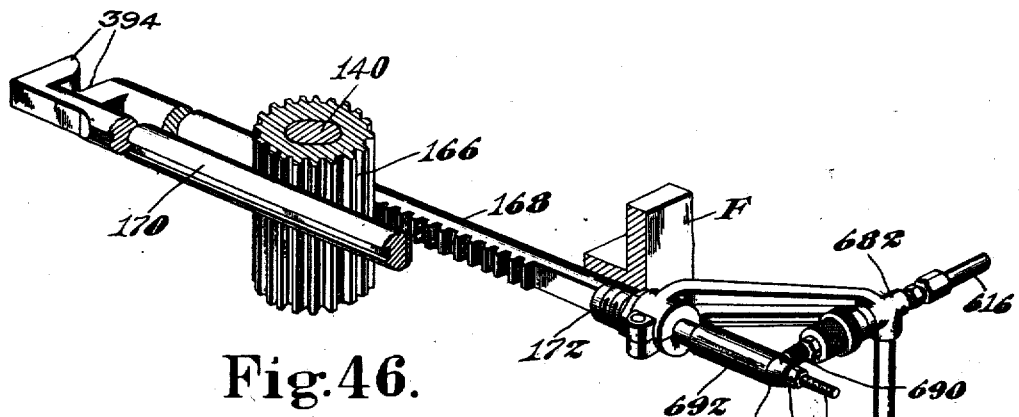
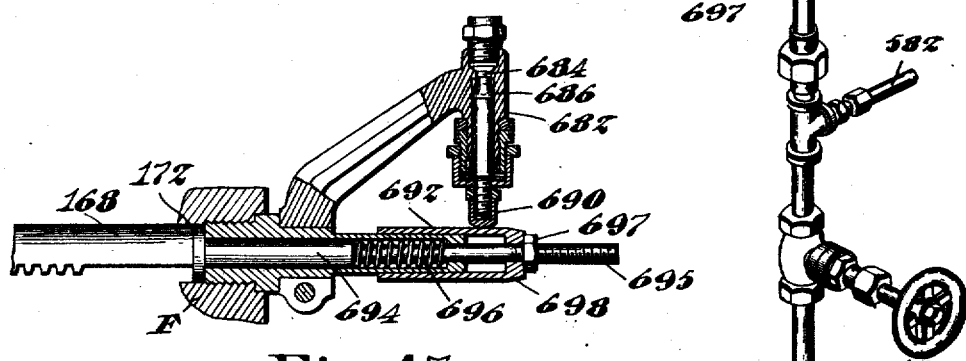
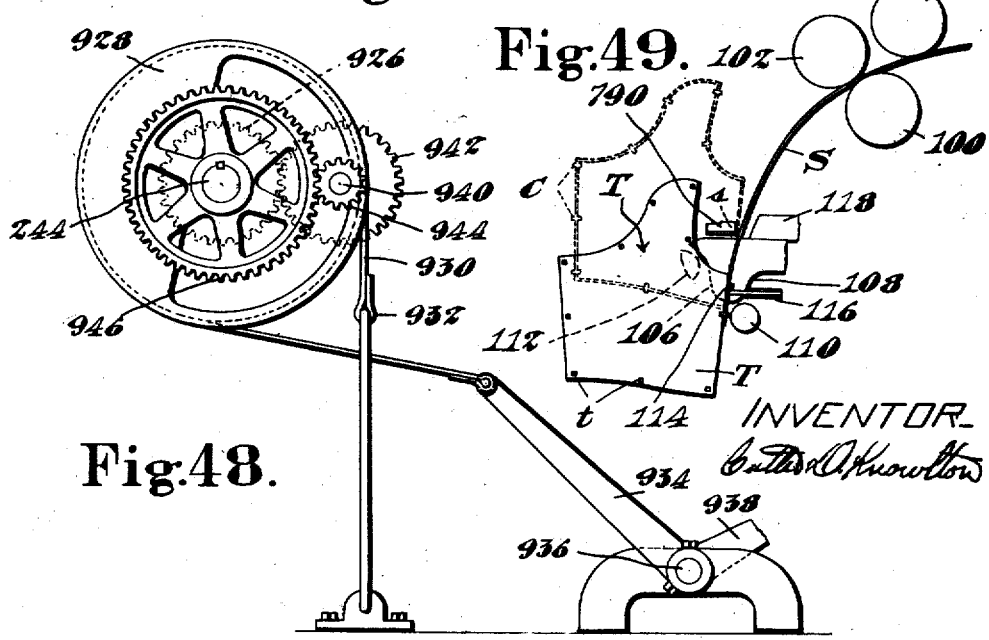

Patented Aug. 26, 1930

1,773,907

UNITED STATES PATENT OFFICE

CUTLER D. KNOWLTON, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR FORMING MATERIAL

Original application filed May 7, 1920, Serial No. 379,586. Divided and this application filed September 6, 1921. Serial No. 498,682.

This invention relates to the bringing of material into predetermined forms, being more particularly concerned with the bending of strips in accordance with a pattern, though it is to be understood that its usefulness is not limited to this field. An important application of its principles is in connection with the formation of the implements commonly termed "clicking dies", which are frequently employed for cutting pieces of leather and fabric to be assembled in shoe uppers. As far as I am aware, these dies have heretofore been made manually, with the assistance only of a simple apparatus, which is utilized for producing the more sharply bent portions. Generally the method pursued is as follows: The workman cuts off a piece of die-stock, which consists of strip steel tapered or frusto-conical in cross-section, the length of the cut portion being sufficient to allow it to be brought to conformity with the periphery of a templet representing the die to be produced, and also including enough stock to overlap for welding. Then, selecting such a point in the cut piece that the weld will come in the proper relation to the angles, a corner is bent to the templet, and thereafter an adjacent side and the succeeding corner. Each bend tends to distort the portion or portions previously formed, and to these corrective bending action must be applied. Naturally, the workman may find, after adjacent angles and an intermediate side have been brought to what is believed to be the contour of the templet, that the distance along the side between the angles does not correspond with sufficient accuracy to this dimension of the templet. If such be the case, it is undesirable to straighten and re-bend the angle on account of the evil effect upon the structure of the metal, so the workman resorts to some such expedient as hammering, or otherwise exerting force upon the stock in one direction or the other, to shorten or lengthen the intermediate side. This is in itself objectionable, since it is likely to distort the work, and if it fails in its purpose the partially completed die must be scrapped and the labor lost. Thus bending, trying to the templet, further bending and correcting, the workman proceeds until the ends of the piece are brought together and are welded. Though clicking die makers may attain a high degree of skill, it will be seen that the operations are at best but a series of approximations, having the further disadvantage of reacting unfavorably upon one another, and that the reforming of parts already operated on is required. The making of these dies manually is consequently relatively slow and expensive.

To overcome such difficulties as above outlined, an object of my invention is to provide a novel machine for progressively forming material under the guidance of a pattern. In the illustrated embodiment of the machine are associated, for the formation of the material, means for restricting its movement, means for effecting relative movement between the restricting means and material, and contact or forming means movable through varying distances depending upon the form of the pattern, the forming means and restricting means acting oppositely upon the material to bring it to the desired form. Preferably, the restricting means consists of separated abutments, between which passes the strip to be bent, or other work, there being means arranged to move across the space between the abutments to bend and thus form the emerging strip. Herein the bending members, of which I have chosen to show two, operating against opposite sides of the work, move in their contact with said work in different directions, so to better impart to it, first smaller departures from its normal extension, and then to move it through greater angles. In the disclosed embodiment of the invention, the abutments not only co-operate with the members in the forming action to resist the movement of the work under forming pressure, but are also movable relatively to clamp it during the operation. This movement is preferably effected under power, as is also that of the forming means. The advance of the work between the abutments for forming is advantageously produced by feeding means, and in this advance of the work, during which it may be bent, it is engaged by means for controlling its formation.

A further object of the invention is to effectively control the elements which co-operate in the forming operation. The form to be imparted being in accordance with a pattern, I control the relation between the operating means and the material operated on through the intervention of a member which is itself governed by the relation between the material and pattern, preferably through contact with said pattern, though it may also engage the material. This control may be exerted upon the feeding means, the forming means, and, if a clamping effect is desired, upon the restricting means. As herein disclosed, the control is through a gaging member, which is movable as the work advances, said gaging member being caused to move as a result of lack of conformity between said work and the pattern. By this movement of the gaging member, an appropriate operating means is controlled. In the illustrated machine, the gaging is accomplished through the agency of differentially movable members contacting with both the pattern and material to measure the distance between them, being unaffected by simultaneous equal travel of the members, and thus avoiding false controlling action by play of the pattern and material. This is of especial importance when the pattern is mounted upon the stock, as in my preferred procedure. Between the gaging member and operating means is a connecting chain, which I have shown as including a plurality of lever-systems and a fluid-pressure system actuating a power mechanism to cause movement to be imparted to the operating means. The fluid-pressure system, which is preferably pneumatic, may have primary and secondary valves, or other controlling devices, governing oppositely acting power means, such as pneumatic cylinders, which may actuate such devices as clutches of the power mechanism. By an arrangement of this character, slight controlling movements of the gaging member may be caused to produce promptly operating forces of any desired intensity acting through the requisite distance.

Under some conditions, as in bending the work through considerable angles, the operation may call for a greater actuating force than at other times to enable the machine to operate most effectively. Another object of the invention, therefore, is to cause an automatic variation in the force to meet such requirements. To this end, the illustrated machine applies a certain initial pressure to the work, and then increases this pressure, and I prefer to govern these variations by the extent to which the work has been operated upon, as the angle through which a bender moves in contact with a strip.

It is also an object of the invention to provide novel heating means when it is desirable to thus facilitate the forming operation, this heating being preferably through the intermediation of the forming means. In the disclosed embodiment of my improved machine, the forming means serves as the terminal of an electric circuit supplying heating current. Another circuit terminal contacting with the work is shown as furnished by the restricting means, or abutments between which the work travels. To most effectively apply the heat, it is controlled in the movement of a member operating upon the work, this control being herein illustrated as exercised by means which produces the movement and by an element under the influence thereof. By this controlling means, the overheating of the stock, either locally at the point of contact or generally between the circuit terminals, is avoided.

The maintenance of the work in the desired plane during its bending is another object achieved by my improved machine. This is gained by supporting in its advance the strip operated upon, this support being by means resisting its deflection out of the plane in which bending takes place, said resisting means being situated in advance of the bending means and movable bodily under the influence of the strip. For this purpose, there herein appears a pivoted arm freely movable in a predetermined plane, and to which the work is clamped.

An additional object of the invention is to dissociate the formed work from the unused portion of the stock from which it has been produced, and for the accomplishment of this object I combine in a novel manner with forming means a means for severing the formed material. Preferably, cutting means co-operates with the restricting abutments between which the work travels in its formation. When the abutments move relatively to exert a clamping effect, the cutter may share in such relative movement.

Still another object of the invention is to establish a control of the machine by the work, as in initiating or stopping the action of certain mechanisms. Particularly is this of value at the completion of the forming operation, when it is desired to stop the machine automatically and sever the formed work. I may utilize for this purpose, in a new combination, a member with which the work contacts, communicating thereto a movement affecting said controlled mechanisms. Of such controlling organizations, I prefer to provide one which includes means for changing the operation upon the work, together with means for holding said changing means in one position, and means for moving it to another position. This last-mentioned movement may be utilized to stop the operation of the machine. Another controlling organization includes a normally inactive connector between power means and means for operating upon the work, and also means governed in the operation of the machine or by the work for releasing the connector. This release may bring about the action of the cutter.

Other objects of the invention involve certain subsidiary features, including the imparting of an initial curvature to the stock, the prevention of oxidation at its heated portion, and the control and adjustment of various elements and mechanisms in the machine, this control being both automatic and manual.

In the accompanying drawings.

Figure 3:
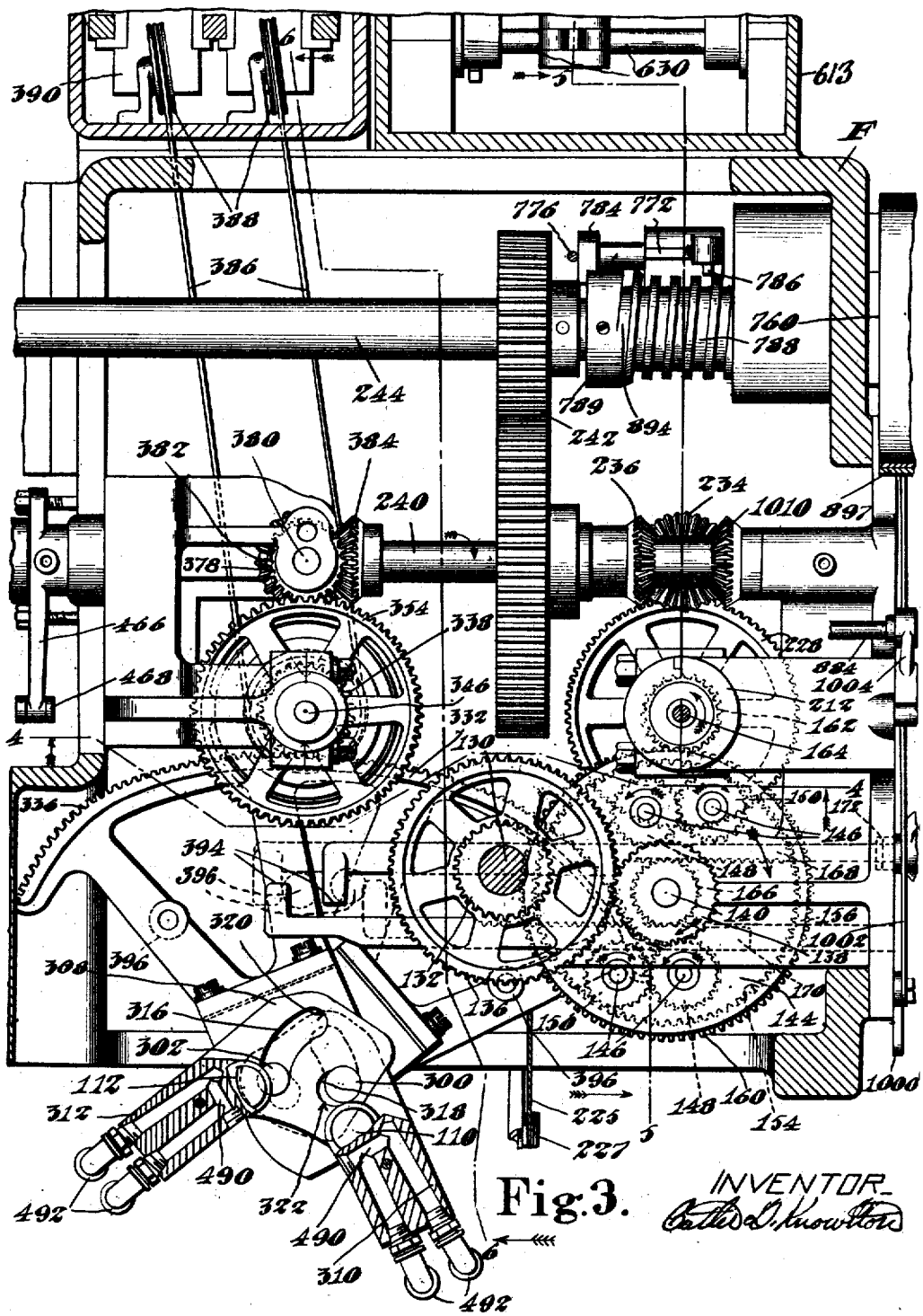
Fig. 3 is an enlarged horizontal section on the line 3—3 of Fig. 2.
Figure 4:
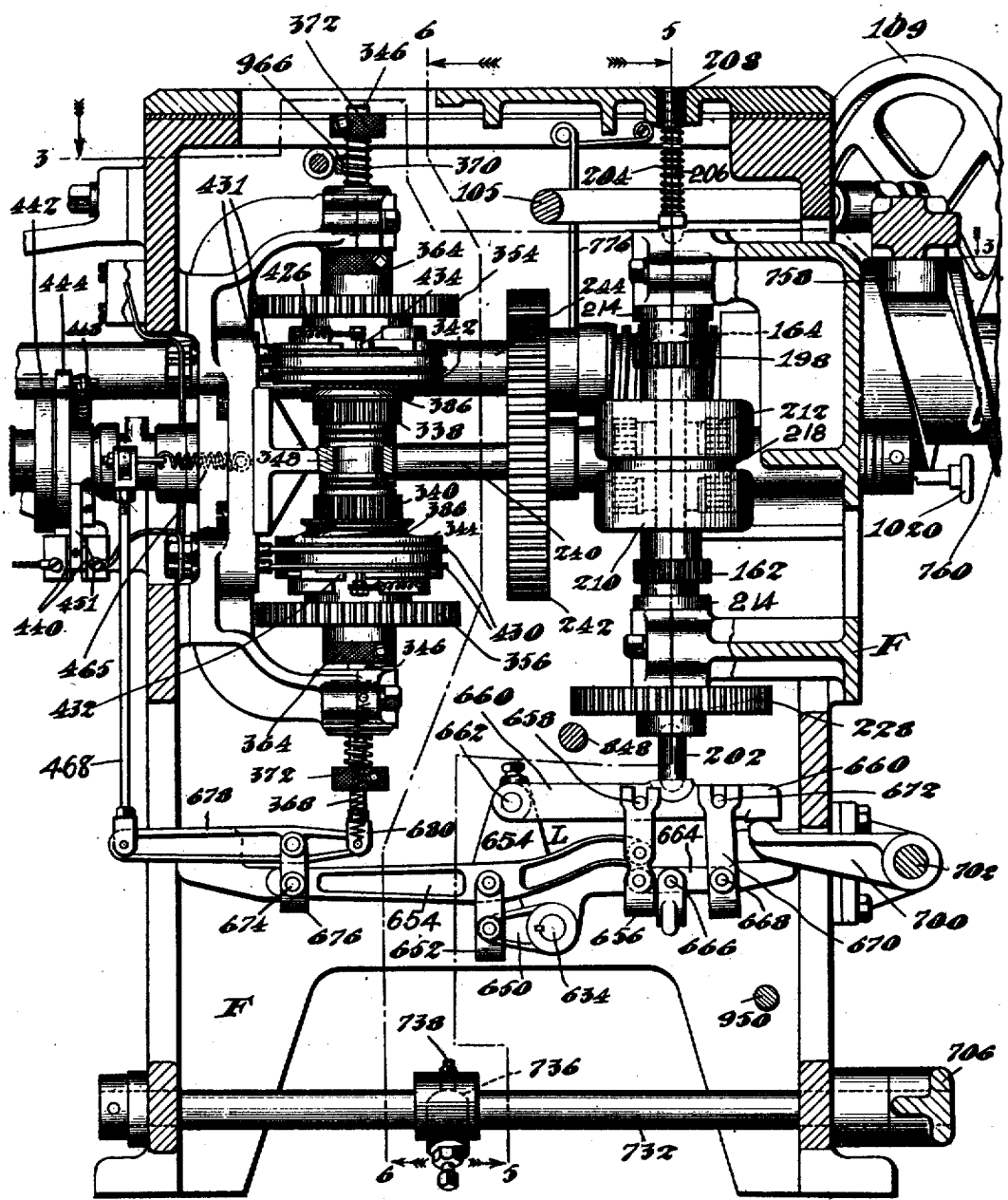
Fig. 4 is a vertical section upon the line 4—4 of Fig. 3.
Figure 5:
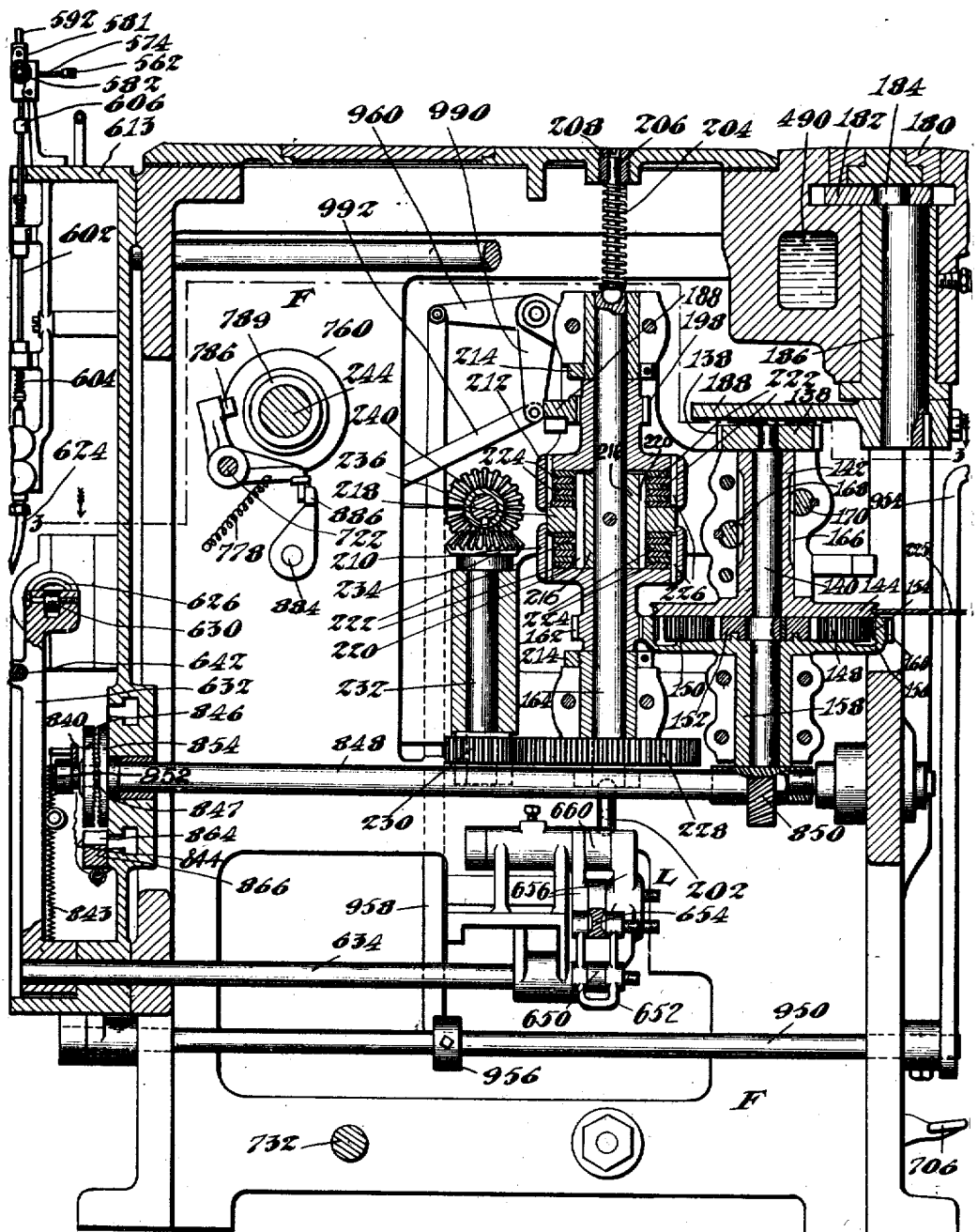
Figure 6:
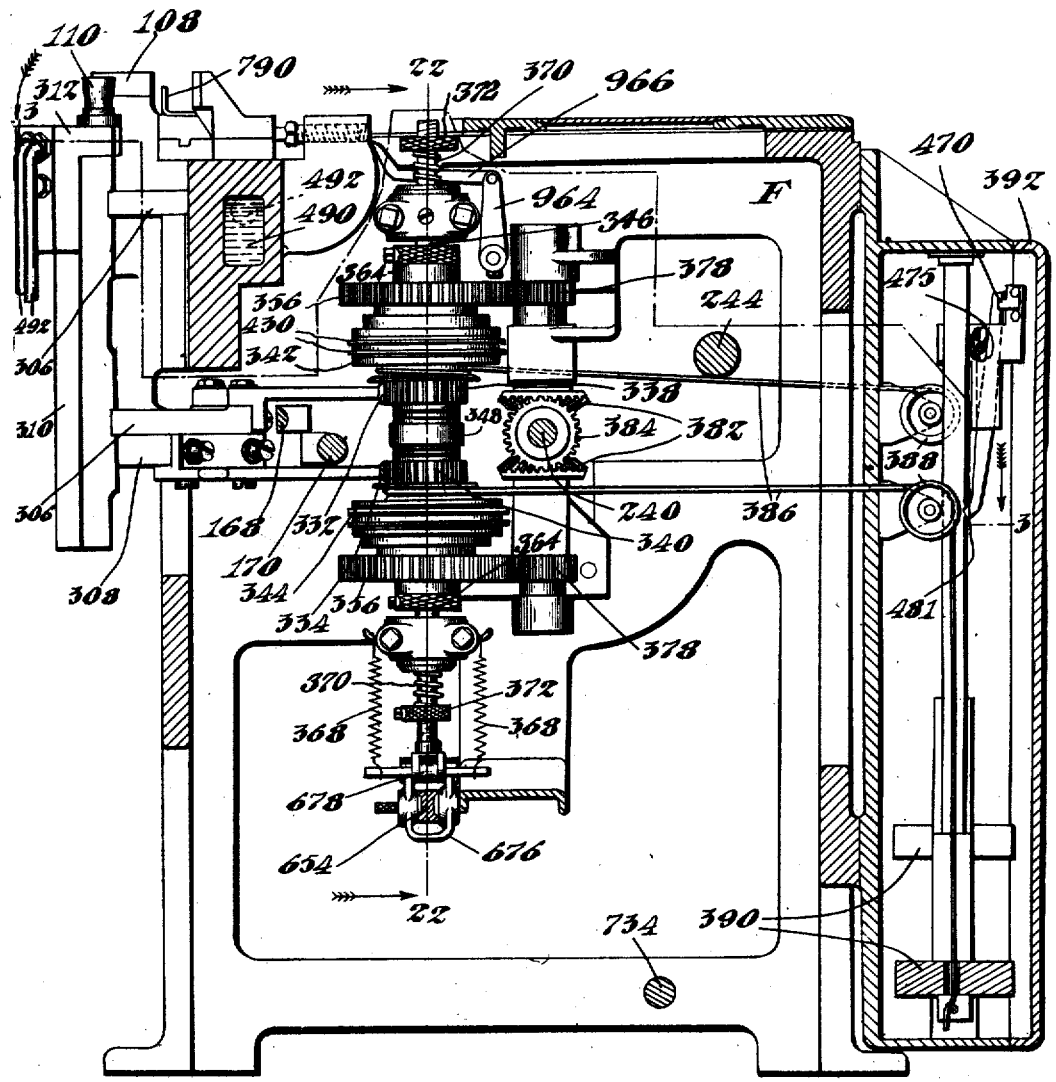
Figure 7:
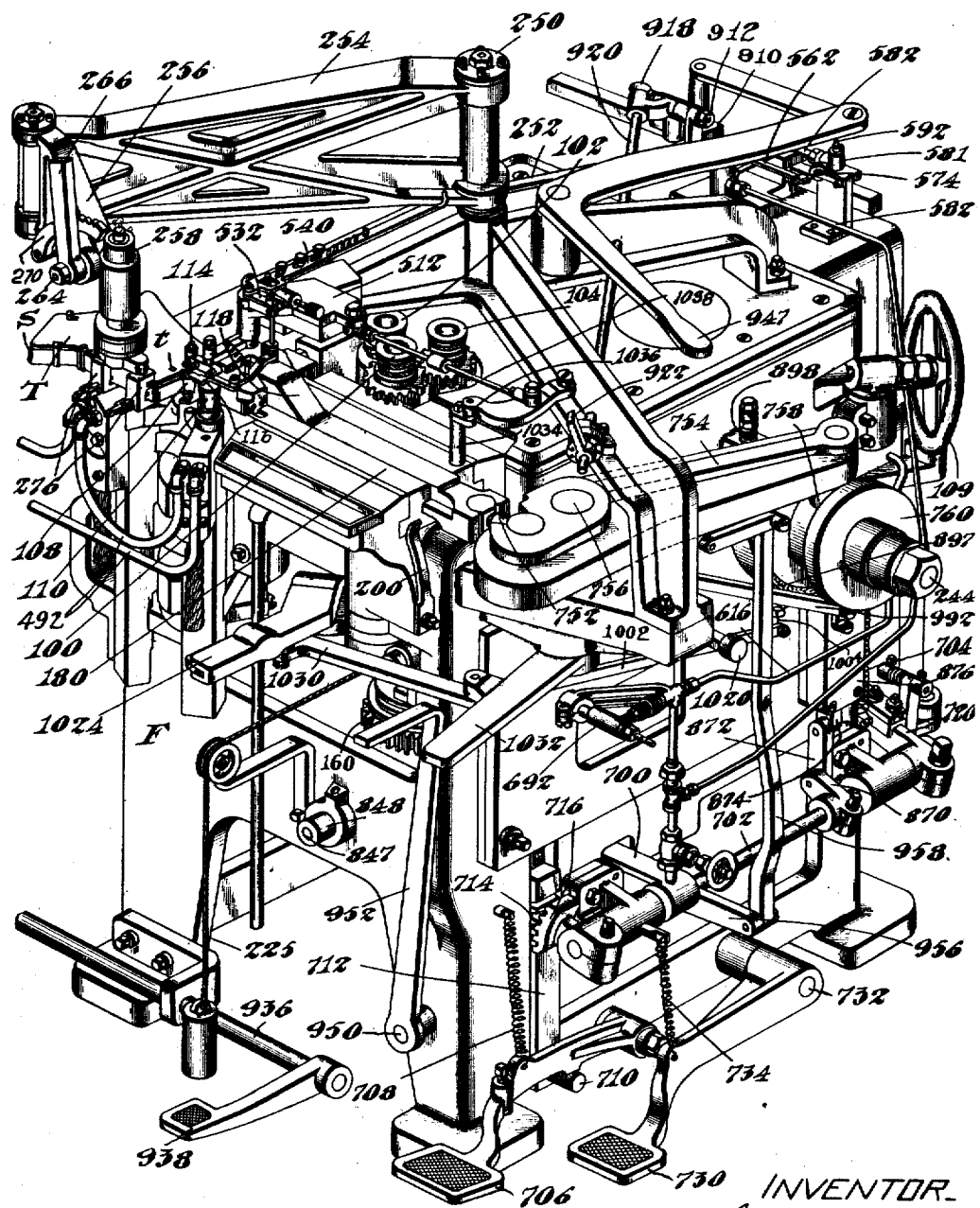
Figures 20, 21, 22, 23:
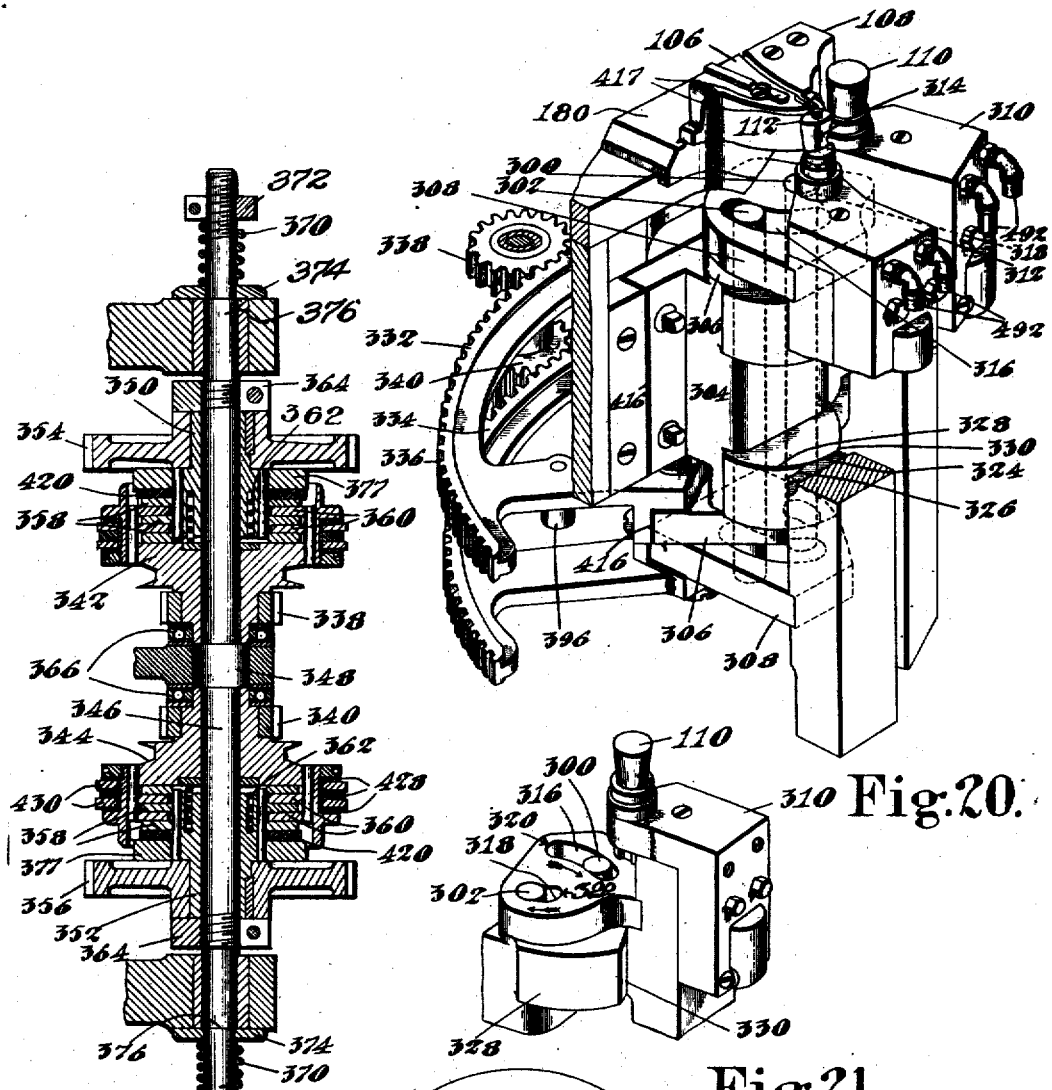
Figure 27:
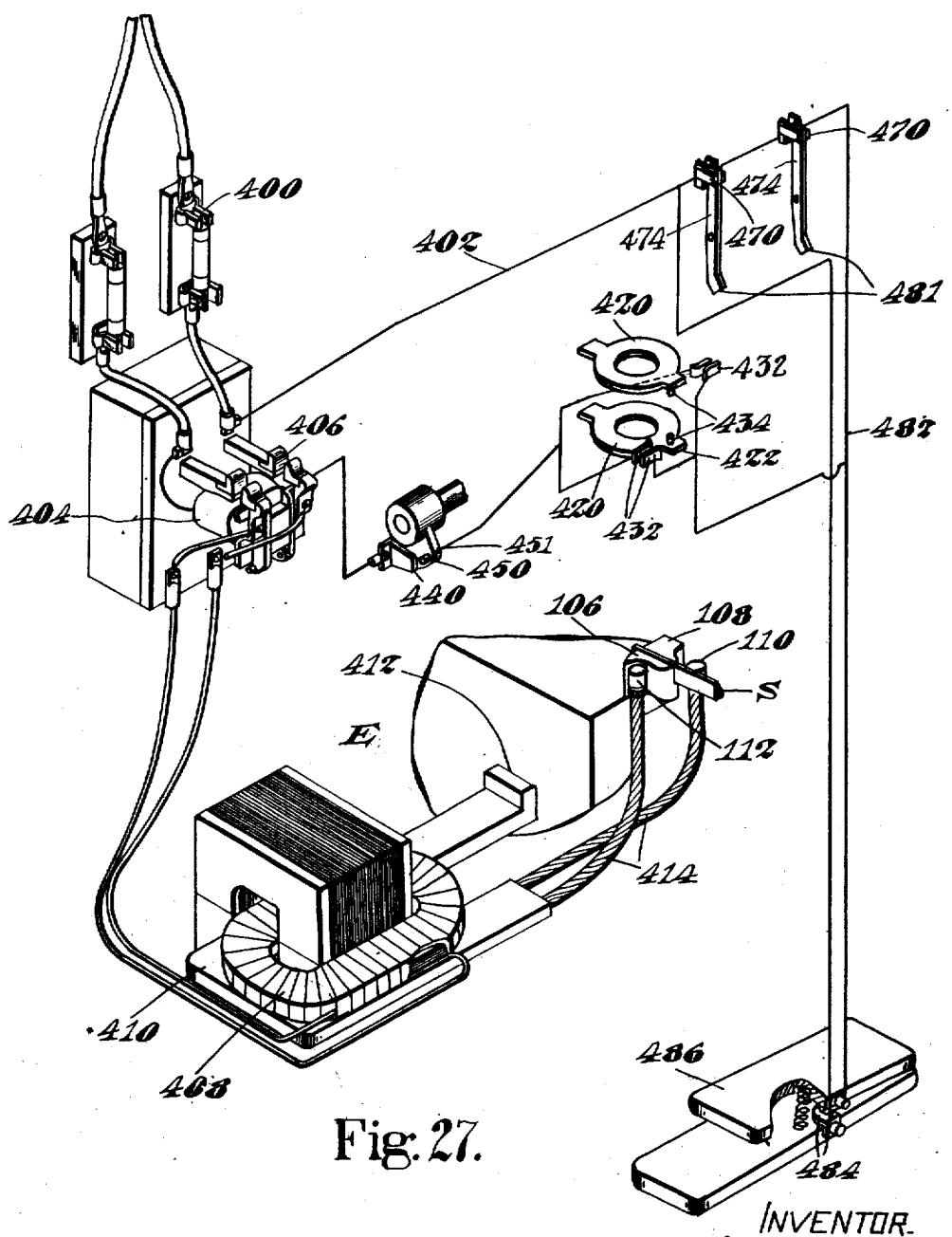

Figs. 5 and 6 are similar views upon the lines 5—5 and 6—6, respectively, of Figs. 3 and 4;

Fig. 7 is a perspective view of the entire machine;

Fig. 8 is a detail in elevation of the controlling mechanism for the work-feeding, clamping, bending and heating mechanisms;

Figs. 9 and 10 are sectional details of the primary valve of such controlling mechanism;

Fig. 11 is a like view of a portion of the secondary valve;

Fig. 12 shows in perspective the work-clamping and bending members, with the more closely associated portions of the controlling mechanism and supporting device;

Fig. 13 is a similar view of the primary valve-portion of the controlling mechanism;

Fig. 14 is a detail in plan of a portion of the feeler connections;

Figs. 15 and 16 are vertical, sectional details of the work-supporting device;

Fig. 17 illustrates in perspective a work-engaging portion of the support;

Figs. 18 and 19 show in perspective two forms of a device for securing the work to the templet;

Fig. 20 is a perspective of the clamping and bending members with their supporting and actuating elements;

Fig. 21 illustrates one of the bending members in perspective;

Fig. 22 is a central, vertical sectional detail through the bending and heat-controlling clutches on the line 22—22 of Fig. 6;

Fig. 23 shows, separated, a set of contact members associated with one of these clutches;

Fig. 24 is a perspective view, bringing out more particularly the circuit-controlling means for the heating current;

Fig. 25 is a longitudinal section taken from the left-hand portion of Fig. 24;

Fig. 26 presents in perspective the current-limiting mechanism;

Fig. 27 illustrates diagrammatically the electrical circuit of the machine;

Fig. 28 is a detail in perspective of the cutter-actuating cam;

Fig. 29 shows in a like manner the mechanism for causing the actuation of the cutter-cam;

Fig. 30 is a transverse section through the cam and a portion of its actuating mechanism;

Fig. 31 is a perspective detail view of the connecting pawl for the cam;

Fig. 32 illustrates in perspective the latching arm for moving the jaws manually;

Fig. 33 similarly discloses the actuating elements directly connected with the movable clamping jaw;

Fig. 34 is a vertical section through the mechanism for reversing the feed of the work;

Fig. 35 shows in perspective a portion of the mechanism associated with the clamping jaws for initiating the action of the cutting mechanism and automatically stopping the operation of the machine;

Fig. 36 similarly illustrates another portion of this mechanism;

Figs. 37, 38 and 39 are detail perspectives of component parts appearing in Figs. 35 and 36;

Fig. 40 is a perspective view of mechanism for manually stopping the operation of the machine;

Fig. 41 shows, separated and in perspective, co-operating elements of this mechanism;

Figs. 42 and 43 are vertical sections illustrating two positions of means for preventing operation of the cutting mechanism when the machine is stopped manually;

Fig. 44 is a detail in perspective of one of the elements of the last-mentioned figures;

Fig. 45 illustrates in perspective a portion of the mechanism for controlling the actuation of the cutter manually;

Fig. 46 is a perspective view of mechanism for increasing the pressure of the pneumatic system for completing a bending operation;

Fig. 47 is a horizontal section through the air-controlling portion of Fig. 46;

Fig. 48 shows the reducing gearing of the machine in side elevation; and

Fig. 49 illustrates diagrammatically elements of the machine acting directly upon the work.

Principal elements of the machine and general procedure

Referring particularly to Figs. 7, 12 and 49, let it be assumed that it is desired to form a strip of metal S to the contour of a templet T to produce a clicking or other cutting die. For this purpose, there are mounted upon a suitable casing or frame F, and co-operating directly with the strip, feeding rolls 100, 102 and 104, jaws 106 and 108, benders 110 and 112, feeler or form-determining members 114 and 116, and a cutter 118. The rolls are driven to intermittently advance the stock at a predetermined rate, the roll 104 being so related to the common tangent to the rolls 100 and 102, that the stock in passing between them, as appears in Fig. 49, has imparted to it a slight uniform curvature. This, at the end of the forming operation, since a closed figure is being produced, will prevent the ends of the stock from coming into contact, and will permit one to overlap the other for the purpose of joining them by welding. These rolls deliver to the jaws 106 and 108, respectively fixed and movable, between which the work is restricted as to lateral movement for forming, being also, in the present instance, held positively during intermissions of feed. While thus held, the stock is forced laterally over the ends of the jaws, in one direction or the other, into conformity with the templet by the benders, which are arranged to oscillate across the opening between the jaws and for some distance along each side thereof. These actions are under the control of the feeler, which, as illustrated herein, is duplex, contacting with both the templet and the stock. In this way it may be caused to gage the distance between the two, or to exercise its controlling function solely because of the departure of the stock from the templet. This eliminates errors which might be introduced by a play of the stock and templet together between the jaws. The cutter acts, after the stock has been bent about the entire templet, as appears in dotted lines in Fig. 49, to sever it from the body of the strip fed. First the stock is advanced in the direction of its longitudinal axis by the rolls between the jaws, and then the templet, which has openings t distributed about its periphery, is secured to the stock, as by clips C, which may be either rectangular in section, as appears in Fig. 18, or round, as is illustrated in Fig. 19. In either case, each clip has a short arm 50, arranged to enter a templet-opening t, and a long arm 52, somewhat spaced from the arm 50 and provided with an inwardly bent end 54 adapted to pass beneath the edge of the stock to hold it more firmly to the templet. This attachment by the clips is successively made manually as the forming operation proceeds. When the formation of the die to the templet is completed, the machine is stopped and the formed stock cut from the remainder automatically, controlled by mechanisms the actions of which is initiated by the contact of the forward extremity s. The clips are then removed, and the die is ready for the joining of its adjacent extremities.

While the elements just outlined furnish efficient means for bending a die in a wholly automatic manner, it is not to be understood that all or any particular one of these is essential, they being capable of co-operating in various useful combinations, as will hereinafter be defined in the claims.

Feeding, clamping and supporting mechanisms

Figure 1:
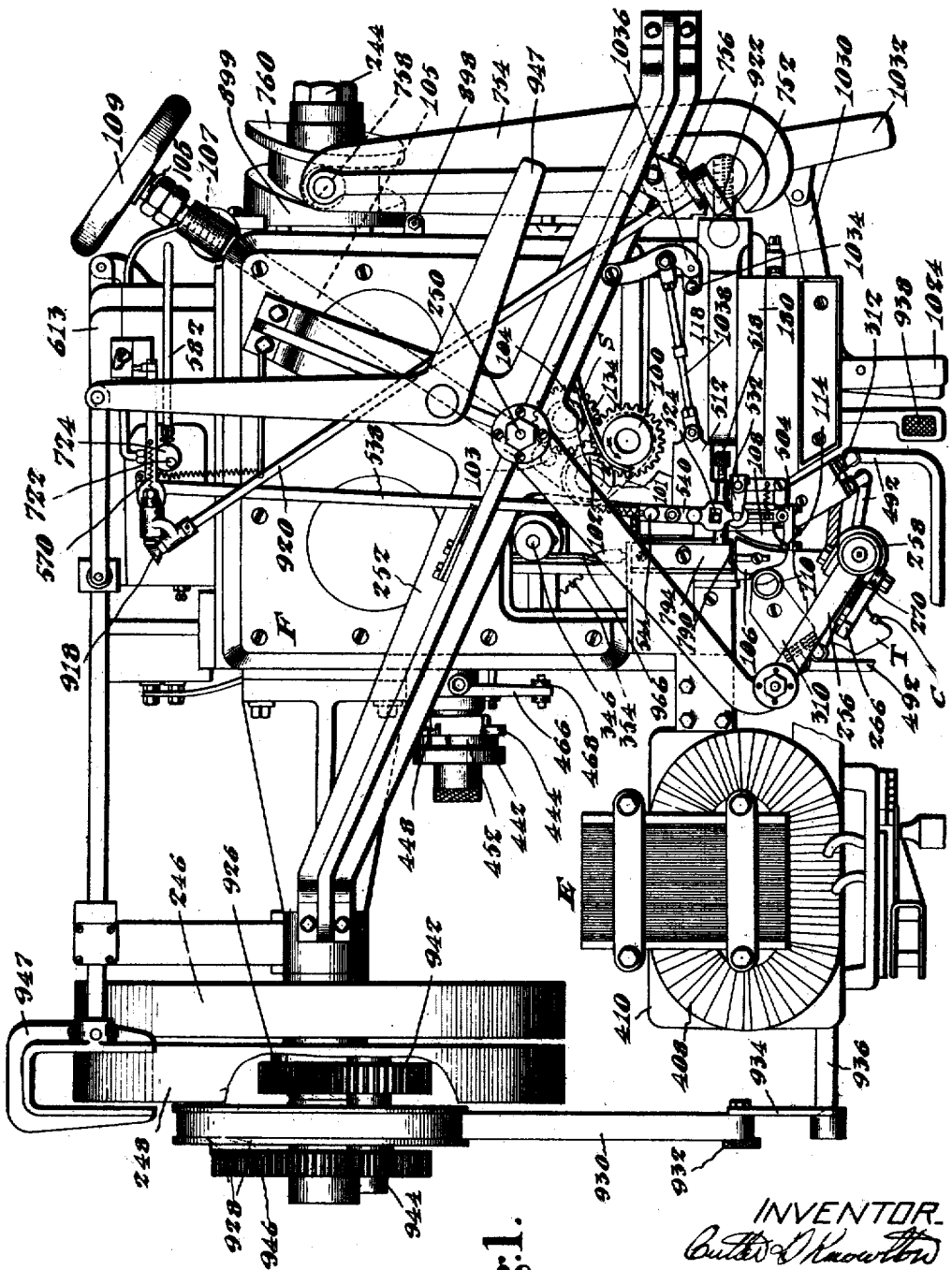
Figure 1 is a top plan view of one of the many embodiments which my improved forming machine may assume.
Figure 2:
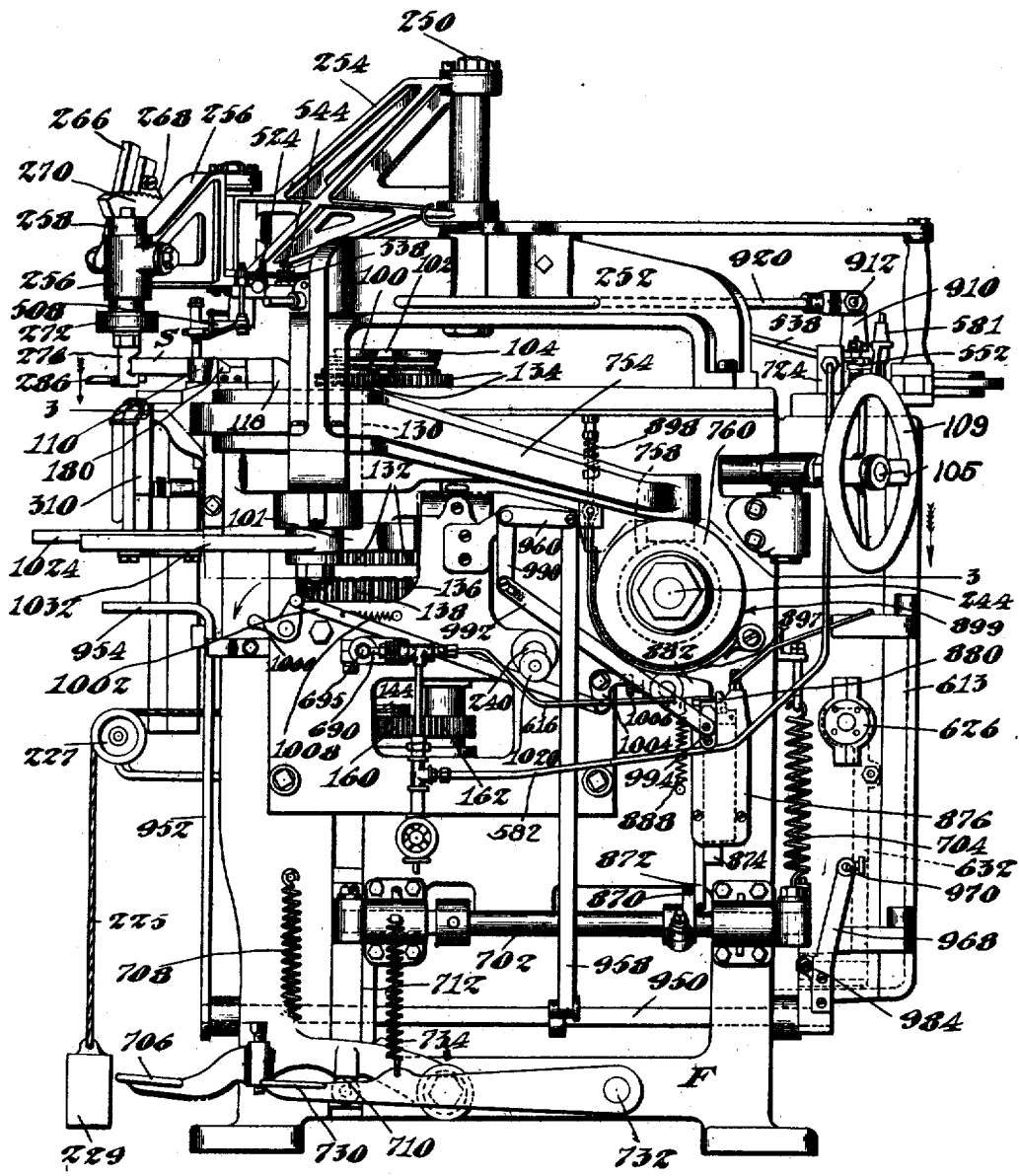
Fig. 2 is an end elevation, taken from the right in Fig. 1.

The feeding rolls are best shown in Figs. 1, 2, and 7, and their actuating mechanism in Figs. 3, 4 and 5. The roll 100 is secured upon the upper end of a shaft 130, journaled in the frame about a vertical axis. Pairs of pinions 132, 132 and 134, 134 (Fig. 2) respectively connect the shaft 130 with the shafts of the rolls 102 and 104, these being mounted rotatably adjacent to the roll 100 and turning in the direction indicated by the arrows in Fig. 1. To alter the relation of the bite of the rolls 100 and 102 to the roll 104, and thus change the degree of curvature imparted to the stock, the roll 102 may be journaled in a member 101 arranged to be swung about the shaft 130. The swinging member has pivoted to it at 103 a rod 105 threaded at 107 through a portion of the frame. A handwheel 109 facilitates the turning of the rod by the operator, and this, through the longitudinal travel produced by the thread, brings about the desired adjustment of the roll 102. The stock from which clicking dies are made is usually tapered in cross-section, and, to permit the rolls to co-operate properly with this, their peripheries are inclined reversely to the taper of the stock. At the lower end of the shaft 130 is fixed a gear 136, with which meshes a pinion 138 fast upon a shaft 140 journaled vertically near one side of the frame (Figs. 3 and 5). About the upper portion of this shaft 140 is a loose sleeve 142, having formed at its bottom portion a disk 144. From opposite sides of the disk depend pairs of studs 146, 146, about which are rotatable pairs of co-operating pinions 148, 150, 148, 150. Each of the pinions 148 meshes with a pinion 152 keyed upon an enlargement near the center of the shaft 140. The pinions 150 both mesh with an internal gear 154, carried upon the upstanding annular edge of a disk 156, which may be integral with the upper extremity of a sleeve 158 surrounding the lower portion of the shaft 140. The edge of the disk 156 also has at its outside gear-teeth 160 acting upon a pinion 162 surrounding a clutch-shaft 164 journaled for rotation parallel to the shaft 140. About the sleeve 142 are elongated gear-teeth 166, which are engaged at opposite sides of the sleeve by rack-bars 168 and 170 mounted to slide upon the frame. If power is applied to the disk 156 from the clutch-shaft 164 by the pinion 162 while the pinions 148 and 150 are free to revolve about the axis of the shaft 140, rotation is not imparted to the roll-shaft 130. When, however, the rack-bar 168, moving toward the right as viewed in Fig. 3 of the drawings, strikes the head 172 of a plunger, mounted to move in the frame for a limited distance (Fig. 46) and then acting as a stop, it is held against further advance in this direction and arrests the revolution of the pinions. These now act, by rotation about their axes, to transmit power from the shaft 164 to shaft 130 to drive the feed-rolls by way, successively, of the pinion 162, gear-teeth 160, disk 156, gear-teeth 154, pinions 150, pinions 148, pinion 152, shaft 140, pinion 138 and gear 136. The movement of the head 172, produced by the rack-bar 168, performs another function, which will be later described.

The clamping jaws 106 and 108 are most clearly illustrated in Figs. 1, 2, 7, 20 and 35, while for their actuating mechanism further reference may be had to Figs. 4, 5 and 33. The jaw 106 is fixedly attached to the top of the frame, while the jaw 108 is carried by a slide 180 movable in ways formed in the upper plate of the frame. The co-operating faces of the jaws are shown as curved, approximately upon arcs of large radii corresponding to the initial bend imparted to the stock by the feeding rolls. In the under side of the slide 180, in a transverse groove, is situated a block 182 (Fig. 33), having an opening to receive the eccentric end portion 184 of a vertical shaft 186 rotatably supported beneath the top plate of the frame. Attached to the lower extremity of the shaft 186 is an arm 188, the curved end of which is formed with a gear-segment portion 190, and having its throw limited by pairs of nuts and check-nuts 192 threaded upon a rod 194 fixed to the arm and contacting with the opposite sides of a frame-portion 196. The rack 190 is engaged by a pinion 198 surrounding the clutch-shaft 164. When this pinion is rotated by the clutch-shaft, it oscillates the rack-arm 188, turning the eccentric 184, and through the block 182 shifting the slide 180 in its ways to carry the jaw 108 into clamping co-operation with the jaw 106. A leaf-spring 200 (Figs. 7), fixed upon the frame and bearing against the outer extremity of the slide 180, takes up lost motion between said slide and the eccentric, while a helical spring 201 (Fig. 33), extending between the arm 188 and the frame, exerts its tension, when the clutch-shaft pinion is not driving the rack, to relieve the pressure of the movable clamping jaw.

The pinions 162 and 198 of the feeding rolls and clamping jaws respectively receive their rotation from co-operating clutch-casings upon the shaft 164, for which see Figs. 3, 4 and 5. This shaft is stepped at 202 for vertical movement upon a lever system L, hereinafter more particularly described, against the tension of a spring 204 surrounding a rod 206, which rod bears against the upper end of the shaft and slides through an adjustable bushing 208 in the frame. By changing the position in the frame of this bushing, which serves as an abutment for the spring as well as a guide for the rod, the resistance which the spring exerts to movement of the shaft may be varied. The feeding pinions 162 and 198 are formed, respectively, upon the hubs of casings 210 and 212, which have open sides adjacent to each other, and are normally loose upon the shaft 164. These casings are held against movement from one another by thrust collars 214, abutting against the frame. Within the casings there is fixed to the shaft a sleeve 216, having secured upon it a central collar 218. Splined for longitudinal movement at 220 upon the sleeve are friction-disks 222, and interleaved with these, between the hubs of the casings and the collar 218, are disks 224, splined at 226 upon the casings. These groups of disks, when forced into frictional engagement, provide for the rotation either of the mechanism for driving the feeding rolls or that which actuates the clamping jaw. The parts are so related that the disks of the feeding clutch 210 are normally in active engagement, the position of the system L permitting the spring 204 to force the disks 222 and 224 together between the collar 218 and the head of the casing, to drive the pinion 162 from the shaft 164. When the shaft is raised by the lever system, the collar 218 moves out of contact with the upper feeding friction-disk, to release this clutch, and against the lower disk of the clamping clutch, pressing this set of disks together to cause the actuation of the pinion 198. Upon the lowering of the shaft 164 by the lever system, the action is reversed, the clamping clutch being released and the feeding clutch again engaged. The periphery of the disk 144 is grooved to receive a cord or flexible member 225 (Fig. 2), the end of which is secured in the groove, passing partly above the periphery of the disk, then over a guide-pulley 227 rotatable upon the frame, and having fastened at its free end a weight 229. This weight acts in opposition to the feed-clutch to assist in the reverse movement of the rack-bars 168 and 170 against the drag or residual driving force of the disks of the casing 210 when these are not subjected to driving pressure. This effect may be increased or diminished by changing the weight. The shaft 164 is constantly rotated through a gear 228 secured just above its bearing, and meshing with a pinion 230 fast upon a vertical shaft 232 journaled in the frame. This shaft 232 is rotated by bevel-gears 234 and 236 from a horizontal shaft 240, mounted for continuous rotation midway of the frame. The shaft 240 has movement transmitted to it by spur gearing 242 from a main driving shaft 244, which may receive power through pulleys 246 and 248 (Fig. 1) from any convenient source.

It is preferable, as the stock is fed forward by the rolls between the jaws, to maintain its advancing portion in a horizontal plane, both supporting its weight and resisting the tendency to vertical deflection which is especially liable to result in connection with the bending of material having a tapered cross-section, as in clicking-die stock. For this purpose, a stock-carrier, freely movable in all directions horizontally, is provided. As is illustrated generally in Figs. 1, 2 and 7, and in detail in Figs. 15 to 17, inclusive, there is pivoted upon antifriction bearings at 250, about a vertical axis upon an upper frame-portion 252, an arm 254. At the outer extremity of the arm 254 is similarly pivoted an arm-section 256. This section carries at its end a vertical sleeve 258, adjustable through the arm by a pinion 260 engaging rack-teeth 262 formed in the sleeve. The spindle 264 of the pinion 260 is extended through the side of the arm-section 256, and has secured upon it a handle 266, provided with a pivoted detent 268 engaging ratchet-teeth upon a segment 270 fixed to the section. By means of this rack and pinion, the supporting instrumentalities carried by the sleeve 258 may be raised or lowered to properly aline them with the stock. Swiveled at 272, to receive with little friction both upward and downward thrust, is a yoke 274, upon the vertical arms of which are swiveled stock-engaging members 276, 276. These members are recessed at 278 to receive the stock, which is secured in the recesses by clamps, consisting of stems 280 movable through the members and having hooks 282 which may be turned up to engage the stock. Springs 284 surround the stems of the clamps, and act to hold the hooks out of engagement with the stock. The clamping effect may be obtained by cam-levers 286, pivoted upon the ends of the stems opposite the hooks and arranged to be turned with their cam-ends engaging the members 276 to draw the hooks against the stock. After the stock has been secured in place in the members 276 and given the proper vertical adjustment by means of the rack and pinion, the arm-portions 254 and 256 will swing freely as the stock is fed by the rolls, giving a constant support to said stock without interfering with its advance.

*Bending mechanism and heating devices*

Upon emerging from the jaws 106 and 108, the stock comes under the influence of the bending members 110 and 112. As appears most clearly in Fig. 20 and also in Figs. 1, 2, 3, 6, 7 and 21, stationary guide-rods 300 and 302 are supported vertically, somewhat spaced from each other upon a bracket 304, secured at one side of the main frame. Fulcrumed upon these rods are pairs of arms 306, 306 and 308, 308 of bender-carriers 310 and 312, respectively. These carriers oscillate beneath the jaws, and have fixed upon their upper surfaces, in close proximity to the jaws, the benders 110 and 112. The former is shown as circular in horizontal section, though being tapered downwardly to conform to the die-stock; while the latter is similarly tapered, and is also reduced or cut away at 314, since this member comes at the inside of the die as it is being bent, and this reduction in its transverse dimension permits it to lie within the acute angles which it may be necessary to form. The rods 300 and 302 furnish plural fulcra or axes, that first mentioned acting in slots 316, formed in the carrier arms and being curved in an arc described about the axis of the rod 302 when this is positioned as in Fig. 21, and the rod 302 acting in each arm in a shorter slot 318, which is also arcuate, having as a center the axis of the rod 300 when occupying the left end of the slot 316. Fig. 21 shows the bender 110 near its position of extreme withdrawal from the stock. When this bender moves in its forming action, its carrier first swings about the rod 302 as a pivot, the bender at this time traveling along the side of the jaw 108. This continues until the end wall 320 of the slot 316 of each carrier arm contacts with the rod 300, which thereupon becomes the pivot, the movement of oscillation of the bender now occurring while the slots 318 of the arms move along the rod 302 until this is struck by the end walls 322 of the last-mentioned slots. During this second portion of the movement, the bender is carried in a path across the ends of both jaws, and to some extent along the side of the opposite jaw 106. The action of the bender 112 is similar in character to that just described, the travel occurring first along the outer wall of the jaw 106, and then across its end and that of the jaw 108. Co-operating with the slots in the bender arms to constrain the benders to move in the desired paths, are surfaces 324 and 326 formed upon inner vertical walls of the carriers and contacting with surfaces 328 and 330, respectively, opposed to them upon the bracket 304. These walls have centers of curvature coinciding with those of the slots. When movement of the carriers is occurring about the pin 302, the walls 324 and 328 are in co-operation, resisting movement of the benders out of their predetermined courses in the opposite direction from the restraint exerted by the rods and slots. When the pivotal axis shifts to the rod 300, the contact is between the surfaces 326 and 330, acting in precisely the same manner.

Attached to the carriers 310 and 312 are gear-segments 332 and 334, respectively, with portions at opposite sides of point 336 curved in arcs of different radii, corresponding to the slots 316 and 318, respectively. This is most clearly seen in Fig. 3 of the drawings. With these segments mesh pinions 338 and 340, respectively, fast upon clutch-casings 342 and 344, rotatable about a spindle 346 (Figs. 4, 6 and 22). This spindle is pivotally connected to be moved vertically by the lever-system L, and is guided by bearings in the frame, including a central support for an enlargement 348 upon the spindle, this being interposed between the casings, the ends of the hubs of which contact with it at opposite sides. Rotatable about the spindle are sleeves 350 and 352, portions of which extend, respectively, into the casings 342 and 344. Upon these sleeves are respectively keyed gears 354 and 356. The sleeves and casings furnish the bodies of opposite clutch members, and to the former are splined, as in the feeding and clamping clutches, friction-disks 358, while to the latter alternate contacting disks 360 are similarly splined. Springs 362, located in annular recesses at the inner ends of the sleeves, exert their force to hold the clutch-disks normally separated. The upward and downward thrusts of the sleeves 350 and 352 are taken by collars 364, 364, secured upon the spindle just within the upper and lower bearings. At the opposite extremities of the casings 342 and from the collars are anti-friction bearings 366 interposed between the casings and the central bearing of the spindle. The weight of the clutch system is counterbalanced by spiral springs 368, 368 connecting the lower pivot of the spindle and the frame. Beyond the end bearings of the spindle, and surrounding it, are springs 370, abutting at one extremity against collars 372 fixed to the spindle, and at the other end against washers 374, which bear against shoulders 376 formed upon the spindle. It will be seen that, if the spindle 346 is moved upwardly from its normal position, in which both sets of clutch-disks are out of driving engagement, the lower collar 364 will bear against the end of the sleeve 352, carrying it up. This exerts a driving friction upon the disks of the lower clutch, which are pressed together between a flange 377 on the sleeve and the opposite head of the casing 344, the contact of the hub of the casing with the adjacent thrust-bearing 366 preventing its retreat. At this time, the portions 342 and 350 of the upper clutch move together, their disks held out of driving contact by the spring 362. Upon reverse or downward movement of the spindle, the upper clutch is similarly caused to exert its driving effect, while the disengagement of the lower clutch is caused by the release of the casing-disks from the sleeve-disks. The effect of the springs 370 is to float the clutch-portions in their central position, said springs not being compressed until there is a departure of the spindle from normal and a raising or lowering of one of the washers 374 against its spring, the opposite spring, away from which movement occurs, exercising no effect. This causes a prompt restoration to normal, since there is no opposition to the returning movement until the final position is reached. The gears 354 and 356 and the clutch-sleeves are rotated constantly in opposite directions by pinions 378 (Fig. 6) upon short vertical shafts 380 (Fig. 3), which also have fixed upon their adjacent ends the bevel gears 382 co-operating with a like gear 384 upon the shaft 240. To grooves in the casings 342 and 344 are applied oppositely wound flexible members 386, these passing over guide-pulleys 388 and having fastened to their free ends weights 390 movable within a compartment 392 at one side of the frame. The weights, exercising a turning action upon the clutch-casings, resist, by an opposite force the drag of the friction-disks when they are out of driving engagement, and may, depending upon their magnitude, cause the benders to remain wherever freed or to return to a normal inactive position. Preferably, the former condition obtains, to permit prompt response of the benders; and to avoid interference of said benders with the feeding of the stock by their lying in its path, as especially might be the case after sharp bends had been made, means is provided, under the control of the feed, to remove the benders from proximity to the opening between the jaws before the feed begins. For this purpose, the bars 168 and 170 have angular ends 394, arranged for contact with pins 396 carried upon arms of the gear-segments 332 and 334. In extreme bending position, one or the other of these pins may be located at points shown in dotted lines in Fig. 3, having pushed the ends of the bars before them, as is also indicated by dotted lines. As has previously been explained, the first action of the gearing associated with the intermediate vertical shaft 140 of the feeding mechanism is to move the bars 168 and 170 longitudinally until the former strikes the stop 172, when the feeding begins. During this movement of the bars, their portions 394, by their pressure against the segment-pins 396, swing the segments and the carriers about their axes to carry the benders entirely clear of the jaw-opening before the feed starts.

To facilitate the bending of the stock, it may be heated, and I prefer to apply the heat electrically under the control of the benders. Figs. 4 and 20 to 27, inclusive, exhibit most clearly the means employed, the circuit appearing diagrammatically in Fig. 27. Line terminals 400 are shown as delivering current to a circuit 402, in which are various controlling contacts to be described, this circuit also including the winding 404 of a suitable electromagnetic switch and terminals 406, which apply current from the line to the high-resistance primary winding 408 of a transformer E only when the controlling circuit 402 is completed to energize the winding 404. The low-resistance secondary winding 410 of the transformer is grounded at 412 upon the frame of the machine, so it is in metallic connection with the jaws 106 and 108. The other extremity of the secondary is joined by cables 414 to the benders 110 and 112, said benders being insulated at 416 from the frame. There is thus a circuit adapted to deliver from the secondary of the transformer a large volume of current from the grounded jaws through the stock to the benders, whenever these are in contact with the stock, and back to the secondary, the time of flow of this current being governed by the condition of the contacts in the circuit 402. There may be such differences of potential between the jaws and benders and the templet that current flow harmful to the templet would occur. This I guard against by inserts 417 of insulating material applied to the tops of both the jaw and bender which lie within the die being formed, holding the templet out of contact with them.

To insure the initiation of this secondary circuit only when a bender is in firm engagement with the stock to prevent arcing or the passage of current through a relatively high resistance contact and consequent pitting of the metal, contact-members in the circuit 402 may be controlled by the bender-clutches in the following manner, but one of the two similar arrangements being described in detail: In each clutch-casing, as 344, there is an outer friction-ring 420 (Fig. 22), formed from insulating material and not engaged by the casing-spline. This ring has a projection 422 (Fig. 24) extending through an opening 424 in the casing, the width of this opening being such as to allow some movement of the projection between the end walls of the opening. In an annular recess at the outside of the casing, insulated at 428, are metal rings 430 carrying separated contact-springs 432 (Figs. 23 and 24) included in the circuit 402 and situated adjacent to the opening 424. Current may be delivered to the rings 430 through brushes or like spring contact-devices 431. Rising or depending from one side of the projection 422 is a metal pin 434, adapted upon movement of the ring-projection in the casing-opening to pass between and into conductive contact with both springs 432. Normally, the pin is held away from the contacts 432 by a spring 426, joining the disk-projection to the outer wall of the casing; and during the initial driving action of the clutch this effect is continued by the engagement of the clutch-disks. When, however, the bender which is being actuated strikes the stock, the rotation of the casing is retarded, and the disk slips, revolving the projection 422 against the tension of the spring 426, and bringing the pin 434 between and into metallic engagement with the contacts 432. This closes at this point the controlling circuit 402, thus applying current to the stock only after the bender has been pressed with some force against it. When the clutch is released, the disk 420 is freed, and its spring carries the pin away from the contacts to open the circuit. The other contacts 432 of the clutch 342 are in parallel with those just described, so that the completion of the circuit may be at either pair, producing the same effect.

Conversely to the above, it is desirable that, before a bender leaves the stock, the controlling circuit shall be opened to cut current from the secondary circuit. For this purpose, the circuit 402 includes separated insulated contacts 440, 440 mounted upon the frame adjacent to the extremity of the shaft 240 (Figs. 24 and 25), which is constantly rotated. Surrounding the shaft 240 and secured to turn therewith, is a disk 442, in proximity to which, also surrounding the shaft, is a loose disk 444, limited in its angular movement by stop-projections 446 striking upon a portion of the frame. A spring 448, extending between the periphery of the disk 444 and the frame, holds somewhat separated from the contacts 440 a metal pin 450, projecting upon opposite sides of an insulating plate 451 fixed to the disk 444. The plate 451 maintains the circuit between the contacts 440 normally open. Between the disks 442 and 444 is a friction-ring 452, the pressure between the disks and upon this ring not being sufficient normally to rotate the disk 444. At the opposite side of the disk 444 from its companion disk is a sleeve 454 loose upon the shaft, and having interposed between it and the first-mentioned disk an antifriction thrust-bearing 456. At the opposite or inner end of the sleeve is a hardened collar 458 secured to the sleeve, this having adjacent to it a like collar 460 surrounding the shaft and fixed to the frame. In the adjacent faces of the collars are alined depressions, having cam-walls 462, and in the depressions included within both collars is a ball 464. A pair of springs 465 connecting the sleeve and frame acts to draw said sleeve away from the disk 444. The sleeve has, projecting from one side, an arm 466, joined by a link 468 to the lever-system L. This lever-system is so organized as to the ratio of the lever arms and the relative strength of the springs 370 and 465 is such, that when the spindle 346 moves up or down to free either of the benders, the corresponding clutch is first actuated and the controlling circuit closed at the contacts 432, and then the link 468 is moved. Whichever way, as a result of this, the arm 466 is swung, the action of one of the cam-walls 462 upon the collar 458 in riding over the co-operating ball will carry the sleeve 454 to the left (Fig. 25) against the tension of the springs 465, forcing the disk 444 into driving engagement with the constantly rotating disk 442 through the intermediate friction-ring 452. This turns the plate 451 in the direction indicated by the arrow in Fig. 24 of the drawings. The conducting pin 450 is brought between the contacts 440, and the controlling circuit 402 is fully closed. When the spindle 346 is returned to normal by the lever-system, the sleeve 454 acts to free the disk 444 before the bender clutch releases, and the insulating plate 451 again passes between the springs 440. This shuts off heating current in the secondary circuit before the bender has traveled out of engagement with the work, and harmful arcing is thereby avoided.

When the time of contact of the benders with the stock is considerable, as in forming it into angles of less than 90 degrees, the application of current through the entire period may unduly heat it, burning the metal. I therefore may include in the machine time-limiting means controlling the circuit 402, and as illustrated this is measured by the amount the stock is bent, as determined by the extent of angular displacement of the clutch-casings. In the weight-compartment 392, adjacent to both of the weights, are pairs of insulated contact-springs 470 (Fig. 26) in series with the controlling circuit 402. Each pair is mounted upon and insulated from a support 472, which also carries an insulated pivoted blade 474, so arranged as to swing between the contacts to make metallic connection therewith, and being held normally in engagement with them by a spring 475 (Fig. 6). The supports are adjustable vertically along guides 476, upon which the weights move, they being fixed in the desired position by set-screws 478 (Fig. 26). Upon the weights are formed cam-surfaces 480, each of which, in the upward movement of said weights as they are raised by the rotation of the clutch-casings, comes into contact with an oppositely inclined extremity 481 of the corresponding blade 474. As the bending progresses and the weights are raised as a consequence of the driving of the benders through the clutches, the surfaces 480 and 481 of one or the other of the weights and levers come into contact, pressing the blade back from between its springs to open the circuit 402 and thus cut off current from the transformer secondary and from the stock. The time at which these devices act with relation to the angle through which the stock has been bent may be varied by the adjustment of the contact-supports 474 to different distances from the normal position of the weights. Under some circumstances, the operator may wish to apply heat for a longer time than is provided for by the limiting switches. In this case they may be rendered ineffective by a short circuit 482, including contacts 484, 484 (Fig. 27) shown as controlled by a treadle 486. If, after the current has been cut off at the contacts 470, it appears to the operator that the heating effect has not been sufficient for the best results in bending, he may, by depressing the treadle 486, provide a path for current about the contacts 470 through the conductor 482, thus prolonging the heating.

There is a tendency for the heated portion of the stock to oxidize and form scale. This is especially objectionable, because this oxide is of low conductivity and impairs the efficiency of the heating circuit, causing pitting of the co-operating portions of the stock and benders. To obviate this difficulty, I prefer to surround the heated portion of the stock with an inert envelope, conveniently obtained by applying to it a flame of illuminating gas from a pipe 488 (Fig. 12) situated adjacent to the opening between the clamping jaws. This, being oxygen-free, maintains the metal within it in good conductive condition. It also to some extent increases the heating effect.

To dissipate, in part, the heat transmitted from the jaws and benders to the associated elements, the supports and carriers may be recessed at 490 (Fig. 3) and a cooling fluid circulated through the chambers thus formed. Pipes 492 are shown joined to these chambers for the purpose of admitting and discharging the fluid.

*Automatic controlling system and starting devices*

The automatic means for controlling the feeding, clamping, bending and heating instrumentalities are brought out in their relation to the entire machine in Figs. 1, 2, 3, 4 and 7, and in greater detail in Figs. 8 to 13, inclusive, 24, 46 and 47. It is possible to initiate the control by a single feeler contacting with the templet T in proximity to the point at which the change of form of the stock occurs, or that in which the strip is delivered from the feeding members to the clamping jaws has form imparted to it by the benders. This point may lie just inside the forward ends of the jaws. It is found, however, that there may be a tendency for the stock and templet to vibrate or play laterally together during the feed, this movement being such as to carry the feeler outside its neutral zone. The neutral zone may be defined as an area bounded by imaginary lines parallel to the line of contact of the feeler with the templet, in which area the character of the connections of the feeler to the controlling system, or the adjustment of these connections, causes them to be non-effective as to the mechanisms governed by the feeler movement. When this false play of the templet takes the feeler outside the neutral zone, it may cause incorrect action, and to avoid this I prefer to utilize the double feeler 114 and 116, the former contacting with the templet and the latter with the stock, and exerting their controlling effect only by their separation when the stock departs from the templet. In this way, better operation of the machine with greater accuracy of bending is attained. The templet-feeler 114 is shown as consisting of a rod having a squared end 500 (Fig. 12), one side of which may contact with the edge of the templet as the stock is bent to it. This feeler is held in vertical adjustment with respect to the templet-edge by a set-screw 502, it passing through an opening in a lever 504 pivoted at 506 upon a carrier-lever 508, preferably of the bell-crank type. The lever 508 is fixed upon a vertical spindle 510, turning in a projection from a slide 512 movable on the frame-portion 252. The spindle 510 also has secured to it above its support a second bell-crank lever 514, one arm of which rests against a spring 516 (Fig. 14) mounted in a casing secured to the slide, and acting to hold the feeler-portion 500 against the templet. At the opposite side of the lever 514 from the spring is a screw 518, threaded through the slide, which limits the travel of the feeler toward the templet. It may also serve to hold the elements in a neutral position while the feeler is being set. The supporting lever 504 is preferably yieldably mounted, to permit the feeler 114 to adjust itself to abrupt changes of contour of the templet and to avoid its breakage, there being pins or projections 520 extending through the lever 504 at opposite sides of its fulcrum and entering sockets in the lever 508. In these sockets are springs 522 acting against the pins and yielding to allow the lever 504 to swing in either direction when sufficient force is applied to the feeler. When the operator wishes to remove the work, the feeler may be held clear of the templet and stock by a pin 524 extending through an opening in the arm of the lever 514 between the spring 516 and the screw 518, this pin being arranged to enter an opening 526 in the slide when the lever 508 is so positioned as to remove the feeler from the edge of the templet. The stock-feeler 116 may be in the form of a thin contact-plate 528, the end of which rests against the side of the stock just beneath the portion 500 of the feeler 114. The lower and upper bell-cranks 508 and 514 have secured to their vertically alined arms still another lever, provided with separated arms 530 and 532 carried upon an elongated fulcrum-pin 534. The arm 530 has fixed to it the feeler 116, which is drawn into contact with the stock by a spring 536 joining the lever arm 530 with the mounting of the spindle 510. The other arm 532 of this lever is joined to a connecting bar 538. Obviously, if the feelers move together in either direction, the lever 514 and the upper arm 532 will also oscillate at the same rate, and, since the point of connection of the bar 538 to the free end of the arm 532 is over the axis of the fulcrum of the levers 508 and 514, the bar will not be shifted. But, if the feelers are separated from one another, there will occur a relative angular or differential movement between the lever 514 and the arm 532, with a resultant movement of the bar 538. This bar constitutes one link of the controlling chain, and is preferably adjustable as to length, to enable the operator to set the controlling instrumentalities in a normal neutral position when the two feelers are not separated, that is, when the stock and templet coincide. For this purpose, the bar has a separate end section 540, supported upon the main body and having in it slots 542, through which pass clamping screws 544 threaded into said body. A spring 546, connecting the sections, holds the bar at its minimum length when the clamping screws are freed. The end section 540 may then be moved upon the body, and fixed in the desired position by setting the screws. To obtain a fine adjustment of the length of the bar, there is shown, rising from the section 540, a conical pin or projection 548, co-operating with which is a reversely coned nut 550 working upon a screw 551 passing through a slot, lying longitudinally of the bar section, and fixed in the body of the bar. With the clamping screws loosened, upon turning the screw 550 in contact with the pin 548, its inclination will cause the end section to slide over the companion portion to the extent wished, whereupon the bar-portions may be secured to one another by the clamping screws 544. The opposite extremity of the bar from that connected to the arm 532 is articulated to an arm 552 (Fig. 13) pivoted upon a standard 554 on the frame. Along the arm 552 is formed a series of openings 558, any one of which may provide the articulation of the bar 538. This gives an adjustment of the sensitiveness of the controlling mechanism, since the distance of the bar attachment from the pivotal axis of the arm changes the amount by which the departure of the feeler from its neutral position will affect the controlling mechanism. As illustrated in Fig. 13, the adjustment is for maximum sensitiveness. Fixed to the pivot of the arm 552 is a horizontal plate 560, and resting upon this is an arm 562. The arm 562 is guided for oscillatory movement by a screw 564 threaded into the plate and passing through an arcuate slot 565 in an enlarged end portion of the arm.

In the flattened end of the enlargement, at opposite sides of the axis, are depressions 566, which are adapted to receive pins 568 rising from the plate 560, the normal co-operation of these parts being maintained by a tension-spring 570, which draws the arm depressions against the pins. This mounting of the arm 562 allows it to impart movement of limited extent to an element controlled, and then, upon this movement ceasing, to permit continued movement of the actuating plate 560 to occur, the screw 564 traveling through its slot, and one or the other of the pins 568 leaving its depression while the arm rocks on the other pin. That is, this portion of the connecting system is such as to provide for angular movements of different magnitudes in the elements operating and operated by the arm 562. The outer extremity of the arm is divided at 572, this portion entering a slot in an enlargement of a valve-stem 574, straddling therein a pin 576 lying across the slot.

The stem 574 joins the lever-system, governed directly by the feeler device, to a transmitting system, utilizing some such fluid as a gas, a liquid or electricity, it being herein shown as pneumatic. Said stem has at its extremity a valve-plunger 578 (Fig. 9), movable horizontally in a chamber 580 formed in a casing 581 (Fig. 8). Into this chamber air under pressure is admitted by a pipe 582 from some suitable source. The casing chamber has an axial passage and connecting radial passages forming a receiving section 584, and supply-sections 586, 586 having ports 588, 588 (Fig. 10) leading to opposite ends of a cylinder 590, in which operates a piston 592. Beyond the supply-sections of the chamber are exhaust-sections 594, 594, connected to the outer air by ports 595. The valve-plunger 578 is normally held in a central position by leaf-springs 596 secured to opposite sides of the casing 581 and slotted at 598 to receive reduced portions of the plunger. These springs not only act as such, but also, by contact with outer shoulders 599 upon the plunger, serve as stops to limit the plunger-movement in both directions, the extent of this depending upon the length of the reduced portions. The body of the valve is of diminished diameter at 600 at each side of the center. When the valve is in its normal position, the central portion shuts off the pressure supplied by the pipe 582 from both supply chambers. The exhaust-sections of the chamber are also cut off from the supply-sections by the body of the valve beyond the reduced portions 600. If the arm 562 moves the valve in either direction, the portion 600 at the side toward which the movement proceeds opens the supply-section to the exhaust, and immediately thereafter the opposite portion 600 connects the pipe 582 to the associated supply-section, which is maintained out of communication with the exhaust-section at this side. This admits air to the cylinder 590 at one side, and opens a path for exhaust at the opposite side, so that the piston 592 is caused to travel through the cylinder in a predetermined direction. Connected to this piston is a rod 602, guided and balanced for sensitive responsive movement between springs 604, 604 arranged similarly to the springs 370 of the bender clutch shaft. The rod 602 is preferably adjustable as to length by a connection 606. It carries at its lower end a plunger-valve 608 operating in a chamber 610 formed in a casing 612 secured to the lower end of a vertical supporting plate within a readily accessible compartment 613 mounted upon the machine frame adjacent to the compartment 392. Upon the valve 608, within its casing, are enlargements 614, 614, controlling the flow of air under pressure admitted by a pipe 616 to supply ports 618, 618 and also governing the connection of exhaust-ports 620, 620 to said supply-ports. For either a raising or lowering of the valve 608, actuated by the piston 592, one of the supply-ports is joined to its exhaust-port, and the other supply-port to the source of air pressure. These supply-ports deliver the air through casings 622, 622 and pipes 624, 624 to power cylinders 626, 626 supported in alinement upon the opposite walls of the compartment 613. Operating within these cylinders are pistons 628, 628, joined by rods 630 to a vertical arm 632, secured upon a horizontal shaft 634 journaled in the main frame and extending into the compartment 613. Admission of air by the valve 608 to either of the cylinders 626 causes an inward travel of the corresponding piston 628, the opposite cylinder exhausting back through the connection to the valve-casing 612. The force of the air pressure applied to the power-cylinders may be regulated by valves 636, 636 (Fig. 11) movable, by virtue of a threaded mounting, in the casings 622, 622 to vary, by their inclined ends, the effective area of leak-openings 638, 638, these openings being so situated that a certain portion of the air supplied to the pipes 624 may escape through them. The arm 632 is held in a normally central position by springs 640, 640 surrounding a guide-rod 642 at opposite sides of the arm. One end of each spring co-operates with an enlargement 644 upon the arm, so it exerts no pressure upon the arm until said arm moves away from normal, and the other end abuts against a pin 646 passing through the rod.

Upon the shaft 634 carrying the air-actuated arm 632 is also secured a horizontal arm 650 (Figs. 4 and 24), having pivoted upon its outer end a double yoke-shaped arm 652, upon which is fulcrumed a generally horizontal lever 654 of the system L. At one end of this lever is pivoted a yoke 656, the upper extremities of which are forked to receive pivot pins 658 of a lever 660 fulcrumed at 662 upon the frame, and on which rests the step 202 of the feeding and clamping clutch-shaft 164. The yoke 656, below the pin 658, has articulated to it a lever 664, fulcrumed at 666 upon the frame. The opposite arm of this lever is pivoted at 668 to a yoke 670 extending upward vertically and having forks in which rest pivot-pins 672 upon the lever 660 at the opposite side of the step from the pins 658. Whether the arm 650 is moved up or down by the oscillation of the shaft 634 under the control of the pneumatic mechanism, the clutch-shaft 164 will always be raised, since, if the right-hand end of lever 654 moves up, the yoke 656, swinging about the fulcrum 666 of the lever 664, also travels up, and, acting against the pins 658, lifts the lever 660 and with it the clutch-shaft. If, on the other hand, this end of the lever 654 moves down, it, through the yoke 656, lever 664 and yoke 670, raises the pins 672 and therefore the lever 660 and the shaft. The effect of this is that, whenever the feeler mechanism departs from its neutral relation, the feeding clutch is disengaged, and the clamping clutch set, thus stopping the advance of material and fixing it between the jaws for bending. The opposite end of the lever 654 from that connected to the lever 660 has articulated upon it at 674 a yoke 676, and in the upper portion of this yoke is fulcrumed a lever 678. Upon the shorter arm of this last-mentioned lever is pivoted a yoke 680 for supporting the spindle 346 of the bending clutches, while to the longer arm of the lever is pivoted the link 468 of the quick-breaking mechanism for the controlling circuit 402. As to this side of the lever-system L, when the arm 650 is swung downwardly by the oscillation of its shaft 634, the left-hand end of the lever 654 and the lever 678 carried thereby move in the same direction, so that both the clutch-spindle and the link are lowered. This causes the engagement of the clutch for the bender 110, first closing the controlling circuit contacts 440 and 432 and releasing the clutch of the companion bender, if it is acting. Prior to such release, the controlling circuit is severed at the contacts 440. If the arm 650 is raised, so, too, is the clutch-spindle, in this case releasing the lower clutch and setting that of the bender 112. The action upon the contacts 432 and 440 is precisely the same as before.

To sum up the action of the controlling system, it may be said that when the feelers remain unseparated, or within their neutral zone, the levers which they actuate so hold the connecting bar 538 that the primary pneumatic valve 578 remains in its central position, leaving the clutch-systems for the feeding and clamping and for the bending and heating systems unaffected. When the feelers separate, taking the system out of the neutral, the primary valve is moved in one direction or the other, operating the secondary valve 608 and admitting air to the corresponding power-cylinder 626, this affecting the lever system L to raise the clutch-shaft 164, stop the feeding rolls and set the clamping jaws, and to either raise or lower the clutch-spindle 346 to close the heat-controlling circuit and operate the proper bender.

If the stock is to be bent at more than some predetermined angle, say between 120 and 60 degrees, it may be advantageous to apply greater engaging pressure to the bender-clutches after the stock has passed the predetermined point than before it has reached this point, to overcome the greater resistance of the metal. To this end, the air supply-pipe 616, leading to the casing 612 of the secondary valve controlling the air to the power-cylinders 626, 626, delivers through a casing 682 (Figs. 46 and 47) by way of a passage 684, in which operates a conical valve-plunger 686. This valve is under the influence of air-pressure exerting a tendency to hold the passage normally open. On the outer end of the plunger is a head 690, bearing against the cylindrical portion of a sleeve 692 mounted upon a plunger 694, which carries the head 172, with which co-operates the rack-bar 168 actuated by the gear-teeth 166 upon the sleeve 142. The sleeve 692 is preferably adjustable upon a threaded end 695 of the plunger 694, being locked in place by a nut 697. By this adjustment there may be varied the normal relation of the valve-plunger head to an inclined actuating surface 698 upon the sleeve 692. A spring 696, surrounding the plunger 694, exercises its force to move the sleeve beneath the valve-head so that the latter rides over the incline 698, permitting the valve 686 to open more widely the air-passage 684. During the initiation of the feeding operation, the bars 168 and 170 first moved the benders clear of the space between the jaws, and bar 168 started the feed when stopped in its movement by contact with the head 172. Here the last-mentioned bar is left with the elements in the relation illustrated in Fig. 47. This continues until about the time when the benders, having come into action after the feed of the stock, shift their pivots from one of the rods 300 and 302 to the other. At this time the pin 396 upon one of the bender-segments strikes the angular end 394 of the corresponding bar, causing the opposite extremity of the bar to move away from the plunger head 172. This frees the plunger, so that the spring 696 carries it to the left (Fig. 47) until the incline 698 is beneath the valve-head 690. The valve therefore opens an amount determined by the incline beneath its head, increasing the effective area of the passage 684 and applying a greater air pressure to the acting power cylinder 626 because of the increased ratio of the area of the supply-opening to the area of the leakage-opening 638. This results in a firmer engagement of the bender-clutch and increased pressure of the bender against the strip. It will be seen that there is reciprocal control exercised between the bending and feeding mechanisms, an element of the bending mechanism moving an element of the feeding mechanism, which, in turn, affects the former.

When the machine is not in operation, an arm 700 (Fig. 4), fixed upon an oscillatory shaft 702 journaled along one side of the frame F, is drawn by a spring 704 against the under end of the lever 660 of the lever-system L. This raises the shaft 164, and holds the feeding clutch 210 out of engagement. To start the machine the operator depresses a treadle 706 (Figs. 2 and 7), pivoted upon the frame and held up by a spring 708. When lowered, the treadle contacts with a pin 710 projecting from the side of a bar 712 sliding vertically in the frame, and having formed upon its outer side a rack 714, which meshes with a gear-segment 716 fast upon the shaft 702. This turns said shaft to lower the arm 700 and the clutch-shaft 164 to cause the engagement of the feeding clutch. The treadle-actuated shaft 702 is locked down under the control of a latch 718 (Fig. 36), later to be described in detail, this latch being yieldable against the tension of a spring 719 and engaging the contact end of an arm 720 secured upon the shaft 702.

While the machine is inactive, the automatic clutch-controlling mechanism is preferably rendered ineffective by a plunger-valve 722 (Figs. 8 and 13), which is movable in a casing 724 included in the air supply pipe 582. The valve 722 at such time shuts off air from the primary valve-casing 581, being drawn into this position by a spring 726 acting upon a vertical bar 728 mounted to slide within the compartment 613 and being connected to the valve 722. In starting the machine, the operator presses down a treadle 730, pivoted adjacent to the treadle 706 upon a shaft 732. A spring 734 acts to hold this treadle normally raised. Secured upon the shaft 732, within the frame, is an arm 736 (Figs. 4 and 36), which has an adjustable contact-portion in the form of a screw 738. The contact-screw is arranged in vertical alinement with a plunger 740 mounted to slide in the bottom of the compartment 613 beneath the end of the bar 728. The lowering of the treadle 730 brings the screw 738 against the plunger 740, to move the valve 722 by means of the bar 728 so that the air supply pipe 582 is opened. The bar is latched up, in a manner which will be made clear, to permit the controlling system to functionate.

*Cutting mechanism and automatic control of the machine at the end of the bending operation*

As may be seen in Figs. 1, 2, 7, 33 and 35, the cutter 118 consists of an inclined member, working against the rear face of the movable clamping jaw 108 and acting upon the stock to sever it at this point. It is mounted to reciprocate in ways 750 in the jaw-slide 180. At the outer end, the cutter is connected by a link 752, preferably in sections threaded together to permit adjustment, to a lever 754 fulcrumed at 756 upon the outside of the main frame. The opposite extremity of the lever has a depending projection 758, entering a groove in a cam 760 surrounding the driving shaft 244 outside the frame. The cam is normally loose upon the shaft, but may be caused to turn with it by a detent 762 (Figs. 28, 30 and 31) pivoted at 764 in a recess 766 in one end of the cam adjacent to the frame. The detent may be forced by a spring 768, located in a bore in the cam at one extremity of the recess 766, against a shoulder upon a collar 770 secured to the shaft 244 in a circular portion of the recess 766. The normal disengagement of the detent is maintained by a pin 772 (Fig. 29) arranged to slide in the frame and to enter a cam-recess 774 (Fig. 28) in the detent at the side toward the frame. The pin 772 is urged toward the cam by a spring 776, acting against its end, and also by a helical spring 778 (Fig. 5), which extends from the frame to a projection from a sleeve 780 surrounding the pin, and drawn by the spring against an annular flange 782 thereon. The sleeve 780 may be moved upon the pin from the flange 782 into contact with a flange 784 at the outer end of the pin by a projection 786 secured to an arm 787 at one side of the sleeve. The spring 778, in addition to its action in moving the pin 772, exerts its tension to draw the projection 786 into co-operation with a helical groove 788 formed in a sleeve 789 fast upon the shaft 244. When the projection enters the groove, the travel produced acts first to move the sleeve 780 against the flange 784, and then through this contact to withdraw the pin 772 from the recess 774. This releases the detent 762, which, by the spring 768, is carried into engagement with the shoulder upon the collar 770. The cam thereupon rotates, and through the lever 754 moves the cutter across the opening between the jaws to divide the stock. Normally, however, the projection 786 is held out of the groove 788 by an element of the mechanism which controls the machine at the end of the bending operation, as will now be described.

Referring to Figs. 1, 2, 7, 35 and 36, there is situated just at the rear of and slightly spaced from the fixed clamping jaw 106 a vertical contact-plate 790, shown as roughened at 792 to give more certain engagement therewith of the end of the formed die. This plate 790 rises from the forward end of a carrier-plate 794, mounted to move upon the upper surface of a bed-plate 796. The plate 796 is adjustably fixed in ways in the frame by a screw 798 passing through a slot lying longitudinally of the plate. By means of this screw and slot, the normal distance of the contact-plate from the jaw 106 may be determined. The carrier-plate 794 is mounted upon a slide 800 arranged to reciprocate in ways in the bed-plate, said carrier-plate being pivoted at 802 on the slide between centering springs 803 and movable through an arc determined by a screw 804 passing through a slot in the carrier-plate and threaded into the bed-plate. The purpose of this pivotal movement of the carrier-plate is to give a certain self-adjustment of the contact-plate 790 and to prevent its being broken by the strain imposed by the contact of the stock in cutting off and when the die strikes and actuates it. A bar 806 crosses the ways of the slide 800, and against this a slide-projection 808 is forced by a spring 810 situated between the bar and a projection 812 upon the slide. By the spring 810 the plate 790 is held somewhat separated from the rear of the jaw 106, yet is permitted to move toward said jaw, compressing the spring. With an end 814 of the slide projecting beyond the plate 796 co-operates an arm 816 attached to a shaft 818 (Fig. 8) journaled in the upper portion of the frame. The shaft is connected by an arm 820 and a link 822 to one arm of a lever 824 fulcrumed at 826 upon the frame. The other arm of the lever 824 has a reduced portion 828 entering an opening near the upper extremity of the bar 728 controlling the valve 722. When the contact portion of the arm 816 is at the right of the projection 814 from the slide, this being as viewed in Fig. 35 of the drawings, the bar 728 is latched up against the tension of its spring 726. The character of the system of leverages exerted by the elements 816, 820, 822 and 824 is such that relatively slight resistance offered by the latching projection 814 to its movement in contact with the arm 816 opposes considerable force exerted upon the bar 728 by the spring 726. A screw 830, operating through a wall of the compartment 613, limits the throw of the lever 820, and consequently the movement of the arm 816 to its latched relation.

Pivoted upon one side of the bar 728, near its lower extremity, is a contact member 832 (Fig. 36), movable between the bar and a wall 834 upon the frame. When the bar is raised, a depression 835 at the side of the contact member toward the wall 834 permits said contact member to be forced away from the bar by a spring 836 (Fig. 8). In this position a shoulder 838 moves in a path which brings it into contact with the end of a retaining member 840, pivoted at 842 upon the frame, so that downward movement of the bar 728 raises the opposite extremity of this retaining member. The latter element is drawn by a spring 843 into an annular groove 844 in the hub of a toothed clutch member 846 fixed to a shaft 847 rotatable in a surrounding shaft 848, journaled in the frame and driven by spiral gearing 850 (Fig. 5) at a relatively slow speed from the shaft 140 whenever the feeding mechanism is in operation. The retaining member holds the clutch member 846 against the pressure of a leaf-spring 852, fixed upon the frame and bearing against the end of the hub of said clutch member, out of engagement with a complementary clutch member 854 rotatable by the shaft 848. The clutch member 846 is held by a tension-spring 856 normally against a stop-block 858 adjustable in a groove 860 concentric with the shaft 848. The position at which this stop-block is fastened varies the normal distance between a contact-surface 862 upon a projection from the clutch member 846 (Fig. 38) and an upstanding end 864 of a bar 866 carrying the latch-portion 718 for the starting shaft 702. This adjustment determines the arc through which the clutch rotates before the surface 862 contacts with the projection 864 to disengage the latch.

As thus far described, the operation of this automatic controlling mechanism is as follows: After the stock has been fully bent about the templet, because of the closed figure which is to be formed, the end first acted upon reaches the rear of the clamping jaws, and because of the offset produced by the initial bend in the stock under the influence of the feeding rolls, this end passes at one side of the strip as it comes from the feeding rolls and strikes the roughened surface 792 of the contact-plate. As previously pointed out, this plate yields laterally to prevent breakage, and also toward the jaw 106 against the spring 810. This movement withdraws the projection 814 from behind the contact end of the arm 816, releasing the bar 728, which is drawn down by its spring 726. As the bar falls, the shoulder 838 upon the member 832 strikes the tail of the retaining member 840, lifting it from the recess 844 in the clutch member 846. Then, before the bar reaches the downward limit of its movement, the depression 835, which has permitted the member 832 to be held out by the spring 836, passes the upper edge of the wall 834, and the member 832 is forced back by the wall, so that it frees the retaining member. While the latter is raised, however, the clutch member 846 is carried into engagement with the companion member 854, so that it is rotated from the shaft 848. This rotation continues until the surface 862 comes into contact with the portion 864 of the latch 718. During this time, an excess of the die-stock is fed to produce overlapping ends which may be welded together. Upon the contact between the surface 862 and the upstanding portion of the latch-bar, the latch 718 is forced back from beneath the contact end of the lever 720. This frees the shaft 702, which is turned by its spring 704. As a consequence, the arm 700 exerts its influence upon the lever-system L to throw out the feeding clutch, as has already been described, and engage the clamping clutch. The downward movement of the bar 728 also shifted the valve 722 sufficiently to close the air-supply pipe 582. This shuts off the pressure from the pneumatic system, so that the secondary valve 608 is restored to normal by its springs, and the entire controlling system ceases to functionate.

When the starting shaft 702 is released to stop the feeding action, the cutter 118 is also caused to operate. Fast upon the shaft 702 is an arm 870 (Figs. 2 and 7), which is joined by a link 872 to a vertical slide 874 movable in a housing 876 attached to the outside of the frame (Figs. 40, 41 and 42). Upon the upper end of the slide is pivoted a contact member 880, movable against an arm 882 secured upon one end of a shaft 884 rotatable in a horizontal position in the frame (Figs. 5 and 40). A spring 885, situated in a bore in the slide, acts upon a horizontal tail 887 of the contact member, to maintain it normally beneath the arm 882. The shaft 884 has at its opposite extremity from the arm 882 a second arm, having a transversely extended end 886, held by a spring 888 beneath an arm 890 projecting in a generally horizontal direction from the sleeve 780, which carries the cutter-controlling projection 786. When the slide 874 is raised by the turning of the shaft 702, the contact member 880 lifts the arm 882. This turns the shaft 884, and removes the supporting arm 886 from beneath the arm 890. The sleeve 780 is thereby caused to turn under the influence of its spring, and the projection 786 to be drawn into the groove 788 of the shaft 244. The first effect of the helical groove upon the sleeve 780 is to carry it from its contact with the collar 782 along the pin 772 until it reaches the collar 784. During this time the jaws 106 and 108 are allowed to clamp themselves fully upon the stock under the influence of their clutch, operated as previously indicated. Then, by the contact of the sleeve with the collar 784, the pin 772 is carried to the right (Fig. 29) to withdraw it from the detent-recess 774. The resulting engagement of the detent with the collar 770 rotates the cutter-cam to move the cutter-slide through the agency of the lever 754 and sever the stock. In the rise of the slide 874 after its contact member 880 had freed the projection 786, the tail 887 came in contact with an adjustable abutment, furnished by the end of a screw 892 threaded through the top of the housing 876. Its effect is to turn the contact member in a clockwise direction (Fig. 42), carrying it from beneath the arm 882, which frees the extended arm 886, so that it is ready to again pass beneath the arm 890 to hold the projection 786 out of the helical groove 788. In the travel of the projection in the groove, it finally reaches the end of the latter at 894 (Fig. 3), where it rises to the top of the groove-wall. This not only carries the projection out of the groove, but raises the arm 890 above the supporting portion 886, which is carried beneath the arm 890 by the spring 888. At this time the spring 778 carries the sleeve 780 to its initial position, and the pin 772 is moved toward the cutter-cam. Its end either enters the recess 766 (Fig. 28) or an annular groove 896 in the cam, connecting with the ends of said recess, and in the rotation of the cam the detent-recess 774 is brought into co-operation with the pin. The detent is swung about its pivot to withdraw it from the shoulder upon the collar 770, freeing the cam from the shaft 244. An operating cycle having been completed, the rotation of the cam and the movement of the cutter therefore stop, this occurring more promptly because of the presence of a friction band 897 (Fig. 2), which is mounted upon the outside of the frame F and drawn by a spring 898 into braking contact with a cylindrical surface 899 upon the cam.

Returning to the clutch member 846, which by its rotation had released the latch 718 of the starting mechanism, after the surface 862 has acted upon the raised portion 864 to effect the withdrawal of the latch, an adjacent laterally inclined surface 900 (Fig. 38) upon the clutch member comes into contact with a rounded surface 902 upon the side of the latch-portion. The spring 719, during the return of the latch to normal, draws this surface 902 over the surface 900, exerting a cam effect, which moves the clutch member 846 so that it is separated from the companion portion 854. This freeing of the clutch is dependent upon the action of the spring 719, and in case this spring were not sufficiently strong, or were broken, the clutch member 846 would continue in rotation, and injury to the associated parts might result. To insure against this, a second contact-block 904 is adjustably mounted in the groove 860, it being variable in its angular relation to the block 858. Upon the block 904, at the side toward the clutch-projection upon which are the walls 862 and 900, is an inclined surface 906, lying in the path of an oppositely inclined wall 908 at the forward extremity of the projection. As the rotation of the member 846 continues, after its release of the latch, the surface 908 engages the surface 906, the pressure of one against the other producing a component of force longitudinally of the shaft-axis, which positively separates the clutch members regardless of the action of the latch and its spring. When thus released from engagement, the clutch member 846 is returned to its initial position against the contact member 858 by its spring 856. All the elements of the machine are now at rest.

*Auxiliary operator-controlled devices*

In connection with the automatic controlling system, there has been described the means, actuated by the treadles 706 and 730, for initiating the operation upon a die by starting the feeding and by making the pneumatic system effective. Reference has also been made to the short circuit governed by the treadle 486, which enables the operator to prolong the application of heating current. There will now be discussed various other devices under the control of the operator, which lend themselves to the efficient action of the machine.

It may be desirable, while the machine is engaged in the forming of a die, to reduce its sensitiveness, or the responsiveness of the controlling mechanism to departures of the feeler device from the neutral position. Such a condition may arise when the feeler comes under the influence of a sharply curved or angular portion of the templet, the diminution of sensitiveness preventing too abrupt or excessive bending. The manner of giving this control is illustrated in Figs. 1, 7 and 13. Contacting with the end of the primary valve actuating arm 562, adjacent to its pivotal mounting, is a displacing arm 910 fixed vertically upon the end of a plunger 912 arranged to slide in a standard 914 rising from the frame. A spring 916, interposed between the opposite or outer end of the plunger and the standard, holds the arm 910 away from the controlling arm 562, though the former is normally in close proximity to the latter. Adjacent to this outer end of the plunger is a cam or eccentric 918, secured to the end of a rod 920 mounted to turn in bearings upon the top of the frame and having fixed to it, at the front of the machine where the operator stands, a hand-lever 922. When the cam is turned to force the plunger to the left (Fig. 13), the plate 910, pressing against the end of the arm 562, carries it away from the pins 568 against the tension of the spring 570. The width of the slot 565 is such as to permit this movement. As a result of this, the pins, upon their oscillation by the bar 538 under the influence of the feeler, will move idly or with lost motion for a certain period before coming into engagement with the arm. This will, of course, reduce the movement imparted to the primary pneumatic valve for a particular controlling feeler movement, and the mechanisms controlled will respond more tardily, so that a greater divergence of the stock from the templet is necessary to bring about the bending action. The effect upon the sensitiveness of the controlling system may be variously altered, according to the angle through which the lever 922 is turned, and may be restored by reverse movement of said lever.

In some instances, as when the operation is being manually modified as just described, or when the stock is first started into the machine, the normal feed given by the rolls may be too rapid for the best results. I therefore prefer to provide reducing gearing, one form of which appears in Figs. 1, 7 and 48 of the drawings. The belt-pulley 248 upon the driving shaft 244 is loose or rotatable thereon, and has secured to it, concentrically to the axis, a gear 926. Arranged to turn freely about the driving shaft at the outer side of this gear is a wheel 928, grooved at its periphery to receive a friction band 930 extending about a considerable portion of the circumference of the wheel. One end of the band is secured at 932 to some relatively fixed point, as the floor upon which the machine is set, and the other end is joined to an arm 934, fixed upon a shaft 936 turning in bearings upon the floor and having secured to it a treadle 938. Journaled in a boss at the inside of the wheel 928 is a short shaft 940, parallel to the driving shaft and having fast upon it a gear 942 meshing with the gear 926, and also a pinion 944 co-operating with a gear 946 keyed upon the driving shaft. During the operation of the machine by power applied to the fast pulley 246, the pulley 248 and its associated gearing are free to turn without effect upon the machine. If a slower operation of the mechanisms is desired, the operator moves the driving belt from the pulley 246 to the pulley 248 by a shifter 947, and presses down the treadle 938, holding the wheel 928 against rotation by the friction of the band 930. Under these conditions, the axis of the shaft 940 does not revolve, and power is transmitted from the pulley 248 through the gears 926 and 942, and then from the pinion 944 to the gear 946, which delivers it to the driving shaft of the machine. The ratio of the gearing causes the driving to take place at a reduced speed over that of direct actuation by the pulley 246.

Emergencies may arise requiring the operator to stop the machine during a cycle, and in such event, since the end of the die in formation would not have been reached, the cutting-off mechanism should not act. Quick control by the operator under such conditions is afforded through a mechanism shown more generally in Figs. 2, 4, 5 and 7, and in detail in Figs. 35, 37, 40, 42, 43 and 44. Arranged to turn in the lower portion of the machine frame, and extending along its side, is a shaft 950, having attached to its forward end, at the operator's position, an upwardly extending arm 952 with a handle 954. The shaft 950 has also fixed upon it an arm 956 (Fig. 40), which is joined by a vertical link 958 to an arm 960 upon a shaft 962, rotatable in the upper portion of the frame at right angles to the shaft 950. At the opposite or inner extremity of the shaft 962 from the arm 960 is an arm 964, upon which is pivoted a bar 966 extending into the way in the base-plate 796, and contacting with the slide 800 of the plate 790 against which the end of the stock impinges to stop the action of the feeding and bending mechanisms and to start in action the cutting mechanism. When the handle 954 is thrown in the direction of the arrow in Fig. 40, the bar 966 strikes the slide, withdrawing its end 814 from behind the arm 816, which is freed and returned to its initial position with the bar 728, closing the valve 722 to shut off the pneumatic controlling mechanism and preparing for a renewal of the operation.

When, in the exercise of manual control, the released bar 728 is drawn down under the influence of its spring 726, it would, were not provision made to guard against such action, free the clutch member 846 from the retaining member 840. Were this to occur, when the machine was subsequently started the latch 718 would be withdrawn, again stopping the feeding and bending, and causing the actuation of the cutter as already described, severing the stock before the completion of the forming operation. To prevent this, the shaft 950 has secured at its extremity opposite the arm 952 an arm 968, in the upper end of which is an opening to receive a rod 970 guided in the frame. Normally, a collar 972, attached to the end of the rod, rests against the outer face of the arm 968, and against the opposite side of the arm abuts a spring 974 surrounding the rod, the inner end of the spring contacting with a collar 976 fast upon the rod. Fixed to the rod 970, on the opposite side of the frame from the collar 976, is a collar 978, this, with the companion collar serving to limit the travel of the rod. The rod also carries a block 980, inside the frame, this having at one side a pin 982, which extends close to the contact member 832 (Fig. 37). When the shaft 950 is turned to render the controlling mechanism ineffective through the agency of the bar 966, as just outlined, the arm 968, acting on the spring 974, moves the rod 970 longitudinally until the pin 982 assumes a position against the contact member 832 beneath the shoulder 838, holding the latter in such a position that when the bar 728 is drawn down by its spring, the tail of the retaining member 840 is not engaged. The stopping mechanism associated with the shaft 702 would consequently not be released by the latch 718 under the conditions just set forth.

After this action upon the rod 970 has been effected, the rotation of the shaft 950 may continue, the spring 974 being compressed without further affecting the relation between the pin 982 and the contact member 832. Finally, the end of an adjustable contact member, shown as a screw 984 threaded through a lateral extension from the arm 968, comes in contact with an arm 986 loose upon the adjacent extremity of the shaft 950. The upper inclined end of this arm 986 lies within the latch-portion of the member 718 (Fig. 36) inside the end of the arm 720 which is engaged by the latch. Therefore, when the arm 986 is thus turned, it forces the latch away from the arm 720, freeing it, permitting the shaft 702 to be turned by its spring. There results the raising of the arm 700 to elevate the shaft 164, disengaging the feeding clutch and setting the clamping clutch. The advance of the stock therefore ceases. Upon the release of the shaft 702, the arm 870, through the link 872, elevates the slide 874. This, unless provision were made to avoid it, would, by the contact of the pivoted member 880 with the arm 882, trip the cutter-controlling projection 786, which would start the cam 760 in rotation, and the cutter would at once act upon the stock. Upon the shaft 962 is mounted an arm 990, connected yieldably at 993 to a link 992, which is articulated to a stop member 994 pivoted at 996 upon the outside of the housing 876 of the slide 874. The stop member has an angular portion 998 lying between the wall of the housing and the engaging end of the member 880. When the emergency arm 952 is in its normal position, as illustrated in Fig. 42, the portion 998 is retained close to the housing-wall and does not interfere with the engagement of the member 880 with the arm 882. When, however, this portion 998 is carried to the right, as seen in Fig. 43, the engaging end of the member 880 is swung to one side of the arm 882, so that, as the slide rises, the arm and the cutter-controlling mechanism remain unaffected. From what has been said it will be seen that the actuation of the arm 952 by the operation will, whatever mechanisms of the machine may at the time be operating at once render ineffective the feeding mechanism, bring into action the clamping mechanism, cut off the pneumatic controlling mechanism, and prevent the action of the cutting mechanism.

A manual control of the cutting mechanism is of advantage, as, for example, when the operator may wish to trim off a ragged end of the stock before beginning the formation of the die. From a hand-lever 1000 (Fig. 2), fulcrumed upon the side of the machine near the operator's position, a link 1002 extends to a bell-crank lever 1004 also fulcrumed upon the side of the frame, with one arm lying above a screw or other projection 1006 from the arm 882 in the chain of elements governing the cutter-actuating cam 760 (Figs. 40 and 45). A spring 1008, connecting the link 1002 to the frame, holds the arm of the lever 1004 out of normal actuating contact with the projection of the arm 882. Movement of the lever 1000 by the operator in the direction of the arrow in Fig. 2 presses the lever 1004 against the arm-projection 1006, which acts precisely as it did when operated by the pivoted member 880, freeing the projection 786, which enters the groove 788 to cause a cycle of operations of the cutting mechanism.

If occasion arises to reverse the feed, active engagement with the bevel-gear 234 (Figs. 3 and 34) for communicating rotation from the shaft 240 to the shaft 232 may be temporarily shifted from the normal connecting gear 236 to an opposite gear 1010. These gears 236 and 1010 may be alternatively secured to the shaft 240 by a sliding key 1012 arranged to move in a groove 1014 in the gears, and having an extension 1016 projecting outside the frame and there provided with a handle 1020 (Figs. 2 and 7) convenient to the operator. Upon the key and extension are shoulders 1018, 1018, either of which may be carried into contact with a relatively fixed portion of the machine, determining the position of the key in one or the other of the gears 236 and 1010. It will be clear that if the feed is being communicated to the rolls through the shaft 232 from the gear 236, their rotation will be in one direction, and if through the oppositely positioned gear 1010 it will be in the other direction, the latter relation reversing the feed to run the stock back from the jaws.

For separating the clamping jaws manually, the eccentric shaft 186 for operating the movable jaw is arranged to turn in an eccentric sleeve 1022 (Fig. 32). Projecting from the side of the sleeve is an arm 1024, which may be locked in different angular positions by a latch-pin 1026 arranged to engage openings in the frame, and controlled by a finger-lever 1028. When the lever 1024 is in one extreme position, the eccentricity of the sleeve 1022 holds the movable jaw in cooperating relation with the fixed jaw, and as the arm is swung oppositely, the movable jaw is rapidly withdrawn. This is employed to facilitate the initial introduction of the stock between the jaws and the removal of the formed die. Simultaneously, the cutter may be drawn back by a link 1030 (Figs. 1 and 7), which joins the arm 1024 to an arm 1032 arranged to turn eccentrically with the axis of the pivot 756 for the cutter-actuating lever 754 similarly to the mounting of the eccentric shaft 186. By this arrangement, either the cam 760 or the lever 1032 may be caused to act upon the cutter without affecting the other. In the same figures is illustrated a connection for carrying the feeler devices fully clear of the space between the jaws when the latter are manually shifted. From the outer extremity of the jaw-slide 180 rises a post 1034, this being connected by links 1036 to the frame-portion 252. These links 1036 are united by a link 1038 to the end of the slide 512 carrying the feelers. The actuation of the arm 1024 to separate the clamping jaws and draw back the cutter, also through this linkage moves the slide 512 in the direction of the arrow in Fig. 12, which carries the feelers clear of the work.

*Outline of the operation of the machine*

To summarize the operation of the machine when employed for producing cutting dies, it may be said that the operator presents to the feeding rolls 100, 102 and 104 a strip S of die-stock and partly depresses the treadle 706, this movement being to a point short of its latching down. This, through the rotation of the shaft 702 and the lowering of the arm 700, brings the clutch 210 into engagement, so that the rolls rotate, feeding the stock forward and imparting to it the desired curvature. Its end enters the space between the jaws 106 and 108, which the operator may fully separate by swinging the arm 1024. Simultaneously with this movement, the cutter is withdrawn by the connection 1030, 1032, and the feeler mechanism moved away from the path of the stock by the travel of its supporting slide 512 joined to the slide of the movable clamping jaw. If the end of the strip is uneven, its advance is preferably checked just after it passes between the jaws, by releasing the treadle 706, and the cutter 118 is manually brought into action by the tripping of its controlling projection 786 by means of the hand-lever 1000. The projection entering the helical groove 788 causes the withdrawal of the detent 762 from the cutter-cam 760, and after the cutter has made one stroke the cam is freed from the shaft 244, and the cutter stopped in its normal position behind the jaw 108. Again lowering the treadle 706, the operator further feeds forward a length of the strip of stock until its extremity *s* emerges from between the jaws for a substantial distance. Then, taking the templet T, the contour of which corresponds to that of the die which is to be made, an edge portion of this is chosen which is straight or not greatly curved, and the stock projecting from the jaws is bent manually by the operator to generally conform to the selected portion. The templet is thereupon attached to this initially formed portion by one or more clips C inserted in the templet openings *t* and embracing the edge of the stock. The operator may now bring up the feeler mechanism with the member 114 in contact with the templet and the member 528 resting against the stock at points at which these are approximately vertically alined, and fixing this mechanism temporarily in position by the screw 518 adjusts the bar 538 until the primary pneumatic valve 578 is in its central or neutral position. This neutral relation once attained, no adjustment will be necessary for succeeding operations. Depression of the treadle 730, through the action of the arm 736 upon the bar 728 shifts the valve 722 to admit air to the pneumatic controlling mechanism, and simultaneously sets the trip 816 for the control of the cutting-off operation and the subsequent stopping of the machine. The supports 276 may now be clamped upon the stock, and the machine is ready for the automatic production of a die.

Lowering the treadle 706 to its full extent, where it is secured by the latch 718, starts the machine, the feeding rolls beginning their rotation to thrust the stock with the supported templet forward in a movement of translation between the now open clamping jaws. While the stock coincides in position with the periphery of the templet, and the feelers 114 and 528 are in the neutral or unseparated relation, this advance continues. But as soon as a separation occurs, the feelers gage this, and their indication is transmitted back through the lever-system to the primary valve 578, controlling the air-pressure to move the secondary valve 608 either up or down in the cylinder, according to the direction of relative separation between the stock and templet. This selectively affects the power pistons 628, 628, correspondingly raising or lowering the lever-system L. Movement of this lever-system in either direction releases the feeding clutch 210, stopping the rotation of the rolls, and sets the clutch 212 actuating the clamping jaws, bringing these together upon the stock. Depending upon whether the lever-system L travels up or down, one or another of the bender-clutches 342, 344 is set, and the bender controlled by the engaged clutch moved into contact with the stock, the selected bender being the one which, by its pressure against the stock between the free end and the portion which is clamped or restricted as to lateral movement between the jaws, will bend the stock to bring it into coincidence with the periphery of the templet at the points of contact of the feelers. As soon as firm engagement between the bender and stock is attained, the contacts 432 in the controlling circuit 402 of the electrical heating system are closed by the projection 434 moving with the bending clutch which is in action, thus causing the transmission of current between the jaws and operating bender through the stock only after said bender is in proper contact with the stock, to prevent pitting. At first the resistance of the die-stock will cause the bender-clutch to slip. But, as the metal is heated by the current, it yields, and under the pressure of the bender assumes the desired form, and the feeler mechanism returns to the neutral relation, freeing the bender-clutch and clamping jaw clutch, and permitting re-engagement of the feeding clutch. Before the disks of the bender-clutch disengage, the movement of the lever-system L is transmitted through the rod 468 to the contacts 440 of the controlling circuit 402 to open said circuit and shut off current from the stock, again preventing evil effects of the current at the surface of the metal operated upon. Thus the action continues about the periphery of the templet, the stock being gradually brought into agreement with it. As this proceeds, the operator at proper intervals fixes the formed stock to the templet by applying additional clips C.

When, in the operation of the feeding connections at the time of bending considerable angles in the stock, or at some earlier predetermined time which the conditions render desirable, the rack-bar 168 moves away from the contact-head 172, by which it had been stopped to initiate the feeding action, the valve 686 is opened by its controlling sleeve 692 being carried away from it by the rack-bar. Therefore an additional amount of air pressure is supplied to the secondary pneumatic controlling valve 608 to more firmly set the bending clutch and cause the proper action against the stock. In the movement of the rack-bar 168 and its companion bar 170 after the termination of this bending action and prior to the initiation of the feed, the angular ends 394 of the bars, engaging the pins 396 upon the actuating gear-segments of the benders, moves the one which may have been operating away from the space between the clamping jaws to prevent its interference with the succeeding advance of the stock and templet. If the bending effect is through such an angle that a weight 390 connected with a bendingg clutch rises into contact with a surface 481, the controlling circuit 402 is broken at the springs 470 to discontinue the application of current and thus guard against overheating the stock. If this opening of the controlling circuit prove premature, the operator may restore it to its active condition by depressing the treadle 486. Remembering that the resistance of a strip of metal to bending varies with its temperature, it should be observed that there is a control of the current exercised to prevent incorrect heating of the stock, which begins with the contact of a bender and extends through the bending operation. First, the initial magnitude of the bender pressure, depending upon the force of engagement of the clutch controlled by its leak-valve 636, determines to what degree the stock is heated by the current before bending begins. A greater closure of the valve increases the force of engagement of the clutch, produces prompter bending of the heated stock, and consequently reduces the total heating effect. On the other hand, opening the valve will cause the clutch to slip when it encounters less resistance, defers the bending, and augments the degree of heating. By the adjustment of the valve, a proper balance between overheating and underheating may be struck. At the other extreme of action, the completion of the bending and release of the clutch with the resulting cutting-off of the current, governs the termination of the heating effect, with the further positive and determinate limit against overheating for bending through large angles furnished by the clutch-actuated switch 472 and 474. Primarily, then, the temperature of the stock is governed by the force exerted by the bender against the transverse resistance of the stock to bending, and secondarily by the extent of the bending action.

Thus proceeding, the benders moving about the axes 300 and 302 under the control of the feeler mechanism, the stock will finally be formed to the entire templet, as shown in dotted lines in Fig. 49 of the drawings, at which time the free end s will contact with the plate 790, freeing the tripping arm 816 and leading to the actuation of the cutter 118, this severing the stock. There having been, in the action of the controlling mechanism, an excess of feed to overlap the ends of the stock for welding, the operator may now remove the die and templet from the supports 276 and, detaching the templet, the die may be completed by bending manually to the templet the portion lying between the jaws at the close of the automatic operation and by welding its extremities together. Coincidentally with the actuation of the cutter mechanism, the bar 728 is released to shut off the air from the pneumatic controlling mechanism, and to produce, through the contact member 832 upon the bar, the engagement of the clutch members 846 and 854, the former being driven to release the starting shaft 702 from its latch 718. This raises the arm 700 to open the feeding clutch. The clutch member 846 continues its movement until it is thrown out by its own rotation, and all the parts of the machine are returned to normal, ready for another operation.

During the action upon the die, the sensitiveness of the controlling mechanism may be varied by turning the lever 922 to change the relation of the connecting arm 562 to the element in the chain which it actuates. The speed of operation of the machine may be lessened by the back gearing driven from the pulley 248, and the feed of the material may be reversed by the movement of the key 1012, effecting the feed-gearing 234, 236 and 1010. At any time during the operation the entire machine may be stopped without cutting off the stock being operated upon, by the arm 952, which renders inoperative the cutter-actuating mechanism by means of the member 994, prepares the mechanisms for the succeeding operation by the movement of the bar 966, and frees the starting shaft 702 through the agency of the arm 986.

The present case is a division of application Ser. No. 379,588, filed May 7, 1920, directed to a method which may be carried out by the machine of this application, but which is not claimed herein. Said application became United States Patent No. 1,657,015, which issued January 24, 1928.

Having described my invention, what I claim as new and desire to secure by Letters Patent of the United States is:

1. In a machine for forming material in accordance with a pattern, means for restricting the movement of the material, means for relatively moving the restricting means and material, and contact means associated with the restricting means and movable through varying distances depending upon the form of the pattern, said contact means and restricting means acting oppositely upon the material passing between them to bring it to the desired form.

2. In a machine for forming material in accordance with a pattern, means for restricting the movement of the material, means for relatively moving the restricting means and material, and forming means acting under the control of the pattern selectively upon one side of the material or the other while it is under the influence of the restricting means.

3. In a machine for forming material in accordance with a pattern, means for restricting the movement of the material, means for relatively moving the restricting means and material, and independent forming members acting under the control of the pattern upon opposite sides of the material.

4. In a machine for forming material, separated members for restricting the movement of the material, means for feeding the material through the space between the restricting members, and means movable through different distances across the space for progressively bringing the material to the desired form.

5. In a machine for forming material, separated members for restricting the movement of the material, means for feeding the material through the space between the restricting members, the advancing end of the material being free for lateral movement during the forming operation, a member associated with the restricting members for bringing the material to the desired form, and automatic mechanism for selectively moving the forming member in accordance with the form to be imparted.

6. In a machine for forming material, separated members co-operating with the material, means for feeding the material through the space between the members, means for moving the members relatively to hold the material, movable means for forming the material thus held, and automatically controlled mechanism for moving the forming means through different distances.

7. In a machine for forming material, separated members co-operating with the material, means for intermittently feeding the material through the space between the members, automatic mechanism for determining the length of the intermittencies of feed, means operating during such intermittencies for moving the members relatively to hold the material, and means for forming the material thus held.

8. In a bending machine, separated abutments between which the work passes and having end portions beyond which said work is free to move laterally, bending means arranged to move across the space between the abutments and over their end portions, and means for advancing the work through the space to receive the action of the bending means.

9. In a bending machine, separated abutments between which the work passes, bending means arranged to move through varying distances across the space between the abutments, and automatic means for variably actuating the bending means.

10. In a bending machine, separated abutments between which the work passes, bending members arranged to move from opposite sides of the space between the abutments at the point of emergence of the work and across said space, and automatic mechanism for moving one or another of the bending members.

11. In a bending machine, separated abutments having curved end portions and between which the work passes, an oscillatory bender co-operating with the abutments, and means for oscillating the bender over the curved end portions in a path varying in curvature to correspond to the abutments.

12. In a bending machine, separated abutments having curved end portions and between which the work passes, oscillatory benders arranged at opposite sides of the space between the abutments, and independent means for oppositely oscillating the benders in curved paths over the ends of the abutments.

13. In a bending machine, separated abutments between which the work passes, bending means arranged to move across the space between the abutments, automatic means arranged to control the extent of movement of the bending means, and means for advancing the work between the abutments into co-operation with the bending means.

14. In a bending machine, relatively movable abutments between which the work passes, power-operated means for moving an abutment, a movable bender, power-operated means for moving the bender toward and from the work, and clutches controlling the application of power to the abutment and bender.

15. In a die-bending machine, means for feeding a strip of die-stock, separated members between which the strip is fed and which are arranged for contact with its opposite sides, a member co-operating with the strip to bend it against the resistance of said members, and automatic mechanism for controlling the bending member in accordance with the contour of the die to be produced.

16. In a die-bending machine, means for feeding a strip of die-stock, separated jaws between which the strip is fed, means for clamping the jaws upon the strip, and bending means movable selectively into contact with the opposite sides of the clamped strip.

17. In a forming machine, relatively movable abutments co-operating with the work, a slide upon which an abutment is mounted, power means, connections including a member movable upon the slide arranged to move said slide from the power means, and forming means movable in proximity to the abutments.

18. In a forming machine, relatively movable abutments co-operating with the work, a slide upon which an abutment is mounted, a block movable in cooperation with the slide, a power-operated shaft, means arranged to operate the block from the shaft, and forming means co-operating with the abutments.

19. In a forming machine, relatively movable abutments co-operating with the work, a slide upon which an abutment is mounted, a block movable across the slide, a power-operated shaft, an eccentric fixed to the shaft and turning in the block, and forming means co-operating with the abutments.

20. In a forming machine, relatively movable abutments co-operating with the work, a power-shaft, abutment connections, a clutch interposed between the shaft and abutment connections, automatic means for actuating the clutch, and forming means co-operating with the abutments.

21. In a forming machine, relatively movable abutments co-operating with the work, a power-shaft, clutch mechanism associated therewith, an eccentric acting upon an abutment, and gearing connecting the clutch mechanism and eccentric.

22. In a forming machine, feeding mechanism, mechanism co-operating with the work in its forming, and driving means from which the mechanisms are actuated, such mechanisms being arranged to exercise mutual control.

23. In a forming machine, forming mechanism, mechanism arranged to feed material past the forming mechanism, and driving mechanism for the forming and feeding mechanisms, said feeding mechanism being arranged to control the forming mechanism.

24. In a forming machine, forming mechanism, mechanism feeding to the forming mechanism, said forming mechanism being arranged by movement of one of its elements to control the feeding mechanism during the forming action, and driving means for the forming and feeding mechanisms.

25. In a forming machine, forming mechanism, and mechanism feeding to the forming mechanism, one of such mechanisms being arranged to exercise successive controlling actions upon the other during particular portions only of each forming operation.

26. In a forming machine, forming mechanism, actuating mechanism for the forming mechanism, and mechanism feeding to the forming mechanism, said feeding mechanism being arranged to exercise successive controlling actions upon the forming mechanism during each forming operation.

27. In a forming machine, forming mechanism, and mechanism arranged to feed material past the forming mechanism, said feeding mechanism being arranged to control the relation of the forming mechanism to the work while such forming mechanism is inactive.

28. In a forming machine, forming mechanism, means for actuating the forming mechanism, and mechanism feeding to the forming mechanism, said feeding mechanism being arranged to control the force applied by the actuating mechanism to the forming mechanism.

29. In a forming machine, forming mechanism, and mechanism feeding to the forming mechanism, said feeding mechanism being arranged to control, prior to the feeding action, the relation of the forming mechanism to the work.

30. In a forming machine, forming mechanism, and mechanism feeding to the forming mechanism, said forming mechanism being arranged to control the feeding mechanism and thereby cause said feeding mechanism to control the forming mechanism.

31. In a forming machine, a feeding member, power means, connections for driving the feeding member from the power means, a forming member, and connections between the feeding member and power means, the last-mentioned connections acting upon the forming member.

32. In a forming machine, a feeding member, a power-shaft, connections for driving the feeding member from the power-shaft, and a forming member, the connections for the feeding member acting upon the forming member to move it with reference to the line of feed of the work.

33. In a forming machine, a feeding member, a power-shaft, connections for driving the feeding member from the power-shaft, a forming member, means for moving the forming member, and means for controlling said movement, the connections for the feeding member acting upon the controlling means.

34. In a forming machine, a feeding member, a power-shaft, connections for driving the feeding member from the power-shaft, a forming member, means for moving the forming member, and means for controlling said movement, the connections for the feeding member when operating being arranged to hold an element of the controlling means in a predetermined position.

35. In a forming machine, a feeding member, a power-shaft, connections for driving the feeding member from the power-shaft, a forming member, means for moving the forming member, and means for controlling said movement, the connections for the feeding member acting upon the controlling means and being movable under the influence of the forming member to release the controlling means.

36. In a bending machine, a movable bender for the work, power means for moving the bender, means for controlling the power applied to the bender, and mechanism for feeding the work to the bender, said feeding means co-operating with the controlling means.

37. In a bending machine, a movable bender for the work, power means for moving the bender, means for controlling the power applied to the bender, and mechanism for feeding the work to the bender, said feeding means co-operating with the controlling means during the period of feed.

38. In a bending machine, a movable bender for the work, power means for moving the bender, means for controlling the power applied to the bender, and mechanism for feeding the work to the bender, said feeding means co-operating with the controlling means, the feeding mechanism being movable under the influence of the bender to release the controlling means.

39. In a bending machine, a movable bender for the work, power means for moving the bender toward the work, and feeding means for the work movable independently of the bender but arranged during its travel to move said bender from said work.

40. In a forming machine, rotatable feeding members, a rotatable driving shaft, connections between the driving shaft and feeding members and including gearing arranged to revolve idly and to be stopped in its revolution to transmit the rotation of the driving shaft to the feeding members, a controllable forming member, and means arranged to govern the revolution of the gearing and to control the forming member.

41. In a forming machine, rotatable feeding members, a rotatable driving shaft, connections between the driving shaft and feeding members and including gearing arranged to revolve idly and to be stopped in its revolution to transmit the rotation of the driving shaft to the feeding members, a controllable forming member, and means arranged to govern the revolution of the gearing and to move the forming member.

42. In a forming machine, rotatable feeding members, a rotatable driving shaft, connections between the driving shaft and feeding members and including gearing arranged to revolve idly and to be stopped in its revolution to transmit the rotation of the driving shaft to the feeding members, a forming member, a pressure-system including a means for controlling the forming member, and means arranged to govern the revolution of the gearing and the controlling means of the pressure-system.

43. In a forming machine, rotatable feeding members, a rotatable driving shaft, connections between the driving shaft and feeding members and including gearing arranged to revolve idly and to be stopped in its revolution to transmit the rotation of the driving shaft to the feeding members, a forming member, a pressure-system including a means for controlling the forming member, and means arranged to govern the revolution of the gearing and the controlling means of the pressure-system, said governing means being movable in one direction by the gearing and in another direction under the influence of the forming member.

44. In a forming machine, rotatable feeding members, a driving shaft, connections between the driving shaft and feeding members and including gearing, a rack-bar meshing with the gearing, and a movable forming member having a portion moving with it and contacting with the rack-bar.

45. In a forming machine, rotatable feeding members, a driving shaft, connections between the driving shaft and feeding members and including gearing, a rack-bar meshing with the gearing, and a movable forming member having a portion moving with it and contacting with the rack-bar to receive movement therefrom.

46. In a forming machine, rotatable feeding members, a driving shaft, connections between the driving shaft and feeding members and including gearing, a rack-bar meshing with the gearing, and a movable forming member having a portion moving with it and contacting with the rack-bar to impart movement thereto.

47. In a forming machine, rotatable feeding members, a driving shaft, connections between the driving shaft and feeding members and including gearing, a rack-bar meshing with the gearing, a movable forming member having a portion moving with it and contacting with the rack-bar, and controlling means for the forming member operable by the rack-bar.

48. In a forming machine, rotatable feeding members, a driving shaft, connections between the driving shaft and feeding members and including gearing, a rack-bar meshing with the gearing, a movable forming member having a portion moving with it and contacting with the rack-bar to impart movement thereto, and a pressure-system including a valve for controlling the forming member, the valve being permitted to open during said movement of the rack-bar.

49. In a forming machine, rotatable feeding members, a driving shaft, connections between the driving shaft and feeding members and including gearing, a rack-bar moved by the gearing, a movable forming member, and a pressure-system including a valve for controlling the forming member, the valve being subjected to a closing action by the movement of the rack-bar under the influence of the gearing.

50. In a forming machine, forming mechanism, rotatable rolls for feeding the material to the forming mechanism, a driving shaft, connections between the driving shaft and feeding rolls including gearing having an idle movement of revolution and a transmitting movement of rotation, and means actuated in the movement of the gearing for controlling said movement.

51. In a forming machine, bending mechanism, rotatable rolls for feeding the material to the bending mechanism, a driving shaft, a clutch interposed between the driving shaft and feeding rolls and including elements which may be separated to disconnect the shaft and rolls, and automatic means acting in accordance with the operation of the bending mechanism for moving the clutch elements into and out of driving engagement.

52. In a forming machine, bending mechanism, rotatable rolls for feeding the material to the bending mechanism, a driving shaft, a clutch interposed between the driving shaft and feeding rolls, means for holding the clutch normally engaged, and automatic means for releasing the clutch during the operation of the bending machanism.

53. In a forming machine, forming means, relatively movable abutments with which the forming means co-operates, means for feeding the work between the abutments, a power-shaft, clutches for respectively transmitting power from the shaft to the abutments and to the feeding means, and means arranged to simultaneously release one clutch and engage the other.

54. In a forming machine, forming means, relatively movable abutments with which the forming means co-operates, means for feeding the work between the abutments, a power-shaft, clutches for respectively transmitting power from the shaft to the abutments and to the feeding means, the feeding clutch being normally in engagement, and means arranged to release said feeding clutch and engage the abutment-clutch to stop the advance of the work and clamp it between the abutments.

55. In a machine for forming material, a member differently movable to form the material, mechanism for feeding material to the forming member, and means dependent in its action upon the character of the forming operation for stopping the feeding mechanism or allowing it to advance the material.

56. In a machine for forming material, a movable member for forming the material, mechanism for feeding material to the forming member, and means dependent in its action upon the extent of movement of the forming member for stopping the feeding mechanism or allowing it to advance the material.

57. In a forming machine, feeding mechanism arranged to advance material, abutments between which the material passes and is bent in its advance, and forming means co-operating with the material as it emerges between the abutments and arranged to bend it in opposite directions across said abutments.

58. In a forming machine, forming mechanism, rotatable rolls arranged to receive material between them and advance it to the forming mechanism, and means arranged to vary the angular relation of one of said rolls about the axis of another.

59. In a forming machine, feeding mechanism arranged to simultaneously advance and bend material to deflect its longitudinal axis, and separated members having walls between which the material passes, said walls being curved transversely to the direction of advance to conform generally to the contour imparted by the feeding mechanism.

60. In a forming machine, feeding mechanism arranged to simultaneously advance and bend material, abutments between which the bent material passes, and a bodily movable forming member co-operating with the material as it emerges from between the abutments.

61. In a forming machine, feeding mechanism arranged to simultaneously advance and bend material, abutments having walls curved to conform to the contour imparted to the work by the feeding mechanism and between which the bent material passes, and forming means co-operating with the material as it emerges from between the abutments and movable transversely of the ends thereof.

62. In a forming machine, feeding mechanism arranged to advance material, abutments between which the material passes, forming means co-operating with the material as it emerges from between the abutments, and means for controlling the forming means arranged for engagement by the advanced material.

63. In a forming machine, feeding mechanism arranged to simultaneously advance and bend material, abutments between which the bent material passes, forming means co-operating with the material as it emerges from between the abutments, and means for controlling the formation of material situated near the point of entrance of the material between the abutments to receive contact of the bent and formed material.

64. In a strip-bending machine, means for bending a strip, means for advancing the bent strip, and means movable bodily under the influence of the strip and situated in advance of the bending means for resisting the deflection of said strip out of the plane in which it is bent.

65. In a strip-bending machine, means for bending the strip, means for advancing the bent strip, and means movable by the strip for supporting it in its advance.

66. In a strip-bending machine, means for bending the strip, means for advancing the bent strip, and supporting means swinging under the influence of the formed advancing strip.

67. In a strip-bending machine, means for bending the strip, means for advancing the bent strip, and means arranged to clamp the forward extremity of the strip and to support and be advanced by said strip.

68. In a strip-bending machine, means for bending the strip, means for advancing the bent strip, and a pivoted arm provided with means to engage the strip continuously in its advance and during the bending operation.

69. In a strip-bending machine, means for bending the strip, means for advancing the bent strip, and an arm having a plurality of pivoted sections confined to movement in the plane of bending and one of which is provided with means for clamping the strip.

70. In a strip-bending machine, means for bending the strip, means for advancing the bent strip, a pivoted arm, and strip-engaging means swiveled upon the arm.

71. In a machine for bending material, bending means, means for advancing material to the bending means, a movable carrier, and a plurality of devices mounted upon the carrier and arranged for independent engagement with different portions of the material to support it in its advance.

72. In a machine for bending material, bending means, means for advancing material to the bending means, a pivoted arm, a yoke pivoted on the arm, and material-engaging devices mounted upon opposite extremities of the yoke.

73. In a strip-bending machine, means for bending the strip, means for advancing the bent strip, means movable with the strip for resisting its deflection out of the plane in which it is bent, and means arranged to permit the relation of the resisting means to said plane to be varied.

74. In a strip-bending machine, means for bending the strip, means for advancing the bent strip, a pivoted arm, a yoke having separated strip-engaging members supported upon the arm, and means arranged to move the yoke toward and from the arm.

75. In a machine for forming cutting dies from a strip of stock having inclined side walls, means for bending the strip along its length to the desired form, means for feeding the stock forward along the plane of the die, and means for resisting the deflection of the formed stock in the direction of the inclination of the walls.

76. In a bending machine, a plurality of bending members pivoted about a common center, and means acting independently upon the respective bending members for selectively swinging one or another of said members into contact with the work.

77. In a bending machine, spaced abutments between which the work projects, a bending member mounted to move in contact with the work in different directions for co-operation with both abutments, and automatic means for controlling the extent of movement of the bending member along the abutments.

78. In a bending machine, a plurality of pivot members situated with their axes spaced from one another, and a bending member mounted to move in constant engagement with said pivot members but shifting bodily with relation thereto.

79. In a bending machine, a bending member mounted to move about a plurality of centers upon different radii, and automatic mechanism for controlling the extent of movement about both centers.

80. In a bending machine, a plurality of bending devices, and a plurality of pivot members common to the bending devices and with which all simultaneously contact but which are successively effective as fulcra for said bending devices.

81. In a bending machine, a stationary pivot member, a bending member arranged to move about the pivot member as an axis and also to move independently along and constantly in engagement with said member, and a second pivot member arranged to furnish an axis for the bending member during the last-mentioned movement.

82. In a bending machine, a bending member mounted to move successively about a plurality of centers, and a moving member for the bending member having an operating portion concentric to each center.

83. In a bending machine, a pivot member, a bending member arranged to rotate about the pivot member as an axis and also to move bodily past said member independently of the movement of rotation, and means arranged to constrain the bending member to move in the desired paths.

84. In a bending machine, separated abutments between which the work projects, a bending member co-operating with the abutments, and means for moving the bending member from one abutment toward the other, the moving means being arranged to turn the bending member about different centers for co-operation with the respective abutments.

85. In a bending machine, separated abutments between which the work projects, a bending member situated adjacent to each abutment, and means for moving each bending member from one abutment toward the other, the moving means being arranged to change the center about which movement occurs as the bending member approaches the opposite abutment.

86. In a bending machine, separated abutments between which the work projects, a bending member co-operating with the abutments, and means for moving the bending member in arcs of different radii along the abutments and over across the space between them from one abutment to the other.

87. In a bending machine, a carrier having a plurality of slots, a pivot member projecting into each slot, means for moving the carrier about both pivot members, and a bender mounted upon the carrier.

88. In a bending machine, a carrier having a plurality of arcuate slots, a pivot member projecting into each slot, means for moving the carrier about both pivot members, and a bender mounted upon the carrier.

89. In a bending machine, a carrier having a plurality of slots each curved about a center lying in the companion slot, a pivot member projecting into each slot, means for moving the carrier about both pivot members, and a bender mounted upon the carrier.

90. In a bending machine, a carrier having a plurality of slots, a pivot member projecting into each slot, means for moving the carrier about both pivot members, a bender mounted upon the carrier, a gear fixed to the carrier and having portions curved about the same centers as the slots, and driving pinions engaging the gears.

91. In a bending machine, a bender-carrier having a plurality of slots, a pivot member projecting into each slot, and a relatively fixed member having walls contacting with the carrier and co-operating with the slots and pivot members to guide said carrier.

92. In a bending machine, a bender-carrier having a plurality of slots each curved about a center lying in the companion slot, and a relatively fixed member having walls correspondingly curved, said walls contacting with the carrier and co-operating with the slots and pivot members to guide said carrier.

93. In a bending machine, a plurality of carriers each having a plurality of slots, pivot-rods extending through the slots in both carriers, and benders mounted upon the carriers.

94. In a bending machine, a plurality of carriers each having a plurality of arcuate slots of different radii, pivot-rods extending through the slots of both carriers, each rod co-operating with differently curved slots, and benders mounted upon the carriers.

95. In a machine for bending material in accordance with a pattern, bending mechanism operating upon opposite sides of the work, power means for imparting opposite movement to the bending mechanism, and automatic means acting under the influence of the pattern for selectively determining in which direction the bending mechanism is to be moved.

96. In a forming machine, forming mechanism, power means for imparting opposite movement to the forming mechanism, and clutch mechanism for determining the application of power to the forming mechanism arranged to occupy a neutral position in which the work is not operated upon and opposite active positions in which the forming mechanism is caused to act oppositely upon the work.

97. In a forming machine, forming mechanism, power means for imparting opposite movement to the forming mechanism, and connections between the power means and the forming mechanism arranged to occupy a neutral position in which the work is not operated upon and opposite active positions in which the forming mechanism is caused to act oppositely upon the work.

98. In a bending machine, bending mechanism operating upon opposite sides of the work, power means for imparting opposite movement to the bending mechanism, and connections between the power means and bending mechanism arranged to occupy a neutral position in which the work is not operated upon and opposite active positions in which the bending mechanism is caused to operate upon one side of the work or the other.

99. In a bending machine, bending mechanism operating upon opposite sides of the work, power means for imparting opposite movement to the bending mechanism, connections between the power means and bending mechanism arranged to occupy a neutral position in which the work is not operated upon and opposite active positions in which the bending mechanism is caused to operate upon one side of the work or the other, and automatic means for determining which of the connections shall operate.

100. In a forming machine, forming mechanism, power means for imparting opposite movement to the forming mechanism, means for determining the application of power to the forming mechanism arranged to occupy a neutral position in which the work is not operated upon and opposite active positions in which the forming mechanism is caused to act oppositely upon the work, and means acting to return the determining means from active to neutral position, said returning means exerting force upon the connections only when these are out of neutral.

101. In a forming machine, forming mechanism, power means for imparting opposite movement to the forming mechanism, means for determining the application of power to the forming mechanism arranged to occupy a neutral position in which the work is not operated upon and opposite active positions in which the forming mechanism is caused to act oppositely upon the work, springs acting to move the determining means from both active positions to neutral, and relatively fixed members against which the springs act when the connections are in neutral.

102. In a forming machine, movable bending mechanism, clutch mechanism for driving the bending mechanism, the clutch mechanism when released tending to exert some residual force to continue the bending movement, and means for exerting upon the bending mechanism a force opposite to said residual force.

103. In a forming machine, movable mechanism for operating upon the work, clutch mechanism including a power-driven element and an element for driving the operating mechanism, and a weight connected to the driving element and acting against the power-driven element.

104. In a bending machine, strip-feeding means arranged to advance a strip longitudinally, bending means arranged to act upon the strip while it remains under the influence of the feeding means, and means for moving the bending means into and out of contact with the strip, said bending means being organized to apply heat to the strip upon engagement therewith.

105. In a bending machine, strip-feeding means arranged to advance a strip longitudinally, bending means arranged to act upon the strip while it remains under the influence of the feeding means, and means for moving the bending means into and out of contact with the strip, said bending means being organized to apply electric current to the strip upon engagement therewith to heat said strip.

106. In a strip-bending machine, separated abutments between which the strip is located, mechanism for feeding the strip between the abutments, a bending member acting upon the strip, and an electric heating circuit of which the abutments and bending member are terminals.

107. In a strip-bending machine, bending members movable selectively into and out of contact with one or the other of opposite sides of the strip, and an electric circuit to which the bending members are joined in parallel and organized to heat the strip for bending.

108. In a forming machine, intermittently operating work-feeding means, forming means acting upon the work during the intermittencies of feed, and means arranged to apply heat to the work during the action of the forming means only.

109. In a forming machine, a movable member for operating upon the work, and heating means controlled in the movement of the member and independently of its contact with the work.

110. In a forming machine, a movable member for operating upon the work, means for moving the member, and heating means for the work controlled by the moving means only after the forming operation begins.

111. In a forming machine, a forming member movable into and out of contact with the work, an electric circuit for heating the work and including the forming member, and automatic means for controlling the heating circuit at a time other than during a change of contact between the work and forming member.

112. In a forming machine, a forming member movable into and out of contact with the work, means for heating the work through the forming member, and mechanism operable with the forming member for initiating the heating effect only after engagement of the forming member with the work.

113. In a forming machine, a forming member movable into and out of contact with the work, an electric circuit for heating the work and including the forming member, and means for completing the heating circuit operable only after contact of the forming member with the work.

114. In a forming machine, a movable forming member for the work, driving means, connections between the driving means and forming member, an electric heating circuit for the work including the forming member, and controlling means for the heating circuit operable under the influence of the driving means.

115. In a forming machine, a movable forming member for the work, driving means, connections between the driving means and forming member, an electric heating circuit for the work including the forming member, and controlling means for the heating circuit actuated by the driving connections.

116. In a forming machine, a movable forming member for the work, an electrical heating circuit for the work, mechanism for driving the forming member, connections between the driving mechanism and forming member, and controlling means for the circuit operable by the connections.

117. In a forming machine, a movable forming member for the work, an electrical circuit for heating the work, a shaft for driving the forming member, a clutch interposed between the driving shaft and forming member, and contact members included in the circuit and being movable with an element of the clutch, one of said members being arranged to slip during the action of the clutch to change the relation of the contact members.

118. In a forming machine, a movable forming member, an electrical heating circuit for the work, a shaft for driving the forming member, a clutch interposed between the driving shaft and forming member, and controlling means for the circuit operable by the clutch.

119. In a forming machine, a movable forming member for the work, an electrical circuit for heating the work, a shaft for driving the forming member, a clutch having an element driven from the shaft and an element arranged to drive the forming member, separate contacts carried by the driving element and included in the heating circuit, and a contact mounted to turn with the driven element, the last-mentioned contact member being arranged to engage its companions after the engagement of the forming member with the work under the influence of the clutch.

120. In a forming machine, a forming member movable into and out of contact with the work, means for heating the work through the forming member, and automatic means for stopping the heating effect before separation between the forming member and the work.

121. In a forming machine, a forming member movable into and out of contact with the work, an electric circuit for heating the work and including the forming member, and means operable with the forming member for breaking the heating circuit before separation between the forming member and work.

122. In a forming machine, a movable forming member, means for controlling the movement of the forming member, an electric heating circuit for the work including the forming member, and means under the influence of the controlling means for governing the heating circuit.

123. In a forming machine, a movable forming member, a power-shaft, connections between the power-shaft and forming member, means for controlling the connections, an electric heating circuit for the work including the forming member, and contacts in the heating circuit governed by the controlling means.

124. In a forming machine, a movable forming member, a power-shaft, connections between the power-shaft and forming member, means for controlling the connections, an electric heating circuit for the work including the forming member, contacts in the heating circuit, means arranged to operate the contacts from the power-shaft, and connections between said operating means and the controlling means.

125. In a forming machine, a movable forming member, a power-shaft, an electric heating circuit for the work including the forming member, contacts in the heating circuit, and a friction device arranged to operate the contacts from the power-shaft.

126. In a forming machine, a movable forming member, a power-shaft, connections between the power-shaft and forming member, means for controlling the connections, an electric heating circuit for the work including the forming member, contacts in the heating circuit, a friction device arranged to operate the contacts from the power-shaft, and connections between the friction-device and controlling means.

127. In a forming machine, a movable forming member, a power-shaft, a clutch for operating the forming member from the power-shaft, a lever-system for controlling the clutch, an electric heating circuit for the work including the forming member and a contact device, and means for governing the contact device from the lever-system.

128. In a forming machine, a movable forming member, a power-shaft, a clutch for operating the forming member from the power-shaft, a lever system for controlling the clutch, an electric heating circuit for the work including the forming member and a contact device, a friction device arranged to operate the contact device from the power-shaft, and connections between the lever-system and friction device.

129. In a forming machine, forming mechanism, means for moving the forming mechanism oppositely against the work, heating means for the work, and means controlling the heating means under the influence of both movements of the forming mechanism.

130. In a forming machine, forming mechanism, a power-shaft, separate devices associated with the power-shaft for moving the forming mechanism in opposite directions against the work, heating means for the work, and means associated with each device for controlling the heating means.

131. In a forming machine, a plurality of forming members, a power-shaft, a clutch for connecting each forming member to the shaft, contact devices, an electric heating circuit for the work including the forming members and the contact devices, and means associated with each clutch for controlling a contact device.

132. In a forming machine, forming mechanism, power mechanism, separate devices associated with the power mechanism for moving the forming mechanism in opposite directions against the work, means for controlling the devices, heating means for the work, and means for governing the heating means from the controlling means when it affects one of the devices.

133. In a forming machine, forming mechanism, a power-shaft, separate devices associated with the power-shaft for moving the forming mechanism in opposite directions against the work, means associated with each device for controlling the heating means, means for controlling the devices, heating means for the work and means under the influence of the last-named controlling means for governing the heating means.

134. In a forming machine, a plurality of forming members, a power-shaft, a clutch for connecting each forming member to the shaft, contact devices, an electric heating circuit for the work including the forming members and the contact devices, means associated with each clutch for controlling a contact device, a lever-system for governing the clutches, and connections to the lever-system for controlling a contact device.

135. In a forming machine, movable forming means acting upon the work, heating means for the work, and mechanism having elements set in operation in the movement of the forming means and controlling the heating means in accordance with the extent of forming action.

136. In a strip-bending machine, an angularly movable bending member acting upon the strip, heating means for the strip, and means for controlling the heating means in accordance with the angle through which the bending member moves.

137. In a forming machine, a movable forming member, a switch included in the circuit, an electric heating circuit for the work, and means for operating the switch after a predetermined extent of movement of the forming member.

138. In a forming machine, forming means acting upon the work, actuating means for the forming means, means opposing the movement of the actuating means, heating means for the work, and means operated by the opposing means for controlling the heating means.

139. In a forming machine, a movable forming member, a power-shaft, connections between the power-shaft and forming member, a member moved by the connections and opposing their movement, an electric heating circuit for the work, and means actuated by the opposing member for controlling the circuit.

140. In a forming machine, a movable forming member, a power-shaft, a clutch having an element driven by the power-shaft and an element driving the forming member, a weight movable by one of the elements of the clutch, a heating circuit for the work, and means movable with the weight for controlling the circuit.

141. In a forming machine, a movable forming member, a power-shaft, a clutch having an element driven by the power-shaft and an element driving the forming member, a weight movable by the driving element of the clutch, a heating circuit for the work, contacts in said circuit, and means movable with the weight for opening the contacts.

142. In a forming machine, forming means acting upon the work, heating means for the work, means for controlling the heating means in accordance with the extent of forming action, and means arranged to vary the period of the forming action at which the control is exercised.

143. In a strip-bending machine, a bending member acting upon the strip, heating means for the strip, means for controlling the heating means in accordance with the angle through which the strip is bent, and means arranged to render the controlling means effective at different angles.

144. In a forming machine, a movable forming member, a power-shaft, a clutch having an element driven by the power-shaft and an element driving the forming member, a weight movable by the driving element of the clutch, a heating circuit for the work, contacts in said circuit, means movable with the weight for operating the contacts, and means arranged to permit the normal relation between the contacts and weight to be varied.

145. In a forming machine, forming means acting upon the work, heating means for the work, automatic means for governing the heating means, and operator-governed means for nullifying the automatic control.

146. In a forming machine, forming means acting upon the work, an electric heating circuit for the work, means acting in the operation of the machine for governing the circuit, and operator-governed means for nullifying said control.

147. In a forming machine, forming means acting upon the work, an electric heating circuit for the work, contacts governed in the operation of the machine for opening the circuit, and operator-governed means for short-circuiting said contacts.

148. In forming machine, means for operating upon the work, means for heating the work including an electric circuit making variable contact with the work, and a burner arranged to deliver its flame at such point of contact.

149. In a forming machine, a forming member contacting with the work, an electric heating circuit including the forming member, and a gas burner arranged to deliver its flame at the point of contact between the forming member and work.

150. In a machine for operating upon material in accordance with a pattern, a plurality of operating mechanisms, and feeler mechanism arranged to control any one of the operating mechanisms.

151. In a machine for forming material in accordance with a pattern, means for operating upon the material, and means governed by its contact with the pattern and controlling the relation between the operating means and the material.

152. In a machine for forming material in accordance with a pattern, means for operating upon the material, power means, and means governed by the relation between the material and pattern and controlling the application of power to the operating means.

153. In a machine for forming material in acordance with a pattern, forming means arranged to act in opposite directions upon the material, and means governed by the relation between the material and pattern for controlling the relation between the forming means and the material.

154. In a machine for forming material in accordance with a pattern, forming means arranged to contact with opposite sides of the material, and means governed by the relation between the material and pattern for controlling the movement of the forming means in opposite directions.

155. In a machine for forming material in accordance with a pattern, forming means acting upon the material, feeding means for the material, and means governed by the relation between the material and pattern for controlling the feeding means.

156. In a machine for forming material in accordance with a pattern, forming means acting upon the material, means for clamping the material, and means governed by the relation between the material and pattern for controlling the clamping means.

157. In a machine for forming material in accordance with a pattern, forming means acting upon the material, feeding means for the material, and means governed by the relation between the material and pattern for controlling the forming and feeding means.

158. In a machine for forming material in accordance with a pattern, forming means acting upon the material, means for clamping the material, and means governed by the relation between the material and pattern for controlling the forming and clamping means.

159. In a machine for forming material in accordance with a pattern, forming means acting upon the material, feeding means for the material, means for clamping the material, and means governed by the relation between the material and pattern for controlling the forming, feeding and clamping means.

160. In a strip-bending machine, means for advancing the strip, a gaging member arranged for movement by the strip throughout its advance, bending means acting upon the strip, and means for controlling the bending means in accordance with the position of the gaging member.

161. In a forming machine, means for advancing the work, a gaging member arranged for movement by the work throughout its advance, forming means acting upon the work, and means controlled by the movement of the gaging member for moving the forming means.

162. In a forming machine, means for advancing the work, a gaging member arranged for movement by the work throughout its advance, forming means acting upon the work, and means for controlling the advancing means in accordance with the position of the gaging member.

163. In a strip-bendig machine, means for advancing the strip, a gaging member arranged for movement by the strip throughout its advance, bending means acting upon the strip, and means for controlling the advancing and bending means in accordance with the position of the gaging member.

164. In a strip-bending machine, means for advancing the strip, a gaging member movable in the advance of the strip, bending means acting upon the strip, means movable to clamp the strip, and means for controlling the clamping and bending means in accordance with the position of the gaging member.

165. In a machine for forming material in accordance with a pattern, means for operating in opposite directions upon the material, and means governed by opposite changes in relation between the material and pattern for oppositely controlling the operating means.

166. In a strip-bending machine, means for advancing the strip, a gaging member movable in the advance of the strip in opposite directions from a neutral position, means acting upon the strip to bend it oppositely, and means controlled by the respective movements of the gaging member for correspondingly moving the bending means.

167. In a strip-bending machine, means for advancing the strip, a gaging member movable in the advance of the strip in opposite directions from a neutral position, means acting upon the strip to bend it oppositely, means for controlling the bending means to correspond to the departure of the gaging member from neutral, and means for stopping the advancing means upon said departure in either direction.

168. In a strip-bending machine, means for advancing the strip, a gaging member movable in the advance of the strip in opposite directions from a neutral position, means acting upon the strip to bend it oppositely, means movable to clamp the strip, means for controlling the bending means to correspond to the departure of the gaging member from neutral, and means for setting the clamping means upon said departure in either direction.

169. In a strip-bending machine, means for advancing the strip, a gaging member movable in the advance of the strip in opposite directions from a neutral position, means acting upon the strip to bend it oppositely, means movable to clamp the strip, means for controlling the bending means to correspond to the departure of the gaging member from neutral, and means for stopping the advancing means and for setting the clamping means upon said departure in either direction.

170. In a machine for forming material in accordance with a pattern, movable mechanism co-operating with the material in its formation, a member movable under the guidance of the pattern, power mechanism for moving the movable mechanism, and fluid means governed by the movement of said member and governing the power mechanism.

171. In a machine for forming material in accordance with a pattern, movable mechanism co-operating with the material in its formation, a member movable under the guidance of the pattern, power mechanism for moving the movable mechanism, and fluid means including primary and secondary controlling devices governed by the movement of said member and governing the power mechanism.

172. In a machine for forming material in accordance with a pattern, movable mechanism co-operating with the material in its formation, a member movable under the guidance of the pattern, power mechanism for moving the movable mechanism, and fluid means including primary and secondary controlling devices and a power device governed by the movement of said member and governing the power mechanism.

173. In a machine for forming material in accordance with a pattern, movable mechanism co-operating with the material in its formation, a member movable under the guidance of the pattern, power mechanism for moving the movable mechanism, a lever-system moved by the member, and fluid means governed by the movement of said lever-system and governing the power mechanism.

174. In a machine for forming material in accordance with a pattern, movable mechanism co-operating with the material in its formation, a member movable under the guidance of the pattern, power mechanism for moving the movable mechanism, a lever-system moved by the member, and fluid means including primary and secondary controlling devices and a power device, said primary controlling device being governed by the lever-system and this control being successively transmitted through the secondary and power fluid devices to the power mechanism.

175. In a machine for forming material in accordance with a pattern, movable mechanism co-operating with the material in its formation, a member movable under the guidance of the pattern, power means, and clutch mechanism governed by the movable member for moving the movable mechanism from the power means.

176. In a machine for forming material in accordance with a pattern, movable mechanism co-operating with the material in its formation, a member movable under the guidance of the pattern, power means, clutch mechanism for moving the movable mechanism from the power means, and fluid means governed by the movement of the member and governing the clutch mechanism.

177. In a machine for forming material in accordance with a pattern, movable mechanism co-operating with the material in its formation, a member movable under the guidance of the pattern, power means, clutch mechanism for moving the movable mechanism from the power means, and a lever-system interposed between the movable member and clutch mechanism.

178. In a machine for forming material in accordance with a pattern, movable mechanism co-operating with the material in its formation, a member movable under the guidance of the pattern, power means, clutch mechanism for moving the movable mechanism from the power means, and pneumatic means governed by the movement of the member and governing the clutch mechanism.

179. In a machine for forming material in accordance with a pattern, movable mechanism co-operating with the material in its formation, a member movable under the guidance of the pattern, power means, clutch mechanism for moving the movable mechanism from the power means, fluid means governed by the movement of the member and governing the clutch mechanism, and movement-transmitting lever-systems interposed between the member and fluid means and between said fluid means and the clutch mechanism.

180. In a machine for bending material in accordance with a pattern, a movable bending member, and a controlling member therefor co-operating with the pattern and being movable to determine the bending axis and the character of the bending movement.

181. In a machine for forming material in accordance with a pattern, means for operating upon the material, and means governed by the relation between the material and pattern for controlling the relation between the operating means and material, said controlling means being arranged to move under the governing influence in a plurality of directions angularly related.

182. In a machine for forming material in accordance with a pattern, means for operating upon the material, means governed by the relation between the material and pattern for controlling the relation between the operating means and material, and a plurality of means for yieldably mounting the controlling means.

183. In a machine for forming material in accordance with a pattern, means for operating upon the material, controlling means for the operating means including a movable member, and a member for contact with the pattern yieldable upon said member.

184. In a machine for forming material in accordance with a pattern, means for operating upon the material, controlling means for the operating means including a lever, a carrier-lever mounted thereon, springs interposed between the levers, and a member for contact with the pattern mounted upon the carrier-lever.

185. In a machine for forming material in accordance with a pattern, means for operating upon the material, power means for moving the operating means, and means acting upon the power means and controlling the relation between the operating means and material, said controlling means including members contacting with both the material and pattern.

186. In a machine for forming material in accordance with a pattern, forming means acting upon the material, power means for moving the forming means, and means acting upon the power means and governing the forming means, said governing means including members contacting with both the material and pattern.

187. In a machine for forming material in accordance with a pattern, means for operating upon the material, and differentially movable members contacting with the pattern and material and controlling the relation between the operating means and material.

188. In a machine for forming material in accordance with a pattern, means for operating upon the material, and differentially movable members contacting with the pattern and material and controlling the relation between the operating means and material, said members exercising their controlling function only when the material and pattern depart from a predetermined relation.

189. In a machine for bending die-stock in accordance with a templet, a feeler movable by the templet, a feeler movable by the stock, and bending mechanism controlled by the relative movement of the feelers.

190. In a machine for forming material in accordance with a pattern, means for operating upon the material, contact-members for the pattern and material, interconnected levers upon which the contact members are mounted, and connections to one of the levers for controlling the operating means.

191. In a machine for forming material in accordance with a pattern, means for operating upon the material, contact members for the pattern and material, a lever upon which one of the contact members is mounted, a lever fulcrumed upon the first-mentioned lever and carrying the other contact member, and connections to the last-mentioned lever for controlling the operating means.

192. In a machine for forming material, means for operating upon the material, power means for moving the operating means, a form-determining member, connections between said member and the power means, said connections including an element constructed and arranged to have a neutral inactive position, and means arranged to permit the normal relation between the member and said element to be varied.

193. In a machine for forming material in accordance with a pattern, means for operating upon the material, power means for moving the operating means, a member movable under the guidance of the pattern, connections between said member and the power means, said connections including an element constructed and arranged to have a neutral inactive position, and means arranged to permit the connection to be varied to change the normal relation between the member and said element.

194. In a machine for forming material in accordance with a pattern, means for operating upon the material, power means for moving the operating means, a member movable under the guidance of the pattern, connections between said member and the power means, said connections including an element constructed and arranged to have a neutral inactive position, and means arranged to permit the length of a portion of the connections to be varied.

195. In a machine for forming material in accordance with a pattern, means for operating upon the material, power means for moving the operating means, a member movable under the guidance of the pattern, connections between said member and the power means, said connections including a valve, a lever and a link actuating the valve from the member, said link being in sections, and means arranged to fix the sections in different relations.

196. In a machine for forming material in accordance with a pattern, means for operating upon the material, power means for moving the operating means, a member movable under the guidance of the pattern, connections between said member and the power means, said connections including an element constructed and arranged to have a neutral inactive position, means arranged to permit the connections to be varied to change the normal relation between the member and said element, and means arranged to gradually effect such change.

197. In a machine for forming material in accordance with a pattern, means for operating upon the material, power means for moving the operating means, a member movable under the guidance of the pattern, connections between said member and the power means, said connections including a valve and a lever and link actuating the valve from the member, said link being in sections, means arranged to gradually vary the relation between the sections, and means arranged to fix the sections in different relations.

198. In a machine for forming material in accordance with a pattern, means for operating upon the material, power means for moving the operating means, a member movable under the guidance of the pattern, connections between said member and the power means, said connections including an element constructed and arranged to have a neutral inactive position, and means arranged to permit the relation between the extent of movement of the member and the response of the element to be varied.

199. In a machine for forming material in accordance with a pattern, means for operating upon the material, power means for moving the operating means, a member movable under the guidance of the pattern, connections between said member and the power means, said connections including an element constructed and arranged to have a neutral inactive position, and means arranged to permit the connection to be varied to change the relation between the extent of movement of the member and the departure of the element from neutral.

200. In a machine for forming material in accordance with a pattern, means for operating upon the material, power means for moving the operating means, a member movable under the guidance of the pattern, connections between said member and the power means, and means arranged to permit the extent of movement of the member by the connections to be varied.

201. In a machine for forming material in accordance with a pattern, means for operating upon the material, power means for moving the operating means, a member movable under the guidance of the pattern, and connections between said member and the power means including a pivoted arm and a link joined thereto, said arm and link being arranged to be united at different distances from the pivot.

202. In a machine for forming material in accordance with a pattern, means for operating upon the material, power means for moving the operating means, a member movable under the guidance of the pattern, connections between said member and the power means, said connections including an element constructed and arranged to have a neutral inactive position, and means arranged to permit the relation between the extent of movement of the member and the response of the element to be varied during the operation of the machine.

203. In a machine for forming material in accordance with a pattern, means for operating upon the material, power means for moving the operating means, a member movable under the guidance of the pattern, connections between said member and the power means, and means arranged to introduce lost motion into the connections.

204. In a machine for forming material in accordance with a pattern, means for operating upon the material, power means for moving the operating means, a member movable under the guidance of the pattern, connections between said member and the power means, and means arranged to vary the normal separation between a portion of the connections and another which actuates it.

205. In a machine for forming material in accordance with a pattern, means for operating upon the material, power means for moving the operating means, a member movable under the guidance of the pattern, connections between said member and the power means including an arm and a pivot therefor, said arm and pivot being arranged to be spaced from each other, and an operator-governed device for varying such separation.

206. In a machine for forming material, means for operating upon the material, power means for moving the operating means, a movable form-determining member, connections between said member and the power means, and means arranged to fix one portion of the connections while another portion is free for movement.

207. In a machine for forming material in accordance with a pattern, means for operating upon the material, power means for moving the operating means, a member movable under the guidance of the pattern, connections between said member and the power means including a lever, an adjustable link connected to the lever, and a screw movable against the lever.

208. In a machine for forming material in accordance with a pattern, means for operating upon the material, power means for moving the operating means, a member movable under the guidance of the pattern, connections between said member and the power means, and means arranged to lock the member out of co-operation with the pattern.

209. In a machine for forming material in accordance with a pattern, means for operating upon the material, power means for moving the operating means, a member movable under the guidance of the pattern, connections between said member and the power means, and means engaging the connections to lock the member out of co-operation with the pattern.

210. In a machine for forming material, means for operating upon the material, power means for moving the operating means, a movable form-determining member, and a pneumatic system including a valve movable under the influence of the member and a pressure cylinder controlled by the valve and affecting the power means.

211. In a machine for forming material in accordance with a pattern, means for operating upon the material, power means for moving the operating means, a member controlled under the guidance of the pattern, and a pneumatic system including a primary valve movable under the influence of the member, a secondary valve governed by the primary valve and a pressure cylinder controlled by the secondary valve and affecting the power means.

212. In a machine for forming material in accordance with a pattern, means for operating upon the material, power means for moving the operating means, a member movable under the guidance of the pattern, a primary pneumatic valve movable in opposite directions from the neutral position under the influence of the member, a secondary pneumatic valve movable in opposite directions in accordance with the travel of the primary valve, two power cylinders containing pistons operable by air under pressure admitted selectively by the secondary valve, and connections between the pistons and power means.

213. In a machine for forming material in accordance with a pattern, means for operating upon the material, power means for moving the operating means, a member movable under the guidance of the pattern, a primary pneumatic valve movable in opposite directions from the neutral position under the influence of the member, a cylinder containing a piston operable by air under pressure admitted by the primary valve, a secondary valve actuated by the travel of the piston in opposite directions, two power cylinders containing pistons operable by air under pressure admitted by the secondary valve, and connections between the pistons and power means.

214. In a forming machine, means for operating upon the work, power means for moving the operating means, and a fluid pressure-system controlling the power means and being provided with a leak-opening effective during the application of operating pressure.

215. In a forming machine, means for operating upon the work, a fluid pressure-system controlling the operating means and being provided with a leak-opening, and means arranged to vary the magnitude of the leak effective during the application of operating pressure.

216. In a machine for forming material in accordance with a pattern, means for operating upon the material, power means for moving the operating means, a member movable under the guidance of the pattern, a pneumatic system including a valve movable under the influence of the member, and a pressure cylinder controlled by the valve and affecting the power means, there being a leak-opening between the valve and cylinder.

217. In a machine for forming material in accordance with a pattern, means for operating upon the material, power means for moving the operating means, a member movable under the guidance of the pattern, a pneumatic system including a valve movable under the influence of the member, a pressure-cylinder controlled by the valve and affecting the power means, there being a leak-opening between the valve and cylinder, and a valve controlling the leak-opening.

218. In a machine for forming material in accordance with a pattern, means for operating upon the material, power means for moving the operating means, a member movable under the guidance of the pattern, a pneumatic system including a primary valve movable under the influence of the member, a secondary valve governed by the primary valve, and a pressure cylinder controlled by the secondary valve and affecting the power means, there being a leak-opening between the secondary valve and cylinder.

219. In a machine for forming material in accordance with a pattern, a plurality of movable means for operating upon the material, power means including a controllable element for moving each operating means, and a lever-system movable under the guidance of the pattern and arranged to simultaneously affect the controllable elements.

220. In a machine for forming material in accordance with a pattern, movable means for operating upon the material, power means for moving the operating means and including a controllable element, a member movable under the guidance of the pattern oppositely from a neutral position, and a lever-system movable under the influence of the member and arranged to affect the controllable element in the same manner upon movement of said member in either direction.

221. In a machine for forming material in accordance with a pattern, movable means for operating upon the material, power means for moving the operating means and including a controllable element, a member movable under the guidance of the pattern oppositely from a neutral position, and a lever-system movable under the influence of the member and arranged to affect the controllable element oppositely upon movement of said member in opposite directions.

222. In a machine for forming material in accordance with a pattern, movable means for operating upon the material, power means for moving the operating means and including controllable elements, a member movable under the guidance of the pattern oppositely from a neutral position, and a lever-system movable under the influence of the member and arranged to affect one of the controllable elements in the same manner upon the movement of said member in opposite directions and to affect another of the controllable elements oppositely for such movement.

223. In a machine for bending a strip in accordance with a pattern, bending means and feeding means co-operating with the strip, power means including clutches for operating the bending and feeding means, a member movable under the guidance of the pattern oppositely from a neutral position, and a lever-system movable under the influence of the member and arranged to release the feeding clutch and either release or engage the bending clutch upon such opposite movement.

224. In a machine for bending a strip in accordance with a pattern, oppositely movable bending members co-operating with the strip, power means including a clutch for each bending member, a member movable under the guidance of the pattern oppositely from a neutral position, and a lever-system movable under the influence of the member and arranged to actuate one or the other bending clutch according to the direction of movement.

225. In a machine for bending a strip in accordance with a pattern, bending means, feeding means and clamping means co-operating with the strip, power means including clutches for operating said means, a member movable under the guidance of the pattern oppositely from a neutral position, and a lever-system movable under the influence of the member and arranged to release the feeding clutch, engage the clamping clutch and either release or engage the bending clutch for such opposite movement.

226. In a machine for forming material in accordance with a pattern, movable means for operating upon the material, power means for moving the operating means and including a controllable element, heating means for the material, a controlling device therefor, a member movable under the guidance of the pattern, and a lever-system movable under the influence of the member to simultaneously affect the controllable element and the controlling device.

227. In a forming machine, means for operating upon the work, means for actuating the operating means, variable controlling mechanism for the actuating means, and automatic means for varying the controlling mechanism.

228. In a forming machine, means for operating upon the work, means for actuating the operating means, means made effective at a predetermined point in the operation for increasing the actuating force, and means arranged to vary the point of increase.

229. In a forming machine, means for operating upon the work, means for applying an initial pressure to the operating means, and means governed by the extent of operation upon the work for increasing the pressure.

230. In a strip-bending machine, a bender co-operating with the strip, means for pressing the bender against the strip, and a valve governed by the machine for varying the pressure.

231. In a strip-bending machine, a bender co-operating with the strip, means for pressing the bender against the strip, and mechanism brought into action after a predetermined extent of angular movement of the bender for increasing the pressure.

232. In a forming machine, means for operating upon the work, means for actuating the operating means including elements transmitting the actuating force by frictional engagement, and means for varying the pressure upon said elements.

233. In a forming machine, means for operating upon the work, means for actuating the operating means including elements transmitting the actuating force by frictional engagement, means for bringing the elements into and out of actuating engagement, and automatic means for increasing the pressure during engagement.

234. In a forming machine, means for operating upon the work, means for actuating the operating means, fluid pressure-controlling means for the actuating means, and means governed by the operating means for varying the effective fluid pressure.

235. In a forming machine, means for operating upon the work, means for actuating the operating means, fluid pressure-controlling means for the actuating means, and means governed by the operating means for varying the effective fluid pressure.

236. In a forming machine, means for operating upon the work, means for actuating the operating means, fluid pressure-controlling means for the actuating means, and a valve governing the fluid in the system, there being a leak in the system between the valve and actuating means.

237. In a strip-bending machine, a bender movable against the strip, power means, a friction-clutch connecting the power means to the bender, means for causing the engagement of the clutch, and means for increasing the force of engagement of said clutch.

238. In a strip-bending machine, a bender movable against the strip, power means, a friction-clutch connecting the power means to the bender, a pneumatic controlling system for the clutch, and means for varying the pressure applied through the pneumatic system to said clutch.

239. In a strip-bending machine, a bender movable against the strip, power means, a friction-clutch connecting the power means to the bender, a pneumatic controlling system for the clutch, a valve in the system, and means arranged to operate the valve from the bender.

240. In a strip-bending machine, a bender movable against the strip, power means, a friction-clutch connecting the power means to the bender, a pneumatic controlling system for the clutch, a valve in the system, and means arranged to operate the valve from the bender after a predetermined extent of movement of said bender.

241. In a machine for forming material, means for restricting the movement of the material, means for relatively moving the restricting means and material, means associated with the restricting means for progressively bringing the material to the desired form, and means for severing the formed material.

242. In a machine for forming material, separated members for restricting the movement of the material, means for feeding the material through the space between the restricting members, means operating in proximity to the space for progressively bringing the material to the desired form, and means co-operating with the restricting members for severing the formed material.

243. In a machine for forming material, separated members for restricting the movement of the material, means for forming the material, means for feeding the material through the space between the restricting members, means for moving the members relatively to hold the material, and means for cutting the material thus held.

244. In a bending machine, separated abutments between which the work passes, bending means bodily movable across the abutments from one side of the space between them to the other, and cutting means co-operating with the work adjacent to the abutments.

245. In a bending machine, relatively movable abutments between which the work passes, bending means co-operating with the work, means movable with an abutment for cutting the work, and means for moving the cutting means independently of the abutment.

246. In a bending machine, separated abutments between which the work passes, means for feeding the work between the abutments, bending means arranged to move across the space between the abutments, cutting means co-operating with the work, and power-operated means for moving the cutting means.

247. In a machine for forming material, means for restricting the movement of the material in opposite directions, means co-operating therewith and movable in both such directions to form the material, means for intermittently relatively moving the restricting means and material, and means associated with the restricting means for severing the material during the intermittencies of movement.

248. In a bending machine, separated abutments between which the work passes, bending means arranged to move from one side across the space between the abutments to the other side thereof, means for intermittently feeding the work between the abutments into co-operation with the bending means, and means for cutting the bent material during the intermittencies of feed.

249. In a machine for forming material in accordance with a pattern, means for advancing material, means for bending the advanced material about the pattern, means for further operating upon the material in proximity to its forward extremity, and means governed by the material after it has been bent about the pattern for controlling said further operation.

250. In a machine for forming material in accordance with a pattern, means for advancing material, means for bending the advanced material to overlap it about the pattern, means for cutting the material at the overlap in proximity to the forward extremity, and means governed by the material after it has been bent about the pattern for controlling the cutting means.

251. In a forming machine, work-forming means, an abutment for engagement by the work in the forming operation, movable cutting means for the work co-operating with the abutment, and means governed by the formed work for initiating the operation of the cutting means.

252. In a forming machine, work-forming means, cutting means for the work, and means governed by the formed work for stopping the operation of the entire machine and permitting the elements to return to normal.

253. In a strip-bending machine, an abutment, a bending member co-operating therewith, means for feeding a strip past the abutment for the bending operation, and a cutter movable in contact with the abutment at the side opposite the bending member and transversely to the direction of feed.

254. In a strip-bending machine, an abutment, a bending member co-operating therewith, means for feeding a strip past the abutment for the bending operation, a cutter for the strip, a contact member mounted in proximity to the abutment for engagement with the strip in its movement toward the bending member, and connections to the contact member for controlling the cutter.

255. In a strip-bending machine, spaced abutments, a bending member co-operating therewith, means for feeding a strip between the abutments for the bending operation, a cutter movable along one abutment transversely to the direction of feed, a contact member mounted in proximity to the other abutment for engagement by the strip in its feed, and connections to the contact member for controlling the cutter.

256. In a forming machine, means for operating upon the work, a member yieldable in a plurality of directions with which the work contacts, controlling mechanism for the operating means, and connections between the contact member and controlling mechanism.

257. In a forming machine, means for operating upon the work, a movable support, a member pivoted upon the support and with which the work contacts, controlling mechanism for the operating means, and connections between the contact member and controlling mechanism.

258. In a strip-bending machine, separated abutments between which the strip passes, means for bending a free end of the strip, a movable member with which said end contacts, controlling mechanism for the bending means, and connections between the contact member and controlling mechanism.

259. In a strip-bending machine, separated abutments, means for feeding the strip between the abutments, means for bending a free end of the strip about an abutment, a member for contact with the end of the strip mounted at the rear of the abutment near the point of entrance of the strip, controlling mechanism for the feeding and bending means, and connections between the contact member and controlling mechanism.

260. In a strip-bending machine, separated abutments, means for feeding the strip between the abutments, means for bending a free end of the strip about an abutment, means for cutting the bent strip, a member for contact with the end of the strip mounted at the rear of the abutment near the point of entrance of the strip, controlling mechanism for the feeding, bending and cutting means, and connections between the contact member and controlling mechanism.

261. In a strip-bending machine, relatively movable spaced abutments, means for feeding the strip between the abutments, means for moving the abutments relatively to clamp the strip, means for bending the strip, a movable member with which the end of the strip contacts, controlling mechanism for the feeding, moving and bending means, and connections between the contact member and controlling mechanism.

262. In a forming machine, means for operating upon the work, means arranged to change the operation, means for holding the changing means in an operation-initiating position, and means controlled in the operation of the machine for moving the changing means to a position in readiness for initiating a succeeding operation.

263 In a forming machine, means for feeding the work, means for forming the work, means arranged to start the feeding means, means for latching the starting means in its active position, and means controlled in the operation of the machine for releasing the latching means.

264. In a forming machine, means for operating upon the work, means arranged to start the operating means, means for latching the starting means in its active position, and means controlled in the operation of the machine for releasing the latching means, said release of the starting means being delayed after the initiation of the control.

265. In a forming machine, means for feeding the work, means for forming the work, means arranged to start the feeding means, means for latching the starting means in its active position, means for releasing the latching means, power means, a clutch for connecting the power means and releasing means, and means controlled in the operation of the machine for operating the clutch.

266. In a forming machine, means for operating upon the work, means arranged to start the operating means, means for latching the starting means in its active position, means for releasing the latching means, power means, a clutch for connecting the power means and releasing means, and means controlled by the work for causing the engagement of the clutch.

267. In a forming machine, means for operating upon the work, means arranged to start the operating means, means for latching the starting means in its active position, means for releasing the latching means, power means, a clutch for connecting the power means and releasing means, means controlled by the work for causing the engagement of the clutch, and means actuated in the movement of the clutch for causing its disengagement.

268. In a forming machine, means for operating upon the work, means arranged to start the operating means, means for latching the starting means in its active position, means for releasing the latching means, power means, a clutch for connecting the power means and releasing means, and means acting in the movement of the clutch for disengaging said clutch.

269. In a forming machine, means for operating upon the work, means arranged to start the operating means, means for latching the starting means in its active position, means for releasing the latching means, power means, a clutch for connecting the power means and releasing means, and a plurality of means capable of independent action to disengage said clutch.

270. In a forming machine, means for feeding the work, means for forming the work, means arranged to start the feeding means, means for latching the starting means in its active position, means for releasing the latching means, power means, a clutch for connecting the power means and releasing means, means controlled by the work for causing the engagement of the clutch, and means actuated after a predetermined movement of the clutch for causing its disengagement.

271. In a forming machine, means for feeding the work, means for forming the work, means arranged to start the feeding means, means for latching the starting means in its active position, means for releasing the latching means, power means, a clutch for connecting the power means and releasing means, means controlled by the work for causing the engagement of the clutch, means actuated after a predetermined movement of the clutch for causing its disengagement, and means arranged to vary the extent of such movement.

272. In a forming machine, means for forming the work, controlling means for the forming means, means for rendering the controlling means ineffective, means for temporarily retaining the last-mentioned means against action, and automatic means for governing the retaining means.

273. In a forming machine, means for forming the work, controlling means for the forming means, a movable member for rendering said controlling means ineffective, means for latching said movable member in active position, and means governed in the operation of the machine for releasing the latching means.

274. In a forming machine, means for feeding the work, means for forming the work, means arranged to start the feeding means, means for controlling the forming means, actuating means for rendering the controlling means ineffective, means for latching the starting and actuating means in active position, and automatic means for releasing the latching means.

275. In a forming machine, means for feeding the work, means for forming the work, means arranged to start the feeding means, means for controlling the forming means, actuating means for rendering the controlling means ineffective, means for latching the starting and actuating means in active position, and means governed by the work for releasing the latching means of the actuating means, the released actuating means governing the release of the starting means.

276. In a forming machine, feeding mechanism, actuating mechanism therefor, bending mechanism, controlling mechanism therefor, and means operable under the influence of the work and arranged to govern the actuating mechanism and controlling mechanism.

277. In a forming machine, feeding mechanism, actuating mechanism therefor, bending mechanism, controlling mechanism therefor, an oscillatory member, connections between the oscillatory member and actuating mechanism, a reciprocatory member, connections between the reciprocatory member and controlling mechanism, latches for holding respectively the oscillatory member and reciprocatory member with the actuating mechanism and controlling mechanism in active condition, and means for releasing the latches to render the mechanisms ineffective.

278. In a forming machine, feeding mechanism, actuating mechanism therefor, bending mechanism, controlling mechanism therefor, an oscillatory member, connections between the oscillatory member and actuating mechanism, a reciprocatory member, connections between the reciprocatory member and controlling mechanism, latches for holding respectively the oscillatory member and reciprocatory member with the actuating mechanism and controlling mechanism in active condition, and means under the influence of the work to release the latch of the reciprocatory member, said member thereupon effecting the release of the latch for the oscillatory member.

279. In a forming machine, feeding mechanism, actuating mechanism therefor, bending mechanism, controlling mechanism therefor, an oscillatory member, connections between the oscillatory member and actuating mechanism, a reciprocatory member, connections between the reciprocatory member and controlling mechanism, latches for holding respectively the oscillatory member and reciprocatory member with the actuating mechanism and controlling mechanism in active condition, a power-shaft, a clutch associated therewith and having means acting when driven by the shaft to release the latch of the oscillatory member, a member for retaining the clutch normally disengaged, and a contact member carried by the reciprocatory member for engagement with the retaining member.

280. In a forming machine, feeding mechanism, actuating mechanism therefor, bending mechanism, controlling mechanism therefor, an oscillatory member, connections between the oscillatory member and actuating mechanism, a reciprocatory member, connections between the reciprocatory member and controlling mechanism, latches for holding respectively the oscillatory member and reciprocatory member with the actuating mechanism and controlling mechanism in active condition, a power-shaft, a clutch associated therewith and having means acting when driven by the shaft to release the latch of the oscillatory member, a member for retaining the clutch normally disengaged, and a contact member carried by the reciprocatory member for engagement with the retaining member to permit the engagement of the clutch, said clutch being provided with a surface co-operating with the latch of the oscillatory member and acting to disengage the clutch.

281. In a forming machine, feeding mechanism, actuating mechanism therefor, bending mechanism, controlling mechanism therefor, an oscillatory member, connections between the oscillatory member and actuating mechanism, a reciprocatory member, connections between the reciprocatory member and controlling mechanism, latches for holding respectively the oscillatory member and reciprocatory member with the actuating mechanism and controlling mechanism in active condition, a power-shaft, a clutch associated therewith and having means acting when driven by the shaft to release the latch of the oscillatory member, a member for retaining the clutch normally disengaged, a contact member carried by the reciprocatory member for engagement with the retaining member to permit the engagement of the clutch, said clutch being provided with a surface co-operating with the latch of the oscillatory member and acting to disengage the clutch, and a member fixed relatively to the clutch and also co-operating therewith for the purpose of disengaging the clutch.

282. In a forming machine, feeding mechanism, actuating mechanism therefor, bending mechanism, controlling mechanism therefor, cutting mechanism, governing mechanism therefor, an oscillatory member, connections between the oscillatory member and actuating and governing mechanisms, a reciprocatory member, connections between the reciprocatory member and controlling mechanism, latches for holding respectively the oscillatory member and reciprocatory member with the actuating mechanism and controlling mechanism in active condition and the governing mechanism inactive, and means for releasing the latches to render the actuating and controlling mechanisms ineffective and the governing mechanism effective.

283. In a forming machine, means for operating upon the work, power means, a connector between the power means and operating means normally held inactive, and means governed by the work for releasing the connector.

284. In a forming machine, means for operating upon the work, power means, a connector between the power means and operating means normally held inactive, means governed by the work for releasing the connector to drive the operating means from the power means, and means under the influence of the operating means for returning the connector to inactive position.

285. In a forming machine, a reciprocatory cutter, a power-shaft, an actuator for the cutter associated with the power-shaft, a detent carried by the actuator for connecting it with the shaft, and a pin normally holding the detent out of co-operation with the shaft.

286. In a forming machine, a reciprocatory cutter, a power-shaft, an actuator for the cutter associated with the power-shaft, a detent carried by the actuator for connecting it with the shaft, a pin normally engaging the detent, and means carried by the shaft for withdrawing the pin.

287. In a forming machine, a reciprocatory cutter, a power-shaft, an actuator for the cutter associated with the shaft, a detent carried by the actuator for connecting it with the shaft, a pin normally holding the detent out of co-operation with the shaft and being provided with a projection, and a worm mounted upon the shaft and into engagement with which the projection may move.

288. In a forming machine, a reciprocatory cutter, a power-shaft, an actuator for the cutter associated with the power-shaft, a detent carried by the actuator for connecting it with the shaft, a pin normally holding the detent out of co-operation with the shaft and being provided with a projection having a limited movement along the pin, and a worm mounted upon the shaft and into engagement with which the projection may move.

289. In a forming machine, a reciprocatory cutter, a power-shaft, an actuator for the cutter associated with the power-shaft, a detent carried by the actuator for connecting it with the shaft, a pin normally holding the detent out of co-operation with the shaft and being provided with a projection, and a worm mounted upon the shaft and into engagement with which the projection may move, said worm being arranged to disengage the projection and free the pin after a predetermined movement of the pin has been effected.

290. In a forming machine, a reciprocatory cutter, a power-shaft, an actuator for the cutter associated with the power-shaft, a detent carried by the actuator for connecting it with the shaft, a pin normally holding the detent out of co-operation with the shaft and being provided with a projection, a worm mounted upon the shaft and into engagement with which the projection may move, said worm being arranged to disengage the projection and free the pin after a predetermined movement of the pin has been effected, and means for releasably holding the projection in such disengaged position.

291. In a forming machine, a reciprocatory cutter, a power-shaft, an actuator for the cutter associated with the power-shaft, a detent carried by the actuator for connecting it with the shaft, a pin normally holding the detent out of co-operation with the shaft and being provided with a projection, a worm mounted upon the shaft and into engagement with which the projection may move, said worm being arranged to disengage the projection and free the pin after a predetermined movement of the pin has been effected, means for releasably holding the projection in such disengaged position, and means governed by the work for effecting the release of the projection.

292. In a forming machine, a plurality of operating mechanisms, means for stopping the operation of the machine with a predetermined effect upon the mechanisms, and means arranged to stop the operation of the machine with a different effect upon the mechanisms.

293. In a forming machine, a plurality of operating mechanisms, means governed by the work for stopping the operation of the machine with a predetermined effect upon the mechanisms, and operator-governed means for stopping the operation of the machine with a different effect upon the mechanisms.

294. In a forming machine, a plurality of operating mechanisms, means governed by the work for stopping the operation of the machine by rendering certain of the mechanisms ineffective and initiating the action of another mechanism to complete the formation, and operator-governed means for stopping the operation of the machine by rendering all the mechanisms ineffective.

295. In a forming machine, means for operating upon the work, actuating means for the operating means, means for retaining the actuating means in an active position, means for releasing the retaining means, and other means to release the retaining means, there being associated therewith means for rendering the first-mentioned releasing means ineffective.

296. In a forming machine, means for operating upon the work, actuating means for the operating means, means for latching the actuating means in active position, automatic means for releasing the latching means, and operator-governed means arranged to release the latching means, there being associated therewith means for rendering the automatic releasing means ineffective.

297. In a forming machine, feeding means, actuating means therefor, bending means, controlling means therefor, means for latching the actuating means in active position, means for nullifying the effect of the controlling means, means for latching the nullifying means in a position in which the controlling means is active, automatic means for releasing the latching means of the actuating means, means arranged to release the latching means of the nullifying means, and means operable by the last-mentioned releasing means for rendering the automatic releasing means ineffective.

298. In a forming machine, feeding means, actuating means therefor, bending means, controlling means therefor, means for latching the actuating means in active position, means for nullifying the effect of the controlling means, means for latching the nullifying means in a position in which the controlling means is active, clutch mechanism for releasing the latching means of the actuating means, means arranged to release the latching means of the nullifying means, and means operable by the last-mentioned releasing means for preventing the operation of the clutch mechanism.

299. In a forming machine, bending means operating upon the work, cutting means controlled as a result of the operation of the bending means, and means arranged to stop the operation of the bending means and prevent the operation of the cutting means.

300. In a forming machine, bending means operating upon the work, cutting means controlled as a result of the operation of the bending means, and operator-governed means arranged to stop the operation of the bending means and prevent the operation of the cutting means.

301. In a forming machine, bending means operating upon the work, actuating means therefor, means for latching the actuating means in active position, cutting means for the bent work, controlling means for the cutting means, means for latching the controlling means in inactive position, and means for releasing the latching means of the actuating means and preventing the release of the latching means for the controlling means.

302. In a forming machine, bending means operating upon the work, actuating means therefor, means for latching the actuating means in active position, cutting means for the bent work, controlling means for the cutting means, means for latching the controlling means in inactive position, the latching means for the controlling means being governed by the latching means for the actuating means, and operator-governed means for releasing the latching means for the actuating means and preventing its effect upon the latching means for the controlling means.

303. In a forming machine, bending means operating upon the work, cutting means controlled as a result of the operation of the bending means, means for independently controlling the cutting means, and means arranged to stop the operation of the bending means and prevent the operation of the cutting means.

304. In a forming machine, bending means operating upon the work, cutting means controlled as a result of the operation of the bending means, and means for independently controlling the cutting means.

305. In a forming machine, movable means for operating upon the work, automatic means for moving the operating means, and operator-governed means for moving the operating means.

306. In a forming machine, work-forming means, movable jaws co-operating with the work, automatic mechanism for moving the jaws to clamp the work, and operator-governed means for moving the jaws.

307. In a forming machine, a cutter movable toward and from the work, a member joined to the cutter to effect its movement, and a plurality of means for actuating the member, each of said means in its action leaving the associated means unaffected.

308. In a forming machine, movable means for operating upon the work, an eccentric for moving the operating means, a movable eccentric mounting for the first-mentioned eccentric, and independent means arranged to move the eccentrics and thus actuate the operating means.

309. In a forming machine, a plurality of movable members for performing different operations upon the work, power actuating means for the members, and operator-governed means for simultaneously moving the members.

310. In a forming machine, a plurality of movable members for performing different operations upon the work, automatic actuating means for the members, a hand-lever arranged to act upon one of the members, and a connection between said lever and another member.

311. In a machine for forming material in accordance with a pattern, a member movable under the guidance of the pattern, means controlled in the movement of the member for operating upon the material, other movable means operating upon the material, and operator-governed means for moving the member and the operating means.

312. In a machine for forming material in accordance with a pattern, a member movable under the guidance of the pattern, means for operating upon the material, power means for driving the operating means, said power means being under the control of the member to vary the action of the operating means and operator-governed means arranged to simultaneously move the member and operating means.

313. In a machine for forming material in accordance with a pattern, movable gaging means co-operating with the pattern, work-forming means controlled by the gaging means, a movable abutment co-operating with the work, and means common to both for moving the gaging means and abutment.

314. In a machine for forming material in accordance with a pattern, movable gaging means co-operating with the pattern, work-forming means controlled by the gaging means, a cutter operating upon the work and being free from the control of the gaging means, and means common to both for moving the gaging means and cutter.

315. In a machine for forming material in accordance with a pattern, movable gaging means co-operating with the pattern, work-forming means controlled by the gaging means, a movable abutment and a cutter co-operating with the work, and means common to all for moving the gaging means, abutment and cutter.

In testimony whereof I have signed my name to this specification.

CUTLER D. KNOWLTON.

CERTIFICATE OF CORRECTION.

Patent No. 1,773,907. Granted August 26, 1930, to

CUTLER D. KNOWLTON.

It is hereby certified that error appears in the printed specification of the above numbered patent requiring correction as follows: Page 7, line 37, after the word "and" insert the reference character 344; line 93, after "drag" insert or residual force; page 9, line 118, strike out the word "is"; page 17, line 118, for "operation" read operator; page 22, line 7, 8 and 9, claim 23, strike out the comma and words ", and driving mechanism for the forming and feeding mechanisms" and insert the same to follow after the word "mechanism" at the end of the claim, line 10; page 24, line 112, claim 68, after the word "operation" and before the period, insert the words "and to support said strip in the plane of bending"; page 25, line 101, claim 86, strike out the word "over"; page 28, lines 119 and 120, claim 137, strike out the words and comma "a switch included in the circuit," and insert the same to follow after the word "work," line 121, same claim; page 29, line 66, claim 148, after the word "In" insert the article a; page 34, lines 10 and 11, claim 215, strike out "effective during the application of operating pressure" and insert the same to follow after the compound word "leak-opening" in line 8; page 35, line 54, claim 234, strike out the words "governed by the operating means"; and that the said Letters Patent should be read with these corrections therein that the same may conform to the record of the case in the Patent Office.

Signed and sealed this 17th day of February, A. D. 1931.

(Seal)
M. J. Moore,
Acting Commissioner of Patents.

accordance with a pattern, movable gaging means co-operating with the pattern, work-forming means controlled by the gaging means, a movable abutment co-operating with the work, and means common to both for moving the gaging means and abutment.

314. In a machine for forming material in accordance with a pattern, movable gaging means co-operating with the pattern, work-forming means controlled by the gaging means, a cutter operating upon the work and being free from the control of the gaging means, and means common to both for moving the gaging means and cutter.

315. In a machine for forming material in accordance with a pattern, movable gaging means co-operating with the pattern, work-forming means controlled by the gaging means, a movable abutment and a cutter co-operating with the work, and means common to all for moving the gaging means, abutment and cutter.

In testimony whereof I have signed my name to this specification.

CUTLER D. KNOWLTON.

CERTIFICATE OF CORRECTION.

Patent No. 1,773,907. Granted August 26, 1930, to

CUTLER D. KNOWLTON.

It is hereby certified that error appears in the printed specification of the above numbered patent requiring correction as follows: Page 7, line 37, after the word "and" insert the reference character 344; line 93, after "drag" insert or residual force; page 9, line 118, strike out the word "is"; page 17, line 118, for "operation" read operator; page 22, line 7, 8 and 9, claim 23, strike out the comma and words ", and driving mechanism for the forming and feeding mechanisms" and insert the same to follow after the word "mechanism" at the end of the claim, line 10; page 24, line 112, claim 68, after the word "operation" and before the period, insert the words "and to support said strip in the plane of bending"; page 25, line 101, claim 86, strike out the word "over"; page 28, lines 119 and 120, claim 137, strike out the words and comma "a switch included in the circuit," and insert the same to follow after the word "work," line 121, same claim; page 29, line 66, claim 148, after the word "In" insert the article a; page 34, lines 10 and 11, claim 215, strike out "effective during the application of operating pressure" and insert the same to follow after the compound word "leak-opening" in line 8; page 35, line 54, claim 234, strike out the words "governed by the operating means"; and that the said Letters Patent should be read with these corrections therein that the same may conform to the record of the case in the Patent Office.

Signed and sealed this 17th day of February, A. D. 1931.

(Seal)

M. J. Moore,
Acting Commissioner of Patents.